(12) United States Patent
Ueki et al.

(10) Patent No.: US 11,353,738 B2
(45) Date of Patent: *Jun. 7, 2022

(54) OPTICAL FILM, POLARIZING PLATE, LIQUID CRYSTAL PANEL, TOUCH PANEL, AND IMAGE DISPLAY DEVICE

(71) Applicant: FUJIFILM Corporation, Tokyo (JP)

(72) Inventors: Keigo Ueki, Kanagawa (JP); Yuichi Fukushige, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/038,931

(22) Filed: Sep. 30, 2020

(65) Prior Publication Data

US 2021/0011337 A1 Jan. 14, 2021

Related U.S. Application Data

(63) Continuation of application No. PCT/JP2019/020209, filed on May 22, 2019.

(30) Foreign Application Priority Data

May 22, 2018 (JP) .............................. JP2018-098318
Jun. 15, 2018 (JP) .............................. JP2018-114622

(51) Int. Cl.
G02F 1/1335 (2006.01)
G02F 1/1333 (2006.01)

(52) U.S. Cl.
CPC .... G02F 1/133528 (2013.01); G02F 1/13338 (2013.01); *G02F 2201/503* (2013.01)

(58) Field of Classification Search
CPC ......... G02F 1/133528; G02F 2201/503; G02F 2201/50
See application file for complete search history.

(56) References Cited

U.S. PATENT DOCUMENTS

| 11,092,845 B2* | 8/2021 | Ueki ................... G02F 1/13338 |
| 2010/0247940 A1 | 9/2010 | Takahashi et al. |
| 2014/0378614 A1 | 12/2014 | Kim et al. |
| 2016/0161800 A1* | 6/2016 | Sekiguchi ................ G02B 1/14 349/96 |
| 2016/0297178 A1 | 10/2016 | Kang et al. |
| 2017/0334173 A1 | 11/2017 | Yui et al. |

FOREIGN PATENT DOCUMENTS

| CN | 104231952 A | 12/2014 |
| CN | 105764688 A | 7/2016 |
| CN | 107108348 A | 8/2017 |

(Continued)

OTHER PUBLICATIONS

International Search Report Issued in PCT/JP2019/020209 dated Aug. 27, 2019.

(Continued)

*Primary Examiner* — Jessica M Merlin
(74) *Attorney, Agent, or Firm* — Edwards Neils LLC; Jean C. Edwards, Esq.

(57) ABSTRACT

An optical film includes a resin film, and a shock absorbing layer disposed on at least one surface of the resin film, in which a storage elastic modulus E' of the shock absorbing layer at 25° C., and a frequency of $10^6$ Hz is 1 GPa or less.

16 Claims, 1 Drawing Sheet

(56) References Cited

FOREIGN PATENT DOCUMENTS

| JP | 2007-108592 A | 4/2007 | |
|----|---------------|--------|---|
| JP | 2017-129868 A | 7/2017 | |
| TW | 201514555 A | 4/2015 | |
| WO | 2006/011461 A1 | 2/2006 | |
| WO | 2008/053931 A1 | 5/2008 | |
| WO | 2015/029860 A1 | 3/2015 | |
| WO | 2016/093133 A1 | 6/2016 | |
| WO | WO-2016093133 A1 * | 6/2016 | ............... G09F 9/00 |

OTHER PUBLICATIONS

Written Opinion Issued in PCT/JP2019/020209 dated Aug. 27, 2019.
International Preliminary Report on Patentability Issued in PCT/JP2019/020209 dated Nov. 24, 2020.
Notice of Reasons for Refusal issued by the Japanese Patent Office dated Aug. 3, 2021, in connection with Japanese Paent Application No. 2020-521270.
Office Action, issued by the State Intellectual Property Office dated Nov. 11, 2021, in connection with Chinese Patent Application No. 201980028545.4.
Office Action, issued by the State Intellectual Property Office dated Mar. 8, 2022, in connection with Chinese Patent Application No. 201980028545.4.

* cited by examiner

OPTICAL FILM, POLARIZING PLATE, LIQUID CRYSTAL PANEL, TOUCH PANEL, AND IMAGE DISPLAY DEVICE

CROSS-REFERENCE TO RELATED APPLICATIONS

This application is a Continuation of PCT International Application No. PCT/JP2019/020209 filed on May 22, 2019, which was published under PCT Article 21(2) in Japanese, and which claims priority under 35 U.S.C. § 119(a) to Japanese Patent Application No. 2018-098318 filed on May 22, 2018, and Japanese Patent Application No. 2018-114622 filed on Jun. 15, 201. The above applications are hereby expressly incorporated by reference, in their entirety, into the present application.

BACKGROUND OF THE INVENTION

1. Field of the Invention

The present invention relates to an optical film, a polarizing plate, a liquid crystal panel, a touch panel, and an image display device.

2. Description of the Related Art

Conventionally, glass such as chemically strengthened glass has been mainly used for optical films, which require high durability, such as front surface plates of image display devices, particularly front surface plates of touch panel displays. In recent years, various functionalities (lightweight property, tenacity (breakage resistance), thin film workability (being able to make smaller in thickness), and the like) of resin films have attracted attention, and use of resin films as glass substitute materials is expected to improve functionality of optical films.

As a resin film of a glass substitute material, for example, JP2017-129868A discloses a resin laminated plate including a resin plate on one surface of a transparent base material having in-plane birefringence, in which a retardation of the transparent base material having in-plane birefringence is 8,000 nm or more.

SUMMARY OF THE INVENTION

In a case of using the resin laminated plate as an optical film used for a front surface plate of a touch panel, a front surface plate of a touch panel display, a protective film constituting a polarizing plate, and the like, members inside a display such as liquid crystal cells may be destroyed due to external shocks on a front surface plate, thereby impairing functions.

The present invention has been made in view of the above problems, and an object thereof is to provide an optical film that functions as a glass substitute material and has an excellent shock absorption property, and a polarizing plate, a liquid crystal panel, a touch panel, and an image display device, all of which include the optical film.

The above-mentioned object has been achieved by the following means.

(1) An optical film comprising: a resin film; and a shock absorbing layer disposed on at least one surface of the resin film, in which a storage elastic modulus E' of the shock absorbing layer at 25° C., and a frequency of 10 Hz is 1 GPa or less.

(2) The optical film according to (1), in which a film thickness of the shock absorbing layer is 10 μm to 80 μm.

(3) The optical film according to (1) or (2), further comprising a hard coat layer on a surface of the resin film opposite to the surface on which the shock absorbing layer is disposed.

(4) A polarizing plate comprising the optical film according to (1) or (2).

(5) A polarizing plate comprising the optical film according to (3).

(6) A liquid crystal panel comprising the polarizing plate according to (4) as a rear-side polarizing plate.

(7) A liquid crystal panel comprising the polarizing plate according to (5) as a front-side polarizing plate.

(8) A liquid crystal panel comprising: the polarizing plate according to (4) as a rear-side polarizing plate; and the polarizing plate according to (5) as a front-side polarizing plate.

(9) The liquid crystal panel according to (8), in which a storage elastic modulus $E'_r$ of the shock absorbing layer included in the optical film of the rear-side polarizing plate, and a storage elastic modulus $E'_f$ of the shock absorbing layer included in the optical film of the front-side polarizing plate satisfy the following expression.

$$E'_f - E'_r \geq 0$$

(10) The liquid crystal panel according to any one of (6) to (9), further comprising a touch sensor.

(11) A touch panel comprising: the optical film according to any one of (1) to (3); and a touch sensor film, in which the optical film and the touch sensor film are bonded to each other.

(12) The liquid crystal panel according to any one of (6) to (9), further comprising the touch panel according to (11).

(13) An image display device comprising the liquid crystal panel according to any one of (6) to (10) and (12).

The term "front-side" and the term "rear-side" refer to a relative positional relationship of a polarizing plate in a case where the polarizing plate is incorporated into a liquid crystal display device. That is, among a liquid crystal cell and two polarizing plates sandwiching the liquid crystal cell, the "front-side polarizing plate" is a polarizing plate positioned on a visible side in a case where a liquid crystal panel is incorporated into a liquid crystal display device, and the "rear-side polarizing plate" is a polarizing plate positioned on a side (invisible side) opposite to the visible side in a case where the liquid crystal panel is incorporated into the liquid crystal display device. For example, in a liquid crystal display device including a backlight in a direct backlight mode, an invisible side is a side on which the backlight is present in a case where the backlight is incorporated into the liquid crystal display device, and the invisible side is positioned on a side opposite to a visible side with a liquid crystal cell therebetween.

In the present specification, in a case where there are a plurality of substituents, linking groups, repeating structures, and the like (hereinafter referred to as substituents and the like) which are represented by specific signs, or in a case where a plurality of substituents and the like are defined at the same time, the respective substituents and the like may be the same as or different from each other unless otherwise specified. The same applies to the definition of the number of substituents and the like. Furthermore, in a case where the plurality of substituents and the like are near to each other (particularly in a case where they are adjacent to each other), they may be linked to each other to form a ring unless otherwise specified. Furthermore, a ring such as an aliphatic ring, an aromatic ring, or a hetero ring may further be fused to form a fused ring.

In the present specification, in a case where the number of carbon atoms of a certain group is defined, the number of carbon atoms means the number of carbon atoms of the entire group. That is, in a case where this group is in a form of further having a substituent, the number of carbon atoms means a total number of carbon atoms of the entire group including this substituent.

In the present specification, a numerical value range expressed using "to" means a range including numerical values described before and after "to" as a lower limit value and an upper limit value.

In the present specification. "(meth)acrylate" is used to refer to one or both of acrylate and methacrylate. Furthermore, a "(meth)acryloyl group" is used to refer to one or both of an acryloyl group and a methacryloyl group. "(Meth)acrylic" is used to refer to one or both of acrylic and methacrylic.

In the present specification, the term "(co)polymer" is used to refer to one or both of a homopolymer and a copolymer.

Regarding each of components described in the present specification, one kind of components may be used alone, or two kinds thereof having different structures may be used in combination. Furthermore, a content of each of the component means a total content thereof in a case where two or more kinds of components having different structures are used in combination.

In the present specification, both a solid content in a shock absorbing layer and a solid content in a hard coat layer mean a component remaining in each of the layer in a case where a composition containing a solvent is applied and dried to form each of the layer That is, this component is a component other than the solvent.

In the present specification, a weight-average molecular weight (Mw) can be measured by GPC as a molecular weight in terms of polystyrene unless otherwise specified. In this case, using a GPC device HLC-8220 (manufactured by TOSOH CORPORATION) and using G3000HXL+ G2000HXL as columns, a weight-average molecular weight is detected using RI at 23° C., and a flow rate of 1 mL/mm. An eluent can be selected from tetrahydrofuran (THF), chloroform, N-methyl-2-pyrrolidone (NMP), m-cresol/chloroform (manufactured by Shonan Wako Junyaku K.K.), and THF is used for substances that dissolve therein.

In the present specification, a thickness of each layer and a storage elastic modulus in a tensile deformation mode are measured by a method described in Examples.

An optical film according to the aspects of the present invention is used as a front surface plate of a touch panel or a front surface plate of a touch panel display (image display device having a touch sensor function), or is used as a protective film constituting a polarizing plate (also referred to as a polarizing plate protective film), and thereby it is possible to effectively inhibit destruction of members inside a display such as liquid crystal cells. In addition, the optical film according to the aspects of the present invention can be suitably used as an optical film such as a polarizing film, a phase difference film, and a brightness enhancement film for liquid crystal display.

The optical film according to the aspects of the present invention functions as a glass substitute material and has an excellent shock absorption property, and therefore it can be suitably used as a front surface plate of a touch panel, a front surface plate of a touch panel display, a polarizing plate protective film, and the like. Furthermore, a polarizing plate, a liquid crystal panel, a touch panel, and an image display device according to the aspects of the present invention have the optical film according to the aspects of the present invention, and thereby they can exhibit excellent shock absorption properties.

The above-mentioned characteristics and other characteristics and advantages of the present invention will become more apparent in the following description.

DESCRIPTION OF THE PREFERRED EMBODIMENTS

A preferred embodiment of the optical film according to an embodiment of the present invention will be described.

<<Optical Film>>

Figure 1:
FIG. 1 is a vertical cross-sectional view showing one embodiment of a configuration of an optical film of the present invention.

FIG. 1 shows a preferred embodiment of the optical film according to the embodiment of the present invention. An optical film 4A shown in FIG. 1 is an optical film including a resin film 1A, and a shock absorbing layer 2A disposed on one surface of the resin film 1A As will be described later, a storage elastic modulus E of the shock absorbing layer at 25° C. and a frequency of $10^6$ Hz ($1.0 \times 10^6$ Hz) shows a value within a specific range. The optical film according to the embodiment of the present invention has the above-mentioned configuration and thereby realizes more excellent shock absorption property. For example, in a case where the optical film is used as a front surface plate of a touch panel or a front surface plate of a touch panel display, or is used as a polarizing plate protective film, it is possible to prevent damage to members inside the display even in a case where external shocks are applied, and thereby functions of the display can be maintained.

The resin film and the shock absorbing layer may be a single layer or have multiple layers.

(Film Thickness of Optical Film)

A film thickness of the optical film according to the embodiment of the present invention is preferably 20 μm or more and more preferably 40 μm or more from the viewpoint of a shock absorption property. It is practical that an upper limit value is 200 μm or less.

(Retardation in in-Plane Direction)

A retardation in an in-plane direction at a wavelength of 550 nm of the optical film is preferably smaller than 6,000 nm, that is, less than 6.000 nm, more preferably 1,000 nm or less, even more preferably 500 nm or less, and still more preferably 50 nm or less from the viewpoint of reducing interferential unevenness.

A phase difference (retardation) in the in-plane direction of the optical film is defined as R (unit: nm) represented by Equation (A) from a refractive index Nx on a fast axis, a refractive index Ny on a slow axis, and a thickness d (unit: nm) of the optical film, in a case where a linearly polarized light is incident on the optical film, and a light that has passed through the optical film is decomposed into two linearly polarized lights along the fast axis and the slow axis.

$$R=d\times(Nx-Ny) \quad (A)$$

In the present specification, the retardation in the in-plane direction at a wavelength of 550 nm is measured by allowing a light having a wavelength of 550 nm to be incident in a normal direction of a film or layer as a measurement target using KOBRA 21ADH (manufactured by Oji Scientific Instruments Co., Ltd.). In selecting a measurement wavelength, a wavelength selective filter can be replaced manually for measurement, or a measurement value can be converted by a program or the like for measurement A retardation in the in-plane direction can also be measured using AxoScan (AXOMETRICS).

Hereinafter, components of the film and layers constituting the optical film according to the embodiment of the present invention and preparation thereof will be described in detail.

(1) Resin Film (Material of Resin Film)

A material of the resin film used in the present invention is not particularly limited.

Examples of the resin film include an acrylic resin film, a polycarbonate (PC) resin film, a cellulose ester resin film such as a triacetyl cellulose (TAC) resin film, a polyethylene terephthalate (PET) resin film, a polyolefin resin film, a polyester resin film, a polyimide resin film, a polyamide resin film, a polyamideimide resin film, and an acrylonitrile-butadiene-styrene copolymer resin film. The resin film is preferably one of an acrylic resin film, a cellulose ester resin film, a polyethylene terephthalate resin film, and a polycarbonate resin film. It is more preferably a cellulose ester resin film and is even more preferably a cellulose acetate resin film from the viewpoint of moisture permeability.

Furthermore, the acrylic resin film means a polymer or copolymer resin film formed from at least one compound of acrylic acid ester or methacrylic acid ester. Examples of the acrylic resin film include a polymethyl methacrylate (PMMA) resin film.

A weight-average molecular weight of a resin is preferably 10,000 to 1,000,000 and is more preferably 100,000 to 1,000,000 from the viewpoint of increasing a tensile elastic modulus.

(Configuration of Resin Film)

Furthermore, a configuration of the resin film is not limited, and it may be a single layer or a laminate film consisting of two or more layers, of which the laminate film having two or more layers is preferable. The number of lamination layers of the laminate film is preferably two to ten layers, more preferably two to five layers, and even more preferably two or three layers. In the case of three or more layers, a film in which a composition of an outer layer differs from a composition of layers other than the outer layer (core layer and the like) is preferable. Alternatively, a film in which outer layers have the same composition is preferable.

Specific examples thereof include a film having a laminate structure of TAC-a/TAC-b/TAC-a, acryl-a/PC/acryl-a and PET-a/PET-b/PET-a, and a film having a polycarbonate resin single layer. Films having the same sign (a or b) (for example, TAC-a's) indicate films having the same composition.

(Additive)

The resin film may contain additives in addition to the resin (material) described above. Examples of additives include inorganic particles, matte particles, ultraviolet absorbers, fluorine-containing compounds, surface conditioners, leveling agents, and the like, which are described in a hard coat layer to be described later.

Additives can be used for forming the resin film for a resin melt obtained by mixing and melting the above-mentioned additive and a resin in a melt film-forming method to be described later, and for a dope solution obtained by mixing a solvent (for which the description in the hard coat layer to be described later can be applied), a resin, and the above-mentioned additive in a solution film-forming method to be described later.

(Tensile Elastic Modulus)

A tensile elastic modulus of the resin film can be changed depending on, for example, the type of resin constituting the resin film and generally, a tensile elastic modulus tends to increase by increasing at least one of a molecular weight or a degree of crystallinity of resin. In addition, it is possible to increase a tensile elastic modulus of the resin film in a stretching direction by stretching. Also in a case where the resin film consist of multiple layers, it means a tensile elastic modulus of the resin film.

A tensile elastic modulus of the resin film at 25° C. is preferably 2.0 GPa or more, more preferably 2.5 GPa or more, even more preferably 3.0 GPa or more, particularly preferably 3.5 GPa or more, and most preferably 4.0 GPa or more. An upper limit value thereof is not particularly limited, but it is practically 12.0 GPa or less.

The "tensile elastic modulus" of the resin film can be tested and calculated by the following method according to a method described in JIS K 7127.

A resin film having a length of 15 cm in a measurement direction and a width of 1 cm is cut out as a measurement sample. The cut measurement sample is installed in a tension tester (trade name "STROGRAPH-R2" manufactured by Toyo Seiki Seisaku-sho, Ltd.) such that a chuck interval in the measurement direction is 10 cm, and it is stretched under a condition of a measurement temperature of 25° C. at a stretching speed of 10 mm/min such that the chuck interval is widened, and thereby a stress-strain curve is obtained. A tensile elastic modulus at 25° C. is calculated by linear regression of the curve between two defined strains $\varepsilon_1=0.0005$ and $\varepsilon_2=0.0025$.

In a case where the resin film has anisotropy, in a plane perpendicular to a thickness direction of the resin film, an average of a tensile elastic modulus of the measurement sample in which an orientation direction having the largest degree of orientation is a long side and a tensile elastic modulus of the measurement sample in which a direction orthogonal to this orientation direction is a long side is a tensile elastic modulus of the resin film.

(Film Thickness)

A film thickness of the resin film is preferably 80 µm or more and more preferably 100 µm or more from the viewpoint of a shock absorption property. An upper limit value thereof is not particularly limited, but it is preferably 190 µm or less. In a case where the resin film is a laminate film having two or more layers as described above, a film thickness of the resin film means a film thickness of the laminate film.

A thickness of the resin film hardly changes before and after production of the optical film according to the embodiment of the present invention.

(Easy-Adhesion Layer)

Furthermore, the resin film used in the present invention may have an easy-adhesion layer. Regarding the easy-adhesion layer, it is possible to incorporate contents of a polarizer-side easy-adhesion layer and a method for manufacturing a polarizer-side easy-adhesion layer, which are described in paragraphs 0098 to 0133 of JP2015-224267A, into the present specification in accordance with the present invention.

In this case, the easy-adhesion layer is a layer constituting the resin film in the optical film according to the embodiment of the present invention (Method of Forming Resin Film)

The resin film may be formed by any method, and examples thereof include a melt film-forming method and a solution film-forming method <Melt Film-Forming Method and Smoothing>

In a case where the resin film is formed by a melt film-forming method, the method preferably includes a melting step of melting resin with an extruder, a step of extruding the melted resin into a sheet shape from a die, and a step of molding into a film shape Depending on materials of resins, a step of filtering the melted resin may be provided after the melting step, or the melted resin may be cooled in a case where it is extruded into a sheet shape.

Hereinafter, the melt film-forming method will be specifically described, but the present invention is not limited thereto.

[Method for Manufacturing Resin Film]

A method for manufacturing the resin film includes a melting step of melting resin with an extruder; a filtration step of filtering the melted resin through a filtration device equipped with a filter; a film-forming step of extruding the filtered resin into a sheet shape from a die, cooling and solidifying the extruded resin by closely attaching the resin onto a cooling drum, and thereby forming an unstretched resin film; and a stretching step of uniaxially or biaxially stretching the unstretched resin film.

A resin film can be manufactured by such a configuration. In a case where a pore size of the filter used in the filtration step of filtering the melted resin is 1 μm or less, foreign substances can be sufficiently removed. As a result, a surface roughness of the obtained resin film in a film width direction can be controlled.

Specifically, the method for manufacturing the resin film may include the following steps.

<Melting Step>

The method for manufacturing the resin film includes the melting step of melting resin with an extruder.

It is preferable that resin or a mixture of the resin and an additive be dried to a moisture content of 200 ppm or less, and then be introduced into a uniaxial (monoaxial) or biaxial extruder to be melted. In this case, it is also preferable to melt them in nitrogen or in vacuum in order to inhibit decomposition of the resin. The step can be performed wider detailed conditions with the aid of <0051> and <0052> of JP4962661B (<0085> and <0086> of US2013/0100378A) in accordance with these publications, and the contents of these publications are incorporated in the present specification.

The extruder is preferably a uniaxial kneading extruder.

Furthermore, it is also preferable to use a gear pump in order to improve accuracy of sending the melted resin (melting).

<Filtration Step>

The method for manufacturing the resin film includes the filtration step of filtering the melted resin through a filtration device equipped with a filter, in which a pore size of the filter used in the filtration step is preferably 1 μm or less.

In the filtration step, only one set of the filtration device having the filter having such a pore size range may be installed, or two or more sets thereof may be installed.

<Film-Forming Step>

The method for manufacturing the resin film includes the film-forming step of extruding the filtered resin into a sheet shape from a die, cooling and solidifying the extruded resin by closely attaching the resin onto a cooling drum, and thereby forming an unstretched resin film.

In a case where the melted (and kneaded) and filtered resin (melting containing the resin) is extruded into a sheet shape from the die, it may be extruded in a single layer or may be extruded in multiple layers. In the case of extrusion in multiple layers, for example, a layer containing an ultraviolet absorber and a layer not containing an ultraviolet absorber may be laminated, but a three-layer structure in which a layer containing an ultraviolet absorber is an inner layer is preferable from the viewpoint that then, a deterioration of a polarizer due to ultraviolet rays can be suppressed, and bleeding out of an ultraviolet absorber can be inhibited.

In a case where the resin film is manufactured by extrusion in multiple layers, a preferred thickness of an inner layer of the obtained resin film is preferably 50% to 99%, more preferably 60% to 99%, and even more preferably 70% to 99% with respect to a thickness of all layers. Such lamination can be performed using a feed block die, a multi-manifold die, or the like.

It is preferable that resin (melting containing the resin) extruded into a sheet shape from a die be extruded onto a cooling drum (casting drum) and cooled and solidified, and thereby an unstretched resin film (original sheet) be obtained in accordance with <0059> of JP2009-269301 A.

In the method for manufacturing the resin film, a temperature of the resin extruded from the die is preferably 280° C. to 320° C., and more preferably 285° C. to 310° C. In a case where a temperature of the resin extruded from the die in the melting step is 280° C. or higher, this is preferable from the viewpoint that then, a residual melt of a raw material resin can be reduced, and thereby generation of foreign substances can be inhibited. In a case where a temperature of the resin extruded from the die in the melting step is 320° C. or lower, this is preferable from the viewpoint that then, decomposition of resin can be reduced, and thereby generation of foreign substances can be inhibited.

In measuring a temperature of the resin extruded from the die, a surface of the resin can be measured in a contactless manner using a radiation-type thermometer (used with an emissivity of 0.95, model number: RT61-2, manufactured by Hayashi Denko Co., Ltd.).

In the method for manufacturing the resin film, it is preferable to use an electrostatic applying electrode in a case of closely attaching the resin onto the cooling drum in the film-forming step. Thereby, the resin can be strongly and closely attached onto the cooling drum so that a film surface is not roughened.

In the method for manufacturing the resin film described above, a temperature of the resin in a case where it is closely attached onto the cooling drum (in a case where the melted resin extruded from the die first comes into contact with the cooling drum) is preferably 280° C. or higher. Accordingly, electrical conductivity of the resin is increased, the resin can be strongly and closely attached onto the cooling drum by electrostatic application, and thereby roughening of the film surface can be inhibited.

In measuring a temperature of the resin in a case where it is closely attached onto the cooling drum, a surface of the resin can be measured in a contactless manner using a radiation-type thermometer (used with an emissivity of 0.95, model number: RT61-2, manufactured by Hayashi Denko Co., Ltd.).

<Stretching Step>

The method for manufacturing the resin film includes the stretching step of uniaxially or biaxially stretching the unstretched resin film.

In a machine-direction stretching step (a step of stretching in the same direction as a conveyance direction of the film), after the resin film is preheated, the resin film in a heated state is stretched in the conveyance direction using a roller group of rollers having different circumferential speeds (that is, different conveying speeds).

A preheating temperature in the machine-direction stretching step is preferably Tg−40° C. or higher and Tg+60° C. or lower, more preferably Tg−20° C. or higher and Tg+40° C. or lower, and even more preferably Tg or higher and Tg+30'C or lower, with respect to a glass transition temperature (Tg) of the resin film. In addition, a stretching temperature in the machine-direction stretching step is preferably Tg or higher and Tg+60° C. or lower, more preferably Tg+2° C. or higher and Tg+40° C. or lower, and even more preferably Tg+5° C. or higher and Tg+30° C. or lower. A stretching ratio in a machine direction is preferably 1.0 times to 2.5 times and is more preferably 1.1 times to 2 times.

In addition to or in place of the machine-direction stretching step, the resin film is subjected to cross-direction stretching in a width direction by a cross-direction stretching step (a step of stretching in a direction perpendicular to the conveyance direction of the film). In the cross-direction stretching step, for example, a tenter can be preferably used, and using this tenter, both end portions of the resin film in the width direction are gripped by clips and stretched in a cross direction. It is possible to increase a tensile elastic modulus of the resin film in the optical film by the cross-direction stretching.

The cross-direction stretching is preferably performed using a tenter, and a preferred stretching temperature is preferably Tg or higher and Tg+60° C. or lower, more preferably Tg+2° C. or higher and Tg+40'C or lower, and even more preferably Tg+4° C. or higher and Tg+30° C. or lower, with respect to a glass transition temperature (Tg) of the resin film. A stretching ratio is preferably 1.0 times to 5.0 times and is more preferably 1.1 times to 4.0 times. It is also preferable to relax the resin film in any one or both of the machine direction and the cross direction after the cross-direction stretching.

Furthermore, a variation in thickness depending on the location in a width direction and a longitudinal direction is preferably 10% or less, more preferably 8% or less, even more preferably 6% or less, particularly preferably 4% or less, and most preferably 2% or less.

Furthermore, the variation in thickness can be obtained as follows.

A stretched resin film is sampled for 10 m (meter), both end portions in a width direction of the film are removed by 20%, and 50 points are sampled at equal intervals from the central part of the film in each of a width direction and a longitudinal direction to measure a thickness.

An average value $Th_{TD-av}$, a maximum value $Th_{TD-max}$, and a minimum value $Th_{TD-min}$ of the thickness in the width direction are obtained, and the following expression shows a variation in thickness in the width direction.

$$(Th_{TD-max} - Th_{TD-min})/Th_{TD-av} \times 100[\%]$$

Furthermore, an average value $Th_{MD-av}$, a maximum value $Th_{MD-max}$, and a minimum value $Th_{MD-min}$ of the thickness in the longitudinal direction are obtained, and the following expression shows a variation in thickness in the longitudinal direction.

$$(Th_{MD-max} - Th_{MD-min})/Th_{MD-av} \times 100[\%]$$

It is possible to improve accuracy of the thickness of the resin film by the above stretching step.

The stretched resin film can be wound into a roll shape in a winding step. In this case, a winding tension of the resin film is preferably 0.02 kg/mm² or less.

Regarding other detailed conditions, contents described in <0134> to <0148> of JP2015-224267A for the melt film formation and contents described in JP2007-137028A for the stretching step can be incorporated in the present specification in accordance with the present invention <Solution Film-Forming Method and Smoothing>

In a case where the resin film is formed by a solution film-forming method, the method preferably includes a step of casting a dope solution on a casting band to form a casting film, a step of drying the casting film, and a step of stretching the casting film Specifically, it is preferable to form a film by a method described in JP4889335B.

In the present invention, the following method is preferably adopted.

Examples of methods include a method described in JP1999-123732A (JP-H11-123732A), in which a drying speed for the casting film is set to 300 mass %/min (=5 mass %/s) or less based on an amount of a solvent contained on a dry base to perform gentle drying. In addition, examples of methods further include a method described in JP2003-276037A, in which in a co-casting method of a casting film having a multilayer structure having skin layers (outer layers) on both surfaces of a core layer which is an interlayer, a viscosity of a dope solution forming the outer layer is decreased while ensuring strength of the casting film by increasing a viscosity of a dope solution forming the core layer. Preferred examples of methods include a method of rapidly drying a casting film to form a film on the surface of the casting film, and smoothing a surface state by a leveling effect of the formed film; a method of stretching a casting film; and the like.

The constitution of the resin film used in the present invention is not particularly limited as long as the effects of the present invention are exhibited. For example, in a case where a film thickness is set to a specific value or more, a resin film may be composed of one resin film as described above, or a resin film may be composed of a resin film in which a first resin film/an adhesion layer/a second resin film are laminated in this order, which is a laminate obtained by bonding two resin films via an adhesion layer.

Hereinafter, a resin film obtained by bonding two resin films via an adhesion layer will be described.

(Resin Film Formed by Bonding Two Resin Films Via Adhesion Layer)

In a case where two resin films bonded via an adhesion layer are the same film, this is preferable from the viewpoint that the optical film is then difficult to bend.

The term "same film" means that materials of resins constituting the resin films are the same (for example, both are TAC films). Among them, it is preferable that the resins have the same molecular weight, it is more preferable the resins have the same molecular weight and the same degree of crystallinity, and it is even more preferable that the resins have the same molecular weight, the same degree of crystallinity, and the same stretch ratio. Furthermore, in addition to the above description, it is more preferable that the two resin films have the same thickness.

The term "same" is not limited to being completely the same, and it includes being substantially the same Specifically, resin films are produced by the same manufacturing method (conditions in which a film thickness, stretching, and the like are the same), and errors that occur under these conditions are included.

That is, a difference in tensile elastic modulus between the two resin films bonded by the adhesion layer is preferably small. Specifically, it is preferably 4.0 GPa or less, more preferably 3.0 GPa or less, even more preferably 2.0 GPa or less, and particularly preferably 1.0 GPa or less.

(Thickness of Resin Film)

A thickness of each of the two resin films is preferably 40 to 160 μm, more preferably 50 to 160 μm, even more preferably 80 to 160 μm, and particularly preferably 100 to 160 μm from the viewpoint of manufacturing suitability.

(Adhesion Layer)

The adhesion layer is a layer that plays a role of bonding resin films to each other, and it is not particularly limited as long as it has a function of adhering two resin films.

The adhesion layer is preferably formed using a composition containing a component (adhesive) that exhibits adhesiveness by at least one of drying or reaction. For example, an adhesion layer formed using a composition containing a component exhibiting adhesiveness by a curing reaction (hereinafter referred to as a "curable composition") is a cured layer obtained by curing such a curable composition.

A resin can be used as an adhesive. In one aspect, the adhesion layer can be a layer in which a resin accounts for 50 mass % or more and preferably 70 mass % or more of this layer. As the resin, a single resin may be used, or a mixture of a plurality of resins may be used. In a case where a mixture of resins is used, a proportion of the above-mentioned resin means a proportion of the mixture of resins. Examples of the mixture of resins include a mixture of a certain resin and a resin having a structure obtained by partially modifying the resin, a mixture of a certain resin with a resin obtained by reacting a polymerizable compound different from a polymerizable compound constituting the certain resin, and the like.

As the adhesive, an adhesive having any appropriate property, form, and adhesion mechanism can be used. Specific examples thereof include water-soluble adhesives, ultraviolet curable type adhesives, emulsion adhesives, latex adhesives, mastic adhesives, multi-layer adhesives, paste adhesives, foam adhesives, supported film adhesives, thermoplastic adhesives, hot-melt adhesives, heat-solidifying adhesives, heat-activatable adhesives, heat-seal adhesives, thermosetting adhesives, contact adhesives, pressure sensitive adhesives, polymerization adhesives, solvent adhesives, solvent activated adhesives, and the like, of which water-soluble adhesives and ultraviolet curable type adhesives are preferred. Among them, water-soluble adhesives are preferably used because they are excellent in transparency, adhesiveness, workability, product quality, and economy.

The water-soluble adhesive may include natural or synthetic water soluble components such as proteins, starches, and synthetic resins. Examples of the synthetic resin include resole resin, urea resin, melamine resin, polyethylene oxide resin, polyacrylamide resin, polyvinylpyrrolidone resin, polyacrylic acid ester resin, polymethacrylic acid ester resin, polyvinyl alcohol resin, polyacrylic resin, and cellulose derivatives. Among them, a water-soluble adhesive containing a polyvinyl alcohol resin or a cellulose derivative is preferable because it has excellent adhesiveness in a case of bonding resin films. That is, the adhesion layer preferably contains a polyvinyl alcohol resin or a cellulose derivative.

The cellulose derivative means a modified cellulose. The cellulose derivative is not particularly limited, and known cellulose derivatives can be used. For example, HEC (hydroxyethyl cellulose) or the like can be used.

A weight-average molecular weight of the resin is preferably 1,000 or more and more preferably 10,000 or more from the viewpoint of increasing a tensile elastic modulus. An upper limit value is not particularly limited, but it is practically 1,000,000 or less.

Examples of the components optionally contained in the composition including the adhesive include crosslinking agents (such as boric acid and Safelink SPM-01 (trade name, manufactured by Nippon Synthetic Chemical Industry Co., Ltd.), and durability improvers (potassium iodide and the like).

(Tensile Elastic Modulus)

A tensile elastic modulus of the adhesion layer can be changed depending on, for example, the type of resin constituting the adhesion layer, and generally, a tensile elastic modulus tends to increase by increasing at least any one of a molecular weight or a degree of crystallinity of resin. In addition, in a case where the adhesion layer has a crosslinkable group, a tensile elastic modulus can be increased by increasing a degree of crosslinking of the adhesion layer by adding a crosslinking agent or the like. Furthermore, in a case where the adhesion layer contains a polymerizable compound, a tensile elastic modulus tends to be increased by reduction of a polymerizable group equivalent of a compound having a polymerizable group (a value obtained by dividing a molecular weight of this compound by a total number of polymerizable groups contained in the compound), improvement of a polymerization rate of the adhesion layer, addition of a highly elastic substance (such as inorganic particles) to the adhesion layer, addition of a compound containing a rigid molecular structure (for example, adamantane skeleton), and the like.

A tensile elastic modulus at 25° C. of the adhesion layer is preferably 2.0 GPa or more, more preferably 2.5 GPa or more, even more preferably 3.0 GPa or more, still more preferably 3.5 GPa or more, further still more preferably 4.0 GPa or more, particularly preferably 4.5 GPa or more, and most preferably 5.0 GPa or more. An upper limit value thereof is not particularly limited, but it is practically 12.0 GPa or less.

An elastic modulus of the adhesion layer can be calculated and tested by the same method as the tensile elastic modulus of the resin film, using a sample of the adhesion layer produced using a liquid for forming an adhesion layer.

(Thickness of Adhesion Layer)

A thickness of the adhesion layer is preferably 10 nm or more from the viewpoint of adhering two resin films, and it is more preferably 10 nm to 10 μm, even more preferably 10 nm to 5 μm, and still more preferably 10 nm to 1 μm from the viewpoint of reducing interferential unevenness.

The adhesion layer can be formed, for example, by applying a coating liquid containing an adhesive on at least one surface of the resin film and drying the coating liquid. Any appropriate method can be adopted as a method of preparing the coating liquid. As the coating liquid, for example, a commercially available solution or a dispersion liquid may be used, a solvent may be further added to the commercially available solution or dispersion liquid and used, and solid contents may be dissolved or dispersed in various solvents and used.

In one aspect, the adhesion layer may be a cured layer obtained by curing an active energy ray-curable composition. The active energy ray-curable composition for forming the adhesion layer is preferably a composition containing, as a active energy ray-curable component, a cationically polymerizable compound such as an epoxy compound, more specifically, an epoxy compound not having an aromatic ring in a molecule as described in JP2004-245925A. Examples of such an epoxy compound include a hydrogenated epoxy compound obtained by nuclear hydrogenation of an aromatic polyhydroxy compound, which is a raw material of an aromatic epoxy compound represented by diglycidyl ether of bisphenol A, and glycidyl etherification thereof; an alicyclic epoxy-based compound having at least one epoxy group bonded to an alicyclic ring in a molecule; an aliphatic epoxy compound represented by glycidyl ethers of aliphatic polyhydroxy compounds; and the like. Furthermore, in addition to a cationically polymerizable compound typified by an epoxy compound, an active energy ray-curable composition for forming the adhesion layer includes a polymerization initiator, for example, a photocationic polymerization initiator for initiating polymerization of a cationically polymerizable compound by generating a cationic species or Lewis acid by irradiation with active energy rays; and a photobase generator that generates a base upon irradiation with light. Furthermore, a thermal cationic polymerization initiator for initiating polymerization by heating, and various additives such as a photosensitizer may be contained.

(Difference in Tensile Elastic Modulus Between Resin Film and Adhesion Layer)

Each of a difference between a tensile elastic modulus at 25° C. of the two resin films to be bonded and a tensile elastic modulus at 25° C. of the adhesion layer is preferably 4.0 GPa or less, more preferably 3.5 GPa or less, even more preferably 3.0 GPa or less, still more preferably 2.5 GPa or less, further still preferably 2.0 GPa or less, particularly preferably 1.5 GPa or less, and most preferably 1.0 GPa or less.

In a case where the optical film according to the embodiment of the present invention has a resin film obtained by bonding two resin films with an adhesion layer, the optical film may also have an adhesion layer on a surface (the other surface) opposite to a surface having the adhesion layer. For example, a known polarizing plate protective film may be provided on the other surface via the adhesion layer. In a case where adhesion layers are provided on both sides of the resin film, a composition for forming each of the adhesion layer may be the same as or different from each other, and from the viewpoint of productivity, both sides preferably have the adhesion layers formed from the same composition.

A surface to which the adhesion layer is provided may be subjected to a surface treatment of at least one of a saponification treatment, a corona discharge treatment, or a plasma treatment, before providing the adhesion layer.

As the saponification treatment, for example, a cellulose ester resin film may be subjected to an alkali saponification treatment to enhance adhesiveness to a polarizer material such as polyvinyl alcohol.

As a saponification method, methods described in paragraph Nos. <0211> and <0212> of JP2007-086748A can be used.

For example, the alkali saponification treatment of a cellulose ester resin film is preferably performed in a cycle of immersing a film surface in an alkaline solution, and then neutralizing the film with an acidic solution, washing with water, and drying Examples of the alkaline solution include a potassium hydroxide solution and a sodium hydroxide solution A concentration of hydroxide ions is preferably 0.1 to 5.0 mol/L and is more preferably 0.5 to 4.0 mol/L. A temperature of the alkaline solution is preferably room temperature (25° C.) to 90° C., and is more preferably 40° C. to 70° C.

Instead of the alkali saponification treatment, easy adhesion process as described in JP1994-094915A (JP-1106-094915A) or JP1994-118232A (JP-H06-118232A) may be performed.

A known method can be used as a method of bonding the resin films to each other using an adhesive.

For example, at the same moving speed, a strip-shaped long first resin film or second resin film, which moves in a horizontal direction or a vertical direction, is allowed to approach a surface of one of the first resin film or second resin film, an adhesive that serves as an adhesive layer is applied such that it is located between the first resin film and the second resin film, and thereby two resin films can be bonded by applying pressure with a pinch roll. The applied adhesive may be diluted with a solvent so that a material constituting the adhesive layer can be applied. In this case, the solvent in the adhesive layer is dried to complete the adhesion of the two resin films. A drying temperature in this case depends on the type of solvent in the adhesive layer, the type of resin, and a thickness of the two resin films, but it is preferably 30° C. to 85° C., and is more preferably 45° C. to 8° C. in a case where the solvent in the adhesive layer is water, for example.

In addition, an adhesive that serves as an adhesive layer is applied to one or both of two resin films and subjected to a drying treatment to remove a solvent contained in the adhesive layer, and thereby the adhesive layer is formed on the resin film. Thereafter, at the same moving speed, the resin film is allowed to approach a surface of the other resin film on which the adhesive layer is formed, the other resin film having the strip-shaped long adhesive layer that moves in a horizontal direction or a vertical direction, a solvent for swelling the adhesive layer is applied between the two resin films on which the adhesive layer is formed, and thereby the two resin films can be bonded by applying pressure with a pinch roll. In this case, the solvent is dried to complete the adhesion of the two resin films. A drying temperature in this case depends on the type of solvent, the type of resin, and a thickness of the two resin films, but it is preferably 30° C. to 85° C., and is more preferably 45° C. to 80° C. in a case where the solvent is water, for example, (2) Shock Absorbing Layer The optical film according to the embodiment of the present invention has a shock absorbing layer on at least one surface of the resin film. A storage elastic modulus E' at 25° C. and a frequency of $10^6$ Hz ($1.0 \times 10^6$ Hz) of this shock absorbing layer satisfies 1 GPa or less ($1.0 \times 10^3$ MPa or less). The shock absorbing layer can sufficiently absorb shocks received from the outside. Accordingly, for example, in a case where the optical film according to the embodiment of the present invention is used as a front surface plate of a touch panel or a front surface plate of a touch panel display or as a polarizing plate protective film, it is possible to prevent damage to members inside the display.

In a case where the optical film according to the embodiment of the present invention is used for a rear-side polarizing plate, a storage elastic modulus E' at 25° C., and a frequency of $10^6$ Hz ($1.0 \times 10^6$ Hz) of the shock absorbing layer is preferably 700 MPa or less, is more preferably 300 MPa or less, is even more preferably 100 MPa or less, and is particularly preferably 10 MPa or less. A lower limit of the storage elastic modulus E' is not particularly limited, but it is practically 1 MPa or more.

In a case where the rear-side polarizing plate has two or more optical films according to the embodiment of the present invention, it is preferable that the shock absorbing layer located on the most invisible side have the above-mentioned preferred storage elastic modulus E'.

In a case where the optical film according to the embodiment of the present invention is used for the front-side polarizing plate, a storage elastic modulus E at 25° C., and a frequency of $10^6$ Hz ($1.0 \times 10^6$ Hz) of the shock absorbing layer is preferably 10 MPa to 700 MPa, is more preferably 10 MPa to 300 MPa, and is even more preferably 10 MPa to 100 MPa.

In a case where the front-side polarizing plate has two or more optical films according to the embodiment of the present invention, it is preferable that the shock absorbing layer located on the most visible side have the above-mentioned preferred storage elastic modulus E'.

At 25° C., the shock absorbing layer preferably has a maximum value of tan δ in a frequency range of $10^{-1}$ to $10^{15}$ Hz ($1.0 \times 10^{-1}$ to $1.0 \times 10^{15}$ Hz), more preferably has a maximum value in a frequency range of $10^3$ to $10^{15}$ Hz ($1.0 \times 10^3$ to $1.0 \times 10^{15}$ Hz), even more preferably has a maximum value in a frequency range of 10 to $10^{15}$ Hz, and particularly preferably has a maximum value in a frequency range of $10^5$ to $10^{10}$ Hz ($1.0 \times 10^5$ to $1.0 \times 10^{10}$ Hz). In this case, at 25° C., it is sufficient that the shock absorbing layer has at least one maximum value of tan δ in a frequency range of $10^{-1}$ to $10^{15}$ Hz, or it may have two or more maximum values of tan δ in a frequency range of $10^{-1}$ to $10^{15}$ Hz. Furthermore, it may have a maximum value of tan δ in a frequency range outside the frequency range of $10^{-1}$ to $10^{15}$ Hz, and this maximum value may be the maximum value of tan δ of the shock absorbing layer.

The maximum value of tan δ in the above-mentioned preferred frequency range at 25° C. of the shock absorbing layer is preferably 1.0 or more, and more preferably 1.5 or more from the viewpoint of further improving a shock absorption property.

In a case where the rear-side polarizing plate has two or more optical films according to the embodiment of the present invention, it is preferable that the shock absorbing layer located on the most invisible side have the above-mentioned preferred maximum value of tan δ.

In addition, in a case where the front-side polarizing plate has two or more optical films according to the embodiment of the present invention, it is preferable that the shock absorbing layer located on the most visible side have the above-mentioned preferred maximum value of tan δ.

On the other hand, in a case where the optical film according to the embodiment of the present invention is used for the rear-side polarizing plate of a liquid crystal panel, tan δ at 25° C. of the shock absorbing layer is preferably 3.0 or less, more preferably 1.0 or less, even more preferably 0.5 or less, and particularly preferably 0.3 or less in a range of $10^{-1}$ to $10^6$ Hz ($1.0 \times 10^{-1}$ to $1.0 \times 10^6$ Hz).

In a case where the rear-side polarizing plate has two or more optical films according to the embodiment of the present invention, it is preferable that the shock absorbing layer located on the most invisible side satisfy the definition of the above-mentioned preferred tan δ

[Measurement of Storage Elastic Modulus by Dynamic Viscoelasticity Measurement and Calculation of Tan δ]

In the present invention, the storage elastic modulus E' at 25° C., and in a frequency of $10^6$ Hz is obtained by a tensile deformation mode using a dynamic viscoelasticity measurement device. In addition, regarding a relationship between a frequency and tan δ at 25° C. of the shock absorbing layer, similarly, a graph of frequency-tan δ is created by a tensile deformation mode using a dynamic viscoelasticity measurement device, and a maximum value of tan δ, and a frequency showing the maximum value are obtained.

Specifically, a method described below is used.

<Sample Production Method>

A coating liquid obtained by dissolving in a solvent, or melting a shock absorption material (also referred to as a shock absorbing layer material or a shock absorbing layer constituent material), such as a composition for forming a shock absorbing layer to be described later, is applied to a peeling-treated surface of a peeling polyethylene terephthalate (PET) sheet that has been subjected to a peeling treatment such that a thickness after drying is 40 μm, and the composition is dried. Thereafter, the shock absorbing layer is peeled from the peeling PET sheet to produce a test piece of the shock absorbing layer.

<Measurement Method>

Using a dynamic viscoelasticity measurement device (trade name: DVA-225, manufactured by IT Measurement and Control Co., Ltd.), the measurement is performed on the above-mentioned test piece, which is preliminarily conditioned for 2 hours or longer in an atmosphere at a temperature of 25° C., and a relative humidity of 60%, in a "step temperature rise/frequency dispersion" mode under the following conditions. Thereafter, a master curve of tan δ, a storage elastic modulus, and a loss elastic modulus with respect to a frequency at 25° C. are obtained by editing the "master curve." A maximum value of tan δ and a frequency showing the maximum value are obtained from the obtained master curve.

Sample: 5 mm×50 mm
Test mode: Tensile deformation mode
Grip distance: 20 mm
Setting distortion: 0.10%
Measurement temperature: −100° C. to 40° C.
Temperature rising condition: 2° C./min (Shock Absorbing Layer Constituent Material)

Regarding a shock absorbing layer constituent material constituting the shock absorbing layer in which a storage elastic modulus E' at 25° C., and a frequency of $10^6$ Hz ($1.0 \times 10^6$ Hz) is 1 GPa or less, in a case where the optical film according to the embodiment of the present invention is used as a front surface plate of a touch panel or a front surface plate of a touch panel display, or as a polarizing plate protective film, the shock absorbing layer may be made of resin, or may be made of an elastomer (including oil-extended rubber) as long as it has transparency that can ensure visibility of display contents and can prevent damage to members inside the display due to external shocks.

Examples of the resin include a polystyrene resin, a polyamide resin, a urethane resin, a (meth)acrylate resin (also referred to as a (meth)acrylic resin, and means a (meth)acrylic acid ester resin), modified resins of these resins, and the like. Examples of the urethane resin include a urethane-modified polyester resin, a urethane resin, and the like.

Among the above resins, a (meth)acrylate resin is preferable.

Examples of the elastomer include elastomers formed of at least one of a block (co)polymer of a conjugated diene and a hydrogenated product thereof, a (meth)acrylic block (co)polymer (for example, it means a (co)polymer having a poly(meth)acrylic acid ester as a block unit), a styrene block (co)polymer and a hydrogenated product thereof (a (co)polymer having a polymer (preferably polystyrene) of an aromatic vinyl compound as a block unit and a hydrogenated product thereof, for example, a block copolymer of a polymer of an aromatic vinyl compound and a polymer containing a conjugated diene, and a hydrogenated product of the block copolymer of the polymer of an aromatic vinyl compound and the polymer containing a conjugated diene), an ethylene-α-olefin copolymer, a polar group-modified olefin copolymer, or a polar group-modified olefin copolymer and a metal ion and a metal compound; nitrile rubber such as acrylonitrile butadiene rubber; butyl rubber; acrylic rubber thermoplastic elastomers such as a thermoplastic polyolefin elastomer (TPO), a thermoplastic polyurethane elastomer (TPU), a thermoplastic polyester elastomer (TPEE), a thermoplastic polyamide elastomer (TPAE), and a diene elastomer (1,2-polybutadiene and the like); silicone elastomers; fluorine-based elastomers; and the like.

However, the block (co)polymer of a conjugated diene does not include a polystyrene block.

As the elastomer, a (meth)acrylic block (co)polymer, or a styrene block (co)polymer and a hydrogenated product thereof are preferable. Preferred examples of (meth)acrylic block (co)polymers include a block copolymer of polymethyl methacrylate and poly n-butyl acrylate (also referred to as a "PMMA-PnBA block copolymer"), and the like. Preferred examples of styrene block (co)polymers and hydrogenated products thereof include a block copolymer of a polymer containing at least one of isoprene or butadiene and polystyrene, and a hydrogenated product thereof. The polymer containing at least one of isoprene or butadiene may contain, for example, butene as a constituent component other than isoprene and butadiene.

Among them, the elastomer is more preferably a (meth) acrylic block (co)polymer or a hydrogenated product of a styrene block (co)polymer, and is even more preferably a PMMA-PnBA copolymer, or a hydrogenated product of a block copolymer of a polymer containing at least one of isoprene or butadiene and polystyrene.

The above-mentioned resin or elastomer that can be contained in the shock absorbing layer may be synthesized by a known method, or commercially available products may be used. Examples of commercially available products include KURARITY LA1114, KURARITY LA2140, KURARITY LA2250, KURARITY LA2330, KURARITY LA4285, HYBRAR 5127, HYBRAR 7311F, SEPTON 2104, and SEPTON 2063 (all manufactured by Kuraray Co., Ltd.), and the like.

The shock absorbing layer is preferably formed by using at least one of the above resins or elastomers.

A weight-average molecular weight of the above resin or elastomer is preferably 10,000 to 1,000,000, and is more preferably 50,000 to 500,000, from the viewpoint of balance between solubility in a solvent and a storage elastic modulus.

In a case where these resins or elastomers constitute the shock absorbing layer, only these resins or elastomers (polymers) can be used as constituent materials.

Furthermore, as will be described later, in a case where the shock absorbing layer is formed by using various additives in addition to the above-mentioned resin or elastomer, in consideration of the above-mentioned storage elastic modulus in the shock absorbing layer, a content of the above resin or elastomer in solid contents constituting the shock absorbing layer is preferably 10 mass % or more, more preferably 15 mass % or more, and even more preferably 20 mass % or more. In addition, a content of the resin or elastomer is not particularly limited, but for example, it is preferably 99.9 mass % or less, more preferably 95 mass % or less, and even more preferably 90 mass % or less.

In a case where the shock absorbing layer is formed using a polymerizable group-containing compound and a polymerization initiator which will be described later together with the resin or elastomer, and in a case where the shock absorbing layer is formed using a polymerizable group-containing compound and a polymerization initiator which will be described later without using the resin or elastomer, a content of these constituent materials (resin, elastomer, polymerizable group-containing compound, and polymerization initiator) in a total solid content can apply the above description of the content of the resin or elastomer.

Furthermore, it is possible to form the shock absorbing layer using, in addition to the above resins or elastomers, additives such as softeners, plasticizers, lubricants, crosslinking agents, auxiliary crosslinking agents, photosensitizers, antioxidants, anti-aging agents, heat stabilizers, flame retardants, antibacterial agents, antifungal agents, weathering agents, ultraviolet absorbers, viscosity imparting agents, nucleating agents, pigments, dyes, organic fillers, inorganic fillers, silane coupling agents, and titanium coupling agents; polymerizable group-containing compounds; polymerization initiators; or compositions containing polymers other than the above resins or elastomers (hereinafter also referred to as other polymers), as constituent materials. That is, the shock absorbing layer may be formed using a resin composition or an elastomer composition.

Hereinafter, the composition used for forming the shock absorbing layer is referred to as a composition for forming a shock absorbing layer.

Inorganic fillers to be added to the shock absorbing layer are not particularly limited, but for example, it is possible to use silica particles, zirconia particles, alumina particles, mica, and talc, and one kind thereof may be used alone or two or more kinds thereof may be used in combination. Silica particles are preferable from the viewpoint of dispersibility in the shock absorbing layer.

A surface of an inorganic filler may be treated with a surface modifier having a functional group capable of bonding to or adsorbing on to the inorganic filler in order to enhance affinity with a resin constituting the shock absorbing layer. Examples of such a surface modifier include silane surface modifiers; surface modifiers of metal alkoxides such as aluminum, titanium, and zirconium; and surface modifiers having an anionic group such as a phosphoric acid group, a sulfuric acid group, a sulfonic acid group, and a carboxylic acid group.

In consideration of balance between a storage elastic modulus and tan δ in the shock absorbing layer, a content of the inorganic filler is preferably 1 to 40 mass %, more preferably 5 to 30 mass %, and even more preferably 5 to 15 mass % in solid contents constituting the shock absorbing layer A size (average primary particle size) of the inorganic filler is preferably 10 nm to 100 nm, and more preferably 15 to 60 nm. An average primary particle size of the inorganic filler can be obtained from an electron micrograph. In a case where a particle size of the inorganic filler is the above-mentioned preferred lower limit value or more, the effect of improving a storage elastic modulus is exhibited; and in a case where it is the above-mentioned preferred upper limit value or less, the inorganic filler does not cause the increase of haze. A shape of the inorganic filler may be any of plate-like, spherical, or non-spherical.

Specific examples of inorganic fillers include ELCOM V-8802 (spherical silica microparticles having an average primary particle size of 12 nm, manufactured by JGC Catalysts and Chemicals Ltd.). ELCOM V-8803 (deformed silica microparticles manufactured by JGC Catalysts and Chemicals Ltd.), MIBK-ST (spherical silica microparticles having an average primary particle size of 10 to 20 nm, manufactured by Nissan Chemical Industries. Ltd.), MEK-AC-2140Z (spherical silica microparticles having an average primary particle size of 10 to 20 nm, manufactured by Nissan Chemical Industries, Ltd.) MEK-AC-4130 (spherical silica microparticles having an average primary particle size of 40 to 50 nm, manufactured by Nissan Chemical Industries. Ltd.), MIBK-SD-L (spherical silica microparticles having an average primary particle size of 40 to 50 nm, manufactured by Nissan Chemical Industries, Ltd.), MEK-AC-5140Z (spherical silica microparticles having an average primary particle size of 70 to 100 nm, manufactured by Nissan Chemical Industries. Ltd.), and the like.

A viscosity imparting agent to be added to the shock absorbing layer is not particularly limited, and it is possible to use, for example, a rosin ester resin, a hydrogenated rosin ester resin, a petrochemical resin, a hydrogenated petrochemical resin, a terpene resin, a terpene phenol resin, an aromatic modified terpene resin, a hydrogenated terpene resin, and an alkylphenol resin. One kind of these viscosity imparting agents may be used alone, or two or more kinds thereof may be used in combination.

In consideration of balance between a storage elastic modulus and tan δ in the shock absorbing layer, a content of the viscosity imparting agent is preferably 1 to 80 mass % and is more preferably 5 to 70 mass % in solid contents constituting the shock absorbing layer.

Specific examples of viscosity imparting agents include SUPER ESTER A75, SUPER ESTER A115, and SUPER ESTER A125 (all of which are rosin ester resins manufactured by ARAKAWA CHEMICAL INDUSTRIES, LTD.); Petrotack 60, Petrotack 70, Petrotack 90. Petrotack 100, Petrotack 100V, and Petrotack 90HM (all of which are petrochemical resins manufactured by TOSOH CORPORATION); YS POLYSTER T30, YS POLYSTER T80. YS POLYSTER T00, YS POLYSTER T115, VS POLYSTER T130. YS POLYSTER T145, and YS POLYSTER T160 (all of which are terpene phenol resins manufactured by YASUHARA CHEMICAL CO., LTD.); YS RESIN PX800, YS RESIN PX100), YS RESIN PX1150, and YS RESIN PX1250 (all of which are terpene resins manufactured by YASUHARA CHEMICAL CO., LTD.); and the like.

A softener to be added to the shock absorbing layer is not particularly limited, and it is possible to use at least one of, for example, mineral oil softeners such as a naphthenic softener, a paraffinic softener, and an aromatic softener; softeners of vegetable oils such as castor oil, cottonseed oil, linseed oil, rapeseed oil, soybean oil palm oil, coconut oil, peanut oil, sumac wax, pine oil, and olive oil, various types of rubber for softeners such as synthetic type; or softeners for resins. The number average molecular weight of the softener is preferably 200 or more and more preferably 300 or more from the viewpoint of suppressing bleeding out, and it is preferably 1,000 or less and more preferably 800 or less from the viewpoint of suppressing a stickiness sensation.

In consideration of balance between a storage elastic modulus and tan δ in the shock absorbing layer, a content of the softener is preferably 70 mass % or less and is more preferably 10 mass % to 50 mass % in solid contents constituting the shock absorbing layer.

Specific examples of softeners include MORESCO WHITE P-40, MORESCO WHITE P-55. MORESCO WHITE P-60, MORESCO WHITE P-70, MORESCO WHITE P-80. MORESCO WHITE P-100. MORESCO WHITE P-120. MORESCO WHITE P-150. MORESCO WHITE P-200, MORESCO WHITE P-260, and MORESCO WHITE P-350P (all of which are paraffinic oils manufactured by MORESCO Corporation), Diana Process Oil NS-24, Diana Process Oil NS-100, Diana Process Oil NM-26. Diana Process Oil NM-68, Diana Process Oil NM-150, Diana Process Oil NM-280, Diana Process Oil NP-24, Diana Process Oil NU-80, and Diana Process Oil NF-90 (all of which are naphthenic oils manufactured by Idemitsu Kosan Co, Ltd.); Diana Process Oil AC-12, Diana Process Oil AC-460, Diana Process Oil AE-24. Diana Process Oil AE-50, Diana Process Oil AE-200, Diana Process Oil AH-16, and Diana Process Oil AH-58 (all of which are aromatic oils manufactured by Idemitsu Kosan Co., Ltd.), and the like.

A polymerizable group-containing compound, which can be contained in the composition for forming a shock absorbing layer, such as a resin composition or elastomer composition which is used for forming the shock absorbing layer, may be any of a polymerizable group-containing polymer, a polymerizable group-containing oligomer, or a polymerizable group-containing monomer, or may be an elastomer (including rubber) having a polymerizable group. Specific examples thereof include commercially available products such as ART CURE RA331 MB and ART CURE RA341 (trade names, both manufactured by Negami Chemical Industrial Co., Ltd.), KURARAY LIQUID RUBBER UC-102M and KURARAY LIQUID RUBBER 203M (trade names, both manufactured by Kuraray Co., Ltd.), and SeRM Elastomer SE13400M (trade name, manufactured by Advanced Softmaterials Inc.), and a radically polymerizable compound and a cationically polymerizable compound to be described later.

In a case where a resin composition or elastomer composition which is used for forming the shock absorbing layer contains a polymerizable group-containing compound, the composition preferably further contains a polymerization initiator. Specific examples of polymerization initiators include a polymerization initiator to be described later.

The shock absorbing layer is also preferably formed using a composition for forming a shock absorbing layer which does not contain the above-mentioned resins or elastomers but has at least a polymerizable group-containing compound and a polymerization initiator. Among them, preferred examples thereof include a shock absorbing layer obtained by curing using a composition having a rubber such as polyisoprene having a radically polymerizable group as a polymerizable group and a polymerization initiator.

(Thickness of Shock Absorbing Layer)

A thickness of the shock absorbing layer is preferably 1 μm to 100 m, more preferably 5 μm to 80 μm, and even more preferably 10 μm to 80 μm, from the viewpoint of further improving a shock absorption property (Method of Forming Shock Absorbing Layer)

A method of forming the shock absorbing layer is not particularly limited, and examples thereof include a coating method, a casting method (a solvent-free casting method and a solvent casting method), a pressing method, an extrusion method, an injection molding method, a cast molding method, an inflation method, and the like. Specifically, a liquid material obtained by dissolving or dispersing the shock absorbing layer constituent material in a solvent, or a melt of components (specifically, the above-mentioned resins or elastomers, and the like) constituting the shock absorbing layer constituent material is prepared. Next, this liquid material or melt is applied to a resin film. Thereafter, the solvent is removed as necessary, and thereby it is possible to produce a shock absorbing layer on a resin film (or a resin film to which an HC layer is attached).

The above-mentioned solvent is not particularly limited, and for example, it is possible to apply the description of the solvent in the curable composition for forming an HC layer. Preferred examples thereof include methyl isobutyl ketone, toluene, and the like.

Furthermore, a formulation ratio of the solvent and solid contents is not particularly limited and can be appropriately adjusted. For example, a proportion of solid contents can be set to 10 to 90 mass % with respect to a total amount of the solvent and the solid contents.

In addition, in the same manner as above, the shock absorbing layer material is applied to a peeling-treated surface of a peeling sheet that has been subjected to a peeling treatment, and the material is dried to form a sheet having a shock absorbing layer. The shock absorbing layer of this sheet is bonded to a resin film, and thereby it is possible to produce the shock absorbing layer on the resin film (or a resin film to which an HC layer is attached).

In a case where the shock absorbing layer is made of resin, the shock absorbing layer may be made of non-crosslinked resin, or may be made of cross-linked resin of which at least a part is crosslinked. A method of crosslinking resin is not particularly limited, and examples thereof include means selected from methods using electron beam irradiation, ultraviolet irradiation, and a crosslinking agent (for example, organic peroxide and the like). In a case where resin is crosslinked by electron beam irradiation, the obtained shock absorbing layer before crosslinking is irradiated with an electron beam using an electron beam irradiation device, and thereby crosslink can be formed. Furthermore, in a case of ultraviolet irradiation, the obtained shock absorbing layer before crosslinking is irradiated with ultraviolet rays using an ultraviolet irradiation device, and thereby crosslink can be formed due to an effect of a photosensitizer such as a photopolymerization initiator blended in as necessary. Furthermore, in a case where a crosslinking agent is used, the obtained shock absorbing layer before crosslinking is heated generally in an atmosphere in which no air is present, such as a nitrogen-free atmosphere, and thereby crosslink can be formed by a crosslinking agent such as an organic peroxide which is blended in as necessary, and further by an auxiliary crosslinking agent.

In a case where the polymerizable group-containing compound is contained, it is preferable to perform crosslinking by any method using electron beam irradiation, ultraviolet irradiation, and a crosslinking agent to form the shock absorbing layer.

(Protective Film Layer for Shock Absorbing Layer)

The optical film according to the embodiment of the present invention preferably includes a peelable protective film layer on a surface of the shock absorbing layer opposite to the resin film. By providing such a protective film layer, it is possible to prevent the shock absorbing layer of the optical film from being damaged before use and to prevent dust and dirt from adhering, and it can be used by peeling off the protective film layer at the time of use.

The protective film layer of the shock absorbing layer means a different layer from the protective film of the polarizing plate or the like used in a state of being incorporated in a product as a constituent member in that it is peeled off before use.

A peeling layer may be provided between the protective film layer and the shock absorbing layer to facilitate peeling of the protective film layer. A method of providing such a peeling layer is not particularly limited, and for example, it can be provided by applying a peeling coating agent on a surface of at least one of the protective film layer or the shock absorbing layer. The type of peeling coating agent is not particularly limited, and examples thereof include a silicone coating agent, an inorganic coating agent, a fluorine coating agent, and an organic-inorganic hybrid coating agent.

An optical film including a protective film layer and a peeling layer can be usually obtained by providing a peeling layer on the surface of the protective film layer and then laminating it on the surface of the shock absorbing layer. In this case, the peeling layer may be provided not on the surface of the protective film layer but on the surface of the shock absorbing layer.

(3) Hard Coat Layer (HC Layer)

Figure 2:
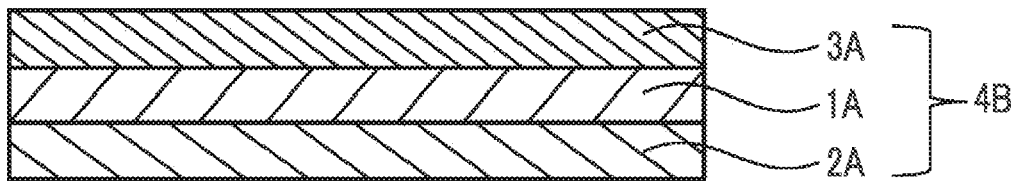
FIG. 2 is a vertical cross-sectional view showing one embodiment of a configuration of an optical film of the present invention including a hard coat layer.

As shown in FIG. 2, the optical film according to the embodiment of the present invention may include a hard coat layer (HC layer and 3A) on the opposite surface of the resin film 1A on which the shock absorbing layer 2A is disposed. The optical film according to the embodiment of the present invention including this hard coat layer may be used as a protective film of a front-side polarizing plate or a front surface plate of a touch panel. In this case, the hard coat layer is disposed on the visible side, and the shock absorbing layer faces the polarizer That is, the front-side polarizing plate has a laminate structure in which a hard coat layer, a resin film, a shock absorbing layer, and a polarizer are disposed in this order from the visible side; and the front surface plate of the touch panel has a laminate structure in which a hard coat layer, a resin film, a shock absorbing layer, and a touch sensor film are disposed in this order from the visible side.

The HC layer in the present invention is preferably formed by polymerizing and curing of a polysiloxane-containing compound having a polymerizable group in the molecule, a fluorine-containing compound having a polymerizable group in the molecule, and in addition to these compounds, a polymerizable compound having a polymerizable group in the molecule to be described later. It is more preferable that these polymerizable groups be radically polymerizable groups. Accordingly, in the HC layer, the polysiloxane-containing compound and the fluorine-containing compound are present in a state of being bonded to the polymerizable compound forming the HC layer, and thereby a more excellent antifouling property can be imparted. In a case where the polysiloxane-containing compound and the fluorine-containing compound used for forming the HC layer have a polymerizable group, the polymerizable group in the polysiloxane-containing compound and the fluorine-containing compound, which will be described later, is present in the HC layer in a state of reacting to form a bond.

In a case where the HC layer has a laminate structure of two or more layers to be described later, the polysiloxane-containing compound and the fluorine-containing compound are preferably contained at least in an HC layer farthest from the resin film, and are more preferably contained only in an HC layer farthest from the resin film.

Hereinafter, a specific aspect of the HC layer will be described, but the present invention is not limited to the following aspect.

[Fluorine-Containing Compound]

The fluorine-containing compound in the present invention is not particularly limited as long as it can impart rub resistance to the HC layer by being used in combination with the polysiloxane-containing compound, and it is possible to use a compound having a fluorine atom in a molecule. As the fluorine-containing compound, a fluorine-containing antifouling agent having properties of an antifouling agent is preferably used.

In the present invention, the fluorine-containing compound may be any of a monomer, an oligomer, or a polymer. The fluorine-containing compound preferably has a substituent that contributes to bond formation or compatibility with other components (for example, a polysiloxane-containing compound, a polymerizable monomer and resin that are constituent components of resin) in the HC layer. Substituents may be the same as or different from each other, and it is preferable that there be a plurality of substituents.

The substituent is preferably a polymerizable group, and it is sufficient that the substituent is a polymerizable reactive group exhibiting any of radically polymerizable, cationically polymerizable, anionically polymerizable, polycondensable, or addition polymerizable properties. Preferred examples of substituents include an acryloyl group, a methacryloyl group, a vinyl group, an allyl group, a cinnamoyl group, an epoxy group, an oxetanyl group, a hydroxyl group, a polyoxyalkylene group, a carboxyl group, an amino group, and the like. Among them, radically polymerizable groups are preferable, and among them, an acryloyl group or a methacryloyl group is particularly preferable.

The fluorine-containing compound may be a polymer or oligomer containing a compound not containing a fluorine atom as a copolymerization component.

The fluorine-containing antifouling agent is preferably a fluorine-based compound represented by General Formula (F).

$$(R^f)-[(W)-(R^A)_n]_m \quad \text{General Formula (F):}$$

(In the formula, $R^f$ represents a (per)fluoroalkyl group or a (per)fluoropolyether group, W represents a single bond or a linking group, and $R^A$ represents a polymerizable unsaturated group; n represents an integer of 1 to 3; and m represents an integer of 1 to 3, where a valence of the linking group for W is (n+1) valence.)

In General Formula (F), $R^A$ represents a polymerizable unsaturated group. The polymerizable unsaturated group is preferably a group (that is, a radically polymerizable group) having an unsaturated bond capable of causing a radical polymerization reaction by irradiation with active energy rays such as ultraviolet rays and electron beams. Examples thereof include a (meth)acryloyl group, a (meth)acryloyloxy group, a vinyl group, an allyl group, and the like, and a (meth)acryloyl group and a (meth)acryloyloxy group, and a group in which any hydrogen atom in these groups is substituted by a fluorine atom are preferably used.

In General Formula (F), $R^f$ represents a (per)fluoroalkyl group or a (per)fluoropolyether group.

The (per)fluoroalkyl group represents at least one of a perfluoroalkyl group or a fluoroalkyl group, which is substituted by at least one or more fluorine atoms. The (per)fluoropolyether group represents at least one of a perfluoropolyether group or a fluoropolyether group, which is substituted by at least one or more fluorine atoms. A content of fluorine atoms in $R^f$ is preferably large from the viewpoint of rub resistance.

The (per) fluoroalkyl group is preferably a group having 1 to 20 carbon atoms, and is more preferably a group having 1 to 10 carbon atoms.

The (per)fluoroalkyl group may have a linear structure (for example, $-CF_2CF_3$, $-CH_2(CF_2)_4H$, $-CH_2(CF_2)_8CF_3$, and $-CH_2CH_2(CF_2)_4H$), may have a branched structure (for example, $-CH(CF_3)_2$, $-CH_2CF(CF_3)_2$, $-CH(CH_3)CF_2CF_3$, and $-CH(CF_3)(CF_2)_5CF_2H$), or may have an alicyclic structure (preferably a 5-membered ring or a 6-membered ring, and for example, a perfluorocyclohexyl group and a perfluorocyclopentyl group and an alkyl group substituted with these groups).

The (per)fluoropolyether group refers to a case in which the (per)fluoroalkyl group has an ether bond, and it may be a monovalent group or a divalent or trivalent group Examples of the fluoropolyether group include $-CH_2OCH_2CF_2CF_3$, $-CH_2CH_2OCH_2C_4F_8H$, $-CH_2CH_2OCH_2CH_2C_8F_{17}$, $-CH_2CH_2OCF_2CF_2OCF_2CF_2H$, and fluorocycloalkyl groups having 4 or more fluorine atoms and having 4 to 20 carbon atoms. In addition, examples of the perfluoropolyether group include $-(CF_2O)_p-(CF_2CF_2O)_q-$, $-[CF(CF_3)CF_2O]_p-[CF(CF_3)]_q-$, $-(CF_2CF_2CF_2O)_p-$, $-(CF_2CF_2O)_p-$, and the like.

The above p and q each independently represent an integer of 0 to 20. Provided that p+q is an integer of 1 or more.

A total sum of p and q is preferably 1 to 83, more preferably 1 to 43, and even more preferably 5 to 23.

The fluorine-containing antifouling agent particularly preferably has a perfluoropolyether group represented by $-(CF_2O)_p-(CF_2CF_2O)_q-$ from the viewpoint of excellent rub resistance.

In the present invention, the fluorine-containing antifouling agent preferably has a perfluoropolyether group, and a plurality of polymerizable unsaturated groups in one molecule.

In General Formula (F), W represents a single bond or a linking group. Examples of the linking group for W include an alkylene group, an arylene group, and a heteroalkylene group, and a linking group formed by combining these groups. These linking groups may further have an oxy group (—O—) a carbonyl group, a carbonyloxy group, a carbonylimino group, a sulfonamide group, and the like, and a functional group in which these groups are combined.

W is preferably an ethylene group, and is more preferably an ethylene group bonded to a carbonylimino group.

A content of fluorine atoms in the fluorine-containing antifouling agent is not particularly limited, but it is preferably 20 mass % or more, more preferably 30 to 70 mass %, and even more preferably 40 to 70 mass %.

Examples of preferred fluorine-containing antifouling agents include, but are not limited to, R-2020, M-2020, R-3833, M-3833, and OPTOOL DAC (all of which are trade names) which are manufactured by DAIKIN INDUSTRIES, Ltd.; and MEGAFAC F-171, F-172, F-179A, RS-78, and RS-90, and Defencer MCF-300 and MCF-323 (all of which are trade names) manufactured by Dainippon Ink and Chemicals Inc.

A product of n and m (n×m) is preferably 2 or more and is more preferably 4 or more in General Formula (F) from the viewpoint of rub resistance.

In General Formula (F), in a case where both n and m are 1, specific examples of preferred aspects include General Formulas (F-1) to (F-3).

$$R^{f2}(CF_2CF_2)_pR^{22}CH_2CH_2R^{21}$$
$$OCOCR^{11}=CH_2 \quad \text{General Formula (F-1)}$$

(In the formula, $R^{f2}$ represents a fluorine atom or a fluoroalkyl group having 1 to 10 carbon atoms, $R^{11}$ represents a hydrogen atom or a methyl group, $R^{21}$ represents a single bond or an alkylene group, $R^{22}$ represents a single bond or a divalent linking group, and p is an integer indicating a degree of polymerization, where a degree of polymerization p is k (k is an integer of 3 or more) or more.)

In a case where $R^{22}$ represents a divalent linking group, examples of the divalent linking group include linking groups similar to the divalent linking group for W described above.

Examples of a telomer type (meth)acrylate containing a fluorine atom in General Formula (F-1) include partially or fully fluorinated alkyl ester derivatives of (meth)acrylic acid, and the like.

In a case where telomerization is used in the synthesis, depending on telomerization conditions and separation conditions of a reaction mixture, the compound represented by General Formula (F-1) may contain a plurality of fluorine-containing (meth)acrylic acid esters in which p's of $R^{f2}$ $(CF_2CF_2)R^{22}CH_2CH_2R^{21}O$—, which is a group represented by General Formula (F-1), are respectively k, k+1, k+2, . . . , and the like.

$F(CF_2)_q$—$CH_2$—$CHX$—$CH_2Y$            General Formula (F-2):

(in the formula, q is an integer of 1 to 20, and X and Y represent a (meth)acryloyloxy group or a hydroxyl group, where at least one of X or Y is a (meth)acryloyloxy group.)

The fluorinated (meth)acrylic acid ester represented by General Formula (F-2) has a fluoroalkyl group having to 20 carbon atoms and having a trifluoromethyl group (—$CF_3$) at the terminal. Trifluoromethyl groups are effectively oriented on a surface even there is only a small amount of fluorine-containing (meth)acrylic acid ester.

From the viewpoint of rub resistance and ease of production of the compound, q is preferably an integer of 6 to 20 and is more preferably an integer of 8 to 10. Fluorine-containing (meth)acrylic acid ester having a fluoroalkyl group having 8 to 10 carbon atoms exhibits an excellent effect of reducing a friction coefficient and has excellent rub resistance, as compared to other fluorine-containing (meth) acrylic acid ester having a fluoroalkyl group having another chain length (the number of carbon atoms).

Specific examples of the fluorine-containing (meth) acrylic acid ester represented by General Formula (F-2) include 1-(meth)acryloyloxy-2-hydroxy-4,4,5,5,6,6,7,7,8,8, 9,9,10,10,11,11,12,12,13,13,13-heneicosafluorotridecane, 2-(meth)acryloyloxy-1-hydroxy-4,4,5,5,6,6,7,7,8,8,9,9,10, 14),11,11,12,12,13,13,13-heneicosafluorotridecane, and 1,2-bis(meth)acryloyloxy 4,4,5,5,6,6,7,7,8,8,9,9,10,10,11, 11,12,12,13,13,13-heneicosafluorotridecane, and the like. In the present invention, 1-acryloyloxy-2-hydroxy-4,4,5,5,6,6, 7,7,8,8,9,9,10,10,11,11,12,12,13,13,13-heneicosafluorotridecane is preferred.

$F(CF_2)_r O(CF_2CF_2O)_5 CF_2CH_2OCOCR^3$=$CH_2$    General Formula (F-3):

(In the formula, W is a hydrogen atom or a methyl group, s is an integer of 1 to 20, and r is an integer of 1 to 4.)

The fluorine atom-containing monofunctional (meth) acrylate represented by General Formula (F-3) can be obtained by reacting a fluorine atom-containing alcohol compound represented by General Formula (FG-3) with a (methacrylic acid halide.

$F(CF_2)_r O(CF_2CF_2O)_s CF_2CH_2OH$        General Formula (FG-3):

(In General Formula (FG-3), s represents an integer of 1 to 20, and r represents an integer of 1 to 4)

Specific examples of the fluorine atom-containing alcohol compound represented by General Formula (FG-3) include 1H,1H-perfluoro-3,6-dioxaheptan-1-ol, 1H,1H-perfluoro-3, 6-dioxaoctane-1-ol, 1H,1H-perfluoro-3,6-dioxadecan-1-ol, 1H,1H-perfluoro-3,6,9-trioxadecan-1-ol, 1H,1H-perfluoro-3,6,9-trioxaundecan-1-ol, 1H,1H-perfluoro-3,6,9-trioxatridecan-1-ol, 1H,1H-perfluoro-3,6,9,12-tetraoxatridecan-1-ol, 1H,1H-perfluoro-3,6,9,12-tetraoxatetradecane-1-ol, 1H,1H-perfluoro-3,6,9,12-tetraoxahexadecane-1-ol, 1H,1H-perfluoro-3,6,9,12,15-pentaoxahexadecan-1-ol, 1H,1H-perfluoro-3,6,9,12,15-pentaoxaheptadecane-1-ol, 1H,1H-perfluoro-3,6,9,12,15-pentaoxanonadecan-1-ol, 1H,1H-perfluoro-3,6,9,12,15,18-hexaoxaicosane-1-ol, 1H,1H-perfluoro-3,6,9,12,15,18-hexaoxadocosane-1-ol, 1H,1H-perfluoro-3,6,9,12,15,18,21-heptaoxatricosan-1-ol, 1H,1H-perfluoro-3,6,9,12,15,18,21-heptaoxapentacosan-1-ol, and the like.

These are commercially available products, and specific examples thereof include 1H,1H-perfluoro-3,6-dioxaheptan-1-ol (trade name "C5GOL," manufactured by Exfloor), 1H, 1H-perfluoro-3,6,9-trioxadecan-1-ol (trade name "C7GOL," manufactured by Exfloor), 1H,1H-perfluoro-3, 6-dioxadecan-1-ol (trade name "C8GOL," manufactured by Exfloor), 1H,1H-perfluoro-3,6,9-trioxatridecan-1-ol (trade name "C10GOL," manufactured by Exfloor), 1H,1H-perfluoro-3,6,9,12-tetraoxahexadecane-1-ol (trade name "C12GOL," manufactured by Exfloor), and the like.

In the present invention, 1H,1H-perfluoro-3,6,9,12-tetraoxatridecan-1-ol is preferably used.

Furthermore, examples of the (meth)acrylic acid halide to be reacted with the fluorine atom-containing alcohol compound represented by General Formula (FG-3) include (meth)acrylic acid fluoride, (meth)acrylic acid chloride. (meth)acrylic acid bromide, and (meth)acrylic acid iodide. (Meth)acrylic acid chloride is preferable from the viewpoint of easy availability.

Specific preferred examples of the compound represented by General Formula (F-3) are shown below, but examples are not limited thereto. Specific preferred examples represented by General Formula (F-3) are also described in JP2007-264221A.

$F_9C_4OC_2F_4OC_2F_4OCF_2CH_2OCOCH$=$CH_2$          (b-1):

$F_9C_4OC_2F_4OC_2F_4OCF_2CH_2OCOC(CH_3)$=$CH_2$      (b-2):

Furthermore, in addition to the compound represented by General Formula (F-3), a compound represented by General Formula (F-3)' can also be preferably used.

$R^{f3}$—$[(O)_c(O$=$C)_b(CX^4X^5)_a$— $CX^3$=$CX^1X^2]$        General Formula (F-3)';

(In the formula, $X^1$ and $X^2$ represent H or F; $X^3$ represents H, F, $CH_3$, or $CF_3$; $X^4$ and $X^5$ represent H, F, or $CF_3$; a, b, and c represent 0 or 1; and $R^{f3}$ represents a fluorine-containing organic group having 18 to 200 carbon atoms and containing an ether bond.)

The compound represented by General Formula (F-3)' is a fluorine-containing unsaturated compound having 6 or more repeating units represented by General Formula (FG-3)'; —$(CX^6_2CF_2CF_2O)$— (in the formula, $X^6$ is F or H) in the $R^{f3}$ group.

Examples of the fluorine-containing polyether compound represented by General Formula (F-3) include the following formulas and the like.

$R^{f3}$—$[(O)(O$=$C)_b$—$CX^3$=$CX^1X^2]$                (c-1)

$R^{f3}$—$[(O)(O$=$C)$—$CX^3$=$CX^1X^2]$                 (c-2)

$R^{f3}$—$[(O)_c(O$=$C)$—$CF$=$CH_2]$                    (c-3)

(Provided that the definition of each symbol in (c-1) to (c-3) has the same meaning as that of General Formula (FG-3)').

As the polymerizable unsaturated group of the above-mentioned fluorine-containing polyether compound, those having the following structures can be preferably used.

Furthermore, the fluorine-containing polyether compound represented by General Formula (F-3)' may have a plurality of polymerizable unsaturated groups.

In the present invention, a compound having a structure of —O(C=O)CF=CH$_2$ is preferable in that it has particularly high polymerization (curing) reactivity and a cured product can be efficiently obtained.

It is important that the fluorine-containing polyether compound represented by General Formula (F-3)' contains 6 or more repeating units of the fluorine-containing polyether chain represented by General Formula (FG-3)' in the R$^{f3}$ group, and thereby it is possible to impart rub resistance.

Furthermore, it may be a mixture containing a compound having 6 or more repeating units of the above-mentioned fluorine-containing polyether chain, and in a case of being used in the form of a mixture, it is preferable to use a mixture having the highest abundance ratio of fluorine-containing unsaturated compounds having 6 or more repeating units of polyether chains, in the distribution of a fluorine-containing unsaturated compound having less than 6 repeating units and a fluorine-containing unsaturated compound having 6 or more repeating units.

The repeating unit of the fluorine-containing polyether chain represented by General Formula (FG-3)' is 6 or more, preferably 10 or more, more preferably 18 or more, and even more preferably 20 or more. Accordingly, a dynamic friction coefficient can be reduced, and rub resistance can be improved. Furthermore, the fluorine-containing polyether chain may be present at the terminal of the R$^{f3}$ group or may be present in the chain.

Specifically, the R$^{f3}$ group is preferably a group represented by the following general formula.

   General Formula (c-4).

(in the formula, X$^6$ has the same meaning as X$^6$ in the fluorine-containing polyether chain represented by Formula (FG-3)'; R$^4$ represents a hydrogen atom, a halogen atom, an alkyl group, a fluorine-containing alkyl group, an alkyl group containing an ether bond, or a fluorine-containing alkyl group containing an ether bond; R$^5$ represents a divalent or higher valent organic group; t represents an integer of 6 to 66; and e represents 0 or 1.)

That is, the R$^{f3}$ group is preferably a fluorine-containing organic group in which a reactive carbon-carbon double bond is bonded via a divalent or higher valent organic group R$^5$, and which further has R$^4$ at the terminal.

R$^5$ may be any organic group as long as it can bond the fluorine-containing polyether chain represented by General Formula (FG-3)' to a reactive carbon-carbon double bond. Examples thereof include an alkylene group, a fluorine-containing alkylene group, an alkylene group containing an ether bond, and a fluorine-containing alkylene group containing an ether bond. Among them, at least one of a fluorine-containing alkylene group or a fluorine-containing alkylene group having an ether bond is preferable from the viewpoint of transparency and low refractive index.

As specific examples of the fluorine-containing polyether compound represented by General Formula (F-3)', compounds described in the republished patent WO2003/022906 are preferably used. In the present invention, CH$_2$=CF—COO—CH$_2$CF$_2$CF$_2$—(OCF$_2$CF$_2$CF$_2$)$_7$—OC$_3$F$_7$ can be particularly preferably used.

In General Formula (F), in a case where n and m are not 1 at the same time, preferred aspects include General Formula (F-4) and General Formula (F-5).

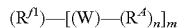   General Formula (F-4):

(In General Formula (F-4). R$^{f1}$ represents a (per)fluoroalkyl group or a (per)fluoropolyether group; W represents a linking group; R$^A$ represents a polymerizable unsaturated group. n represents an integer of 1 to 3; and m represents an integer of 1 to 3, where n and m are not 1 at the same time.)

From the viewpoint of excellent water and oil repellency, and excellent persistence of water and oil repellency (antifouling durability), it is preferable that n be 2 or 3, and m be an integer of 1 to 3; it is more preferable that n be 2 or 3, and m be 2 or 3; and it is even more preferable that n be 3, and m be 2 or 3.

R$^{f1}$ may be monovalent to trivalent. In a case where R$^f$ is monovalent, a terminal group is preferably (C$_n$F$_{2n+1}$)—, (C$_n$F$_{2n+1}$O)—, (XC$_n$F$_{2n}$O)—, or (XC$_n$F$_{2n+1}$)— (where X in the formula is a hydrogen atom, a chlorine atom, or a bromine atom, and n is an integer of 1 to 10). Specifically, it is possible to preferably use CF$_3$O(C$_2$F$_4$O)$_p$CF$_2$—, C$_3$F$_7$O(CF$_2$CF$_2$CF$_2$O)$_p$CF$_2$CF$_2$, C$_3$F$_7$O(CF(CF$_3$)CF$_2$O)$_p$CF(CF$_3$)—, —(CF(CF$_3$)CF$_2$O)$_p$CF(CF$_3$)—, and the like.

An average value of p is 0 to 50. It is preferably 3 to 30, more preferably 3 to 20, and even more preferably 4 to 15.

In a case where R$^{f1}$ is divalent, it is possible to preferably use —(CF$_2$O)$_q$(C$_2$F$_4$O)$_r$CF$_2$—, —(CF$_2$)O(C$_4$F$_8$O)$_r$(CF$_2$)$_3$—, —CF$_2$O(C$_2$F$_4$O)$_r$CF$_2$, —C$_2$F$_4$O(C$_3$F$_6$O)$_r$C$_2$F$_4$—, —CF(CF$_3$)(OCF$_2$CF(CF$_3$))$_s$OC$_x$F$_{2x}$O(CF(CF$_3$)CF$_2$O)$_p$CF(CF$_3$)—, —(CF(CF$_3$)CF$_2$O)$_p$CF(CF$_3$)—, and the like.

An average value of p, q, r, and s in the formula is 0 to 50. It is preferably 3 to 30, more preferably 3 to 20, and most preferably 4 to 15. It is an integer of 2 to 6.

Preferred specific examples of the compound represented by General Formula (F-4) and a synthetic method are described in WO2005/113690.

Hereinafter, specific compounds represented by General Formula (F-4) are shown by describing a compound having an average value of p of 6 to 7 as "HFPO—," in F(CF(CF$_3$)CF$_2$O)$_p$CF(CF$_3$)—, and by describing a compound having an average value of p of 6 to 7 as "—HFPO—," in —(CF(CF$_3$)CF$_2$O)$_p$CF(CF$_3$)—, but examples are not limited thereto.

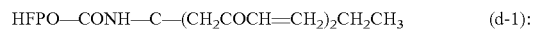   (d-1):

   (d-2):

   (d-3):

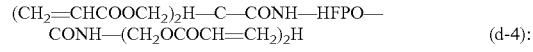   (d-4):

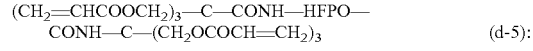   (d-5):

Furthermore, as the compound represented by General Formula (F-4), the compound represented by General Formula (F-5) can also be used.

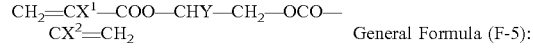   General Formula (F-5):

(In the formula, X$^1$ and X$^2$ represent a hydrogen atom or a methyl group; and Y represents a fluoroalkyl group having 3 or more fluorine atoms and having 2 to 20 carbon atoms, or a fluorocycloalkyl group having 4 or more fluorine atoms and having 4 to 20 carbon atoms.)

In the present invention, a compound in which a polymerizable unsaturated group is a (meth)acryloyloxy group may have a plurality of (meth)acryloyloxy groups. Because the fluorine-containing antifouling agent has a plurality of (meth)acryloyloxy groups, it has a three-dimensional network structure in a case of being cured, has a high glass transition temperature, has low antifouling agent transferability, and can improve durability against repeated wiping of dirt. Furthermore, it is possible to obtain an HC layer having excellent heat resistance, weather fastness, and the like.

Specifically preferred examples of the compound represented by General Formula (F-5) include di(meth)acrylic acid-2,2,2-trifluoroethyl ethylene glycol, di(meth)acrylic acid-2,2,3,3,3-pentafluoropropyl ethylene glycol, di(meth)acrylic acid-2,2,3,3,4,4,4-heptafluorobutyl ethylene glycol, di(meth)acrylic acid-2,2,3,3,4,4,5,5,5-nonafluoropentyl ethylene glycol, di(meth)acrylic acid-2,2,3,3,4,4,5,5,6,6,6-undecafluorohexyl ethylene glycol, di(meth)acrylic acid-2,2,3,3,4,4,5,5,6,6,7,7,7-tridecafluoroheptyl ethylene glycol, di(meth)acrylic acid-2,2,3,3,4,4,5,5,6,6,7,7,8,8,8-pentadecafluorooctyl ethylene glycol, di(meth)acrylic acid-3,3,4,4,5,5,6,6,7,7,8,8,8-tridecafluorooctyl ethylene glycol, di(meth)acrylic acid-2,2,3,3,4,4,5,5,6,6,7,7,8,8,9,9,9-heptadecafluorononyl ethylene glycol, di(meth)acrylic acid-2,2,3,3,4,4,5,5,6,6,7,7,8,8,9,9,10,10,10-nonadecafluorodecyl ethylene glycol, di(meth)acrylic acid-3,3,4,4,5,5,6,6,7,7,8,8,9,9,10,10,10-heptadecafluorodecyl ethylene glycol, di(meth)acrylic acid-2-trifluoromethyl-3,3,3-trifluoropropyl ethylene glycol, di(meth)acrylic acid-3-trifluoromethyl-4,4,4-trifluorobutyl ethylene glycol, di(meth)acrylic acid-1-methyl-2,2,3,3,3-pentafluoropropylethylene glycol, di(meth)acrylic acid-1-methyl-2,2,3,3,4,4,4-heptafluorobutylethylene glycol, and the like. In a case of use, one kind thereof can be used alone or a mixture can be used. In preparing such a di(meth)acrylic acid ester, it can be produced by a known method as exemplified in JP1994-306326A (JP-H06-306326A). In the present invention, diacrylic acid-2,2,3,3,4,4,5,5,6,6,7,7,8,8,9,9,9-heptadecafluorononyl ethylene glycol is preferably used.

In the present invention, as a compound in which a polymerizable unsaturated group is a (meth)acryloyloxy group, a compound having a plurality of (per)fluoroalkyl groups or (per)fluoropolyether groups in one molecule may be used.

(Molecular Weight of Fluorine-Containing Compound)

A weight-average molecular weight (Mw) of the fluorine-containing compound having a polymerizable unsaturated group can be measured using size-exclusion chromatography such as gel permeation chromatography (GPC).

A Mw of the fluorine-containing compound used in the present invention is preferably 400 or more and less than 50,000, more preferably 400 or more and less than 30,000, and even more preferably 400 or more and less than 25,000. In a case where it is the above-mentioned preferred lower limit value or more, this is preferable because then a surface migration performance of an antifouling agent in the HC layer is high. Furthermore, in a case where it is less than the above-mentioned preferred upper limit value, it is preferable because then, a surface migration performance of the fluorine-containing compound is not hindered during a step of curing the curable composition for forming an HC layer after applying it, uneven distribution on to the HC layer surface tends to occur more uniformly, and thereby rub resistance and film hardness are improved. Furthermore, the fluorine-containing compound may be multimodal with respect to a weight-average molecular weight.

(Addition Amount of Fluorine-Containing Compound)

An addition amount of the fluorine-containing compound is preferably 0.01 to 5 mass %, more preferably 0.1 to 5 mass %, even more preferably 0.5 to 5 mass %, and particularly preferably 05 to 2 mass %, with respect to a total solid content in the curable composition for forming an HC layer. In a case where the addition amount is the above-mentioned preferred upper limit value or less, a friction coefficient with respect to steel wool can be reduced, and rub resistance is further improved. Furthermore, in a case where the addition amount is the above-mentioned preferred lower limit value or more, this is preferable because then, the fluorine-containing compound insufficiently mixed with the polymerizable compound (a resin component in a case of forming the HC layer) in the curable composition for forming an HC layer does not precipitate on the surface, and thereby whitening of the HC layer and generation of white powder on the surface are inhibited.

In a case where the HC layer has a laminate structure of two or more layers to be described later, it means an addition amount in the curable composition for forming an HC layer, which forms the HC layer containing the fluorine-containing compound and the polysiloxane-containing compound.

[Polysiloxane-Containing Compound]

The polysiloxane-containing compound in the present invention is not particularly limited as long as it can impart an antifouling property to the HC layer by being used in combination with the fluorine-containing compound, and it is possible to use a compound having a poly siloxane structure in a molecule.

The polysiloxane structure of the polysiloxane-containing compound may be any of linear, branched, or cyclic.

As the polysiloxane-containing compound, a polysiloxane antifouling agent having properties of an antifouling agent is preferably used.

The polysiloxane antifouling agent is preferably represented by General Formula (F-6).

   General Formula (F-6):

(In the formula, R is a hydrogen atom, a methyl group, an ethyl group, a propyl group, or a phenyl group, $R^4$ is an organic group containing a polymerizable unsaturated group, 0<a, 0<b, and a+b<4.)

a is preferably 1 to 2.75 and is more preferably 1 to 2.5. In a case where a is 1 or more, synthesis of the compound is industrially easy, and in a case where a is 2.75 or less, curing properties and antifouling properties are easily compatible with each other.

As a polymerizable unsaturated group in $R^4$, a polymerizable unsaturated group similar to $R^4$ in General Formula (F) (that is, a radically polymerizable group) is mentioned, and it is preferably a (meth)acryloyl group, a (meth)acryloyloxy group, or a group in which an arbitrary hydrogen atom in these groups has been substituted with a fluorine atom.

From the viewpoint of film hardness, the polysiloxane antifouling agent preferably has a plurality of polymerizable unsaturated groups in one molecule, and the polysiloxane antifouling agent is more preferably polydimethylsiloxane having a plurality of polymerizable unsaturated groups in one molecule.

Preferred examples of polysiloxane antifouling agents include a polysiloxane antifouling agent having a substituent on at least one of the terminal or the side chain of a compound chain containing a plurality of dimethylsilyloxy units as repeating units. The compound chain containing dimethylsilyloxy as a repeating unit may contain a structural unit other than dimethylsilyloxy. Substituents may be the same as or different from each other, and it is preferable that there be a plurality of substituents.

The substituent is preferably a polymerizable group, and it is sufficient that the substituent is a polymerizable group exhibiting any of radically polymerizable, cationically polymerizable, anionically polymerizable, polycondensable, or addition polymerizable properties Examples of preferred substituents include groups containing a (meth)acryloyl group, a (meth)acryloyloxy group, a vinyl group, an allyl group, a cinnamoyl group, an epoxy group, an oxetanyl group, a hydroxyl group, a fluoroalkyl group, a polyoxyalkylene group, a carboxyl group, an amino group, or the like. Among them, a radically polymerizable group is preferable, and a (meth)acryloyloxy group is particularly preferable from the viewpoint of improving an antifouling property.

In addition, the number of substituents in the compound is preferably 100 to 10,000 g/mol as a functional group equivalent, more preferably 100 to 3,00) g/mol, even more preferably 100 to 2,000 g/mol, and particularly preferably 100 to 1,000 g/mol, from the viewpoint that then, film hardness and an antifouling property are compatible with each other. In a case where the functional group equivalent is set to the above-mentioned preferred lower limit value or more, this is preferable because then, a surface migration performance of the antifouling agent in the HC layer is high without the substituent being unnecessarily compatible with the polymerizable compound (a resin component in forming the HC layer) in the curable composition for forming an HC layer. In a case where the functional group equivalent is set to the above-mentioned preferred upper limit value or less, this is preferable because then, film hardness is improved, and thereby an antifouling property can be improved.

$R^A$ is preferably an organic group containing a (meth) acryloyl group, and it is more preferable that a bond of the organic group to a Si atom be a Si—O—C bond from the viewpoint of ease of industrial synthesis. b is preferably 0.4 to 0.8, more preferably 0.6 to 0.8. In a case where b is the above-mentioned preferred lower limit value or more, curing properties are improved, and in a case where b is the above-mentioned preferred upper limit value or less, an antifouling property is improved.

Furthermore, a+b is preferably 3 to 3.7 and is more preferably 3 to 3.5. In a case where it is the above-mentioned preferred lower limit value or more, uneven distribution of the compound on the surface of the HC layer occurs easily, and in a case where it is the above-mentioned preferred upper limit value or less, both curing properties and antifouling properties can be improved.

The polysiloxane antifouling agent preferably contains 3 or more Si atoms in one molecule, and more preferably contains 3 to 40 Si atoms. In a case where the number of Si atoms is 3 or more, uneven distribution of the compound on the surface of the HC layer is promoted, and a sufficient antifouling property is more easily obtained.

The polysiloxane antifouling agent can be produced using a known method described in JP2007-145884A.

As additives having a polysiloxane structure, it is preferable to add polysiloxanes (for example, "KF-96-10CS," "KF-100T," "X-22-169AS," "KF-102," "X-22-3701IE," "X-22-164," "X-22-164A," "X-22-164AS," "X-22-164B," "X-22-164C," "X-22-5002," "X-22-173B," "X-22-174D," "X-22-167B," and "X-22-161AS" (trade names), which are manufactured by Shin-Etsu Chemical Co., Ltd.; "AK-5," "AK-30," and "AK-32" (trade names), which are manufactured by Toa Gosei Co, Ltd.; "Silaplane FM0725" and "Silaplane FM0721" (trade names), which are manufactured by Chisso Corporation; "DMS-U22," "RMS-033," and "UMS-182" (trade names), which are manufactured by Gelest; "Akrit 8SS-723" (trade name) manufactured by TAISEI FINE CHEMICAL CO., LTD.; and the like). Furthermore, polysiloxane compounds described in Tables 2 and 3 of JP2003-112383A can also be preferably used.

[Molecular Weight of Polysiloxane-Containing Compound]

A weight-average molecular weight of the polysiloxane-containing compound is preferably 300 or more, more preferably 300 to 100.00, and even more preferably 300 to 30,000. In a case where the weight-average molecular weight of the polysiloxane-containing compound is 300 or more, uneven distribution of the polysiloxane-containing compound on the surface of the HC layer is promoted, and thereby rub resistance and hardness are further improved.

[Addition Amount of Polysiloxane-Containing Compound]

An addition amount of the polysiloxane-containing compound is preferably 0.01 to 5 mass %, more preferably 0.1 to 5 mass %, even more preferably 0.5 to 5 mass %, and particularly preferably 0.5 to 2 mass %, with respect to a total solid content in the curable composition for forming an HC layer. In a case where an addition amount is the above-mentioned preferred lower limit value or more, an antifouling property can be further improved. Furthermore, in a case where the addition amount is the above-mentioned preferred upper limit value or less, this is preferable because then, a polysiloxane-containing compound insufficiently mixed with the polymerizable compound (a resin component in a case of forming the HC layer) in the curable composition for forming an HC layer does not precipitate on the surface, and thereby whitening of the HC layer and generation of white powder on the surface are inhibited.

In a case where the HC layer has a laminate structure of two or more layers to be described later, it means an addition amount in the curable composition for forming an HC layer, which forms the HC layer containing the polysiloxane-containing compound.

(Surface Roughness Sa of Hard Coat Layer in Optical Film)

In the present invention, a surface roughness Sa of the hard coat layer in the optical film is a surface roughness (hereinafter also referred to as a surface roughness Sa) of the surface opposite to the surface having the resin film in a state where the resin film and the hard coat layer are laminated.

The surface roughness Sa of the hard coat layer is preferably 60 nm or less, more preferably 20 nm or less, and even more preferably 10 nm or less in a measurement visual field of 4 mm×5 mm. It is practical that a lower limit value is 1 nm or more.

In a case where the hard coat layer has another layer to be described later on a surface (hereinafter, also referred to as a visible side surface) opposite to the surface having the resin film, the above-mentioned "surface roughness Sa of the hard coat layer" means a surface roughness Sa of the hard coat layer, which is measured in a state of the optical film in which the hard coat layer is located on the outermost surface on the visible side of the optical film.

(HC Layer Obtained by Curing Curable Composition for Forming Hard Coat Layer (HC Layer))

The HC layer used in the present invention can be obtained by irradiating the curable composition for forming an HC layer with active energy rays to cure the composition. In the present specification, the term "active energy rays" mean ionizing radiation, and include X-rays, ultraviolet rays, visible rays, infrared rays, electron beams, α rays, β rays, γ rays, and the like.

The curable composition for forming an HC layer used for forming the HC layer contains at least one component (hereinafter, also referred to as an "active energy ray-curable component") having a property of being cured by irradiation with active energy rays. The active energy ray-curable component is preferably at least one polymerizable compound selected from a radically polymerizable compound and a cationically polymerizable compound. In the present specification, the "polymerizable compound" is a compound having a polymerizable group in a molecule, and it is sufficient that the number of polymerizable groups is one or more in one molecule. The polymerizable group is a group that can participate in a polymerization reaction, and specific examples thereof include groups contained in various polymerizable compounds to be described later. In addition, as the polymerization reaction, various polymerization reactions such as radical polymerization, cationic polymerization, and anionic polymerization can be mentioned.

Furthermore, the HC layer in the present invention is preferably obtained by irradiating a curable composition for forming an HC layer containing a polysiloxane-containing compound having a polymerizable group in a molecule, a fluorine-containing compound having a polymerizable group in a molecule, and in addition to these compounds, a polymerizable compound having a polymerizable group in a molecule, with active energy rays to polymerize and cure them. In this case, the polymerizable groups contained in the polysiloxane-containing compound, the fluorine-containing compound, and the polymerizable compound are more preferably radically polymerizable groups.

The HC layer used in the present invention may have a one-layer structure or a laminate structure of two or more layers, and an HC layer having a one-layer structure or a laminate structure of two or more layers described in detail below is preferable.

1) One-Layer Structure

As a preferred aspect of the curable composition for forming an HC layer having a one-layer structure, a curable composition for forming an HC layer containing at least one polymerizable compound having two or more ethylenically unsaturated groups in one molecule can be mentioned as a first aspect. The ethylenically unsaturated group refers to a functional group containing an ethylenically unsaturated double bond.

Examples of the polymerizable compound having two or more ethylenically unsaturated groups in one molecule, which is a compound contained in the curable composition for forming an HC layer of the first aspect, include ester of polyhydric alcohol and (meth)acrylic acid [for example, ethylene glycol di(meth)acrylate, butanediol di(meth)acrylate, hexanediol di(meth)acrylate, 1,4-cyclohexanediacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexanetetramethacrylate, polyurethane polyacrylate, and polyester polyacrylate], ethylene oxide modified products, polyethylene oxide modified products, and caprolactone modified products of the above ester, vinylbenzene, and derivatives thereof [for example, 1,4-divinylbenzene, 4-vinylbenzoic acid-2-acryloylethyl ester, and 1,4-divinylcyclohexanone], vinyl sulfones (for example, divinyl sulfone), and acrylamides (for example, methylenebisacrylamide) and methacrylamides.

Polymerization of the above-mentioned polymerizable compound having two or more ethylenically unsaturated groups in one molecule can be carried out by irradiation with active energy rays in the presence of a radical photopolymerization initiator. A radical photopolymerization initiator to be described later is preferably applied as the radical photopolymerization initiator. In addition, regarding a content ratio of the radical photopolymerization initiator to the polymerizable compound having an ethylenically unsaturated group in the curable composition for forming an HC layer, the description of a content ratio of the radical photopolymerization initiator to the radically polymerizable compound to be described later is preferably applied.

Furthermore, as a second aspect, a curable composition for forming an HC layer containing at least one radically polymerizable compound (B) and at least one cationically polymerizable compound (A) can be mentioned. As a preferred aspect, a curable composition for forming an HC layer containing the following compounds can be mentioned.

Radically polymerizable compound (b-1) containing two or more radically polymerizable groups of at least one of an acryloyl group or a methacryloyl group in one molecule; and Cationically Polymerizable Compound (A).

It is more preferable that the curable composition for forming an HC layer contain a radical photopolymerization initiator and a cationic photopolymerization initiator. As a preferable aspect of the second aspect, a curable composition for forming an HC layer containing the following compounds can be mentioned.

Radically polymerizable compound (b-1) containing two or more radically polymerizable groups of at least one of an acryloyl group or a methacryloyl group in one molecule:

Cationically polymerizable compound (A);

Radical photopolymerization initiator; and

Cationic photopolymerization initiator.

Hereinafter, the present aspect will be referred to as a second aspect (1).

in the second aspect (1), the radically polymerizable compound preferably contains one or more urethane bonds in one molecule together with two or more radically polymerizable groups in one molecule.

In another preferred aspect of the second aspect, a curable composition for forming an HC layer containing the following compounds can be mentioned.

Cationically polymerizable compound of (a-1) which contains an alicyclic epoxy group and an ethylenically unsaturated group, and has molecular weight of 300 or less, and in which the number of alicyclic epoxy groups contained in one molecule is one, and the number of ethylenically unsaturated groups contained in one molecule is one:

Radically polymerizable compound (b-2) containing three or more ethylenically unsaturated groups in one molecule;

Radical polymerization initiator (c); and

Cationic polymerization initiator (d).

Hereinafter, the present aspect will be referred to as a second aspect (2). The HC layer obtained by curing the curable composition for forming an HC layer of the second aspect (2) preferably contains 15 to 70 mass % of the structure derived from (a-1), 25 to 80 mass % of the structure derived from (b-2), 0.1 to 10 mass % of (c), and 0.1 to 10 mass % of (d), in a case where the total solid content of the HC layer is 100 mass %. Furthermore, in one aspect, the curable composition for forming an HC layer of the second aspect (2) preferably contains 15 to 70 mass % of (a-1) in a case where the total solid content of the curable composition for forming an HC layer is 100 mass %. The "alicyclic epoxy group" means a monovalent functional group having a cyclic structure in which an epoxy ring and a saturated hydrocarbon ring are fused.

Hereinafter, various components (polymerizable compound and polymerization initiator) that may be contained in the curable composition for forming an HC layer of the second aspect, preferably the second aspect (1) or the second aspect (2), will be described in more detail.

—Polymerizable Compound—

(B) Radically Polymerizable Compound

The curable composition for forming an HC layer of the second aspect contains at least one radically polymerizable compound (B).

As the radically polymerizable compound (B), any compound having a polymerizable group that is radically polymerizable (a radically polymerizable group) can be used without any limitation. Furthermore, the number of radically polymerizable groups contained in one molecule may be at least one. That is, the radically polymerizable compound (B) may be a monofunctional compound containing one radically polymerizable group in one molecule or a polyfunctional compound containing two or more radically polymerizable groups. The number of radically polymerizable groups contained in the polyfunctional compound is not particularly limited, but it is, for example, 2 to 6 in one molecule. Furthermore, two or more radically polymerizable groups contained in one molecule of the polyfunctional compound may be the same or may be two or more kinds having different structures.

The radically polymerizable compound in the second aspect (1) (hereinafter abbreviated as a radically polymerizable compound (b-1)) contains two or more radically polymerizable groups of at least one of an acryloyl group or a methacryloyl group in one molecule. The radically polymerizable compound (b-1) preferably contains, for example, 2 to 10 radically polymerizable groups of at least one of an acyloyl group or a methacryloyl group in one molecule, and more preferably contains, for example, 2 to 6 radically polymerizable groups.

The radically polymerizable compound (B) is preferably a radically polymerizable compound having a molecular weight of 200 or more and less than 1,000. In addition, in the present specification, a "molecular weight" means a weight-average molecular weight measured in terms of polystyrene by gel permeation chromatography (GPC) with respect to a multimer. The following measurement conditions can be mentioned as an example of specific measurement conditions for a weight-average molecular weight.

GPC device: HLC-8120 (manufactured by TOSOH CORPORATION)

Column: TSK gel Multipore HXL-M (manufactured by TOSOH CORPORATION, inner diameter 7.8 mm×column length 30.0 cm)

Eluent: tetrahydrofuran

As described above, the radically polymerizable compound (b-1) preferably contains one or more urethane bonds in one molecule. The number of urethane bonds contained in one molecule of the radically polymerizable compound (b-1) is preferably one or more, more preferably two or more, and even more preferably two to five, and for example, the number thereof may be two. In the radically polymerizable compound (b-1) containing two urethane bonds in one molecule, a radically polymerizable group of at least one of an acryloyl group or a methacryloyl group may be bonded to one of urethane bonds directly or via a linking group, or may be bonded to each of two urethane bonds directly or via a linking group. In one aspect, it is preferable that one or more radically polymerizable groups of at least one of an acryloyl group or a methacryloyl group be bonded to two urethane bonds bonded via a linking group.

More specifically, in the radically polymerizable compound (b-1), a urethane bond may be direct bonded to a radically polymerizable group of at least one of an acryloyl group or a methacryloyl group, or there may be a linking group between a urethane bond and a radically polymerizable group of at least one of an acryloyl group or a methacryloyl group. The linking group is not particularly limited, and it may be linear or branched, may be saturated or unsaturated, may be a hydrocarbon group, a cyclic group, and group obtained by combining two or more of these groups. The number of carbon atoms of the hydrocarbon group is, for example, about 2 to 20, but it is not particularly limited. In addition, examples of the cyclic structure contained in the cyclic group include an aliphatic ring (such as a cyclohexane ring), an aromatic ring (such as a benzene ring and a naphthalene ring), and the like. The above-mentioned groups may be unsubstituted or may have a substituent. In the present specification, unless otherwise specified, the groups described may have a substituent or may be unsubstituted. In a case where a group has a substituent, examples of substituents include an alkyl group (for example, an alkyl group having 1 to 6 carbon atoms), a hydroxyl group, an alkoxy group (for example, an alkoxy group having 1 to 6 carbon atoms), a halogen atom (for example, a fluorine atom, a chlorine atom, a bromine atom), a cyano group, an amino group, a nitro group, an acyl group, a carboxy group, and the like.

The radically polymerizable compound (b-1) described above can be synthesized by a known method. In addition, it is also possible to obtain a commercially available product. For example, as an example of a synthesis method, it is possible to mention a method of reacting a hydroxyl group-containing compound such as alcohol, polyol, and hydroxyl group-containing (meth)acrylic acid with an isocyanate, or a method of esterifying a urethane compound obtained by the above reaction using (meth)acrylic acid as necessary. The term "(meth)acrylic acid" means one or both of acrylic acid and methacrylic acid.

Examples of commercially available products of the radically polymerizable compound (b-1) containing one or more urethane bonds in one molecule include, but are not limited to, the following examples. For example, UA-306H, UA-306I, UA-306T, UA-510H, UF-8001G. UA-101I, UA-101T, AT-600, AH-600, AI-600, BPZA-66, and BPZA-100, which are manufactured by KYOEISHA CHEMICAL Co., LTD.; U-4HA, U-6HA, U-6LPA, UA-32P, U-15HA, and UA-1100H, which are manufactured by Shin-Nakamura Chemical Co., Ltd.; and SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B. SHIKOH UV-7510B, SHIKOH UV-74611TE, SHIKOH UV-3000B, SHIKOH UV-3200B. SHIKOH UV-3210EA, SHIKOH UV-3310EA, SHIKOH UV-3310B, SHIKOH UV-3500BA. SHIKOH UV-3520TL, SHIKOH UV-3700B, SHIKOH UV-6100B, SHIKOH UV-6640B, SHIKOH UV-2000B, SHIKOH UV-2010B, and SHIKOH UV-2250EA, which are manufactured by Nippon Synthetic Chemical Industry Co., Ltd. (all of which are trade names). Examples thereof further include SHIKOH UV-2750B manufactured by Nippon Synthetic Chemical Industry Co., Ltd.; UL-503LN manufactured by KYOEISHA CHEMICAL Co., LTD., UNIDIC 17-806, UNIDIC 17-813, UNIDIC V-4030, and UNIDIC V-4000BA manufactured by Dainippon Ink and Chemicals, Inc.; EB-1290K manufactured by Daicel UCB; Hi-Cope A1-2010 and Hi-Cope AU-2020 manufactured by TOKUSHIKI CO., Ltd.; and the like.

Exemplary compounds A-1 to A-8 are shown below as specific examples of the radically polymerizable compound (b-1) containing one or more urethane bonds in one molecule, but the present invention is not limited to the following specific examples.

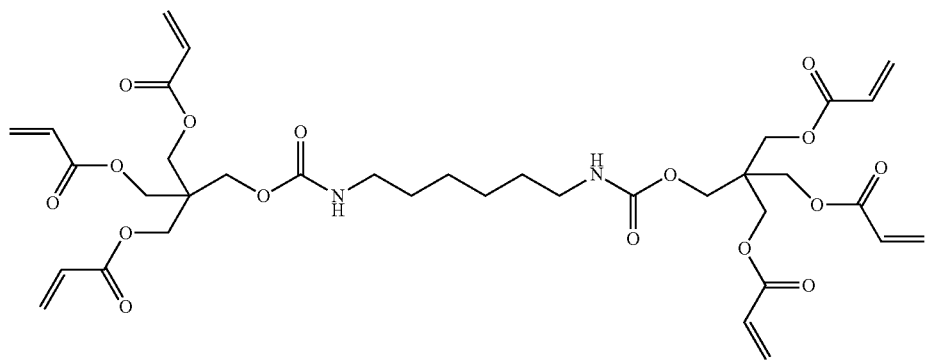
A-1
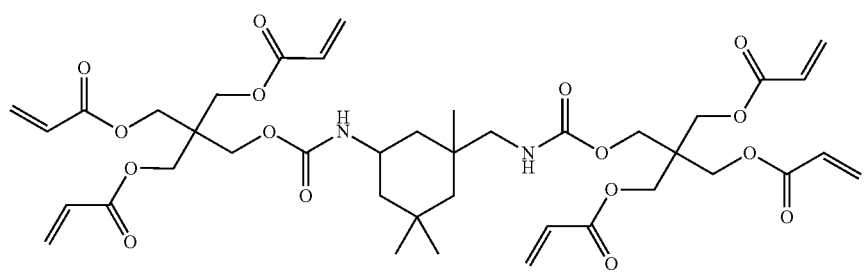
A-2
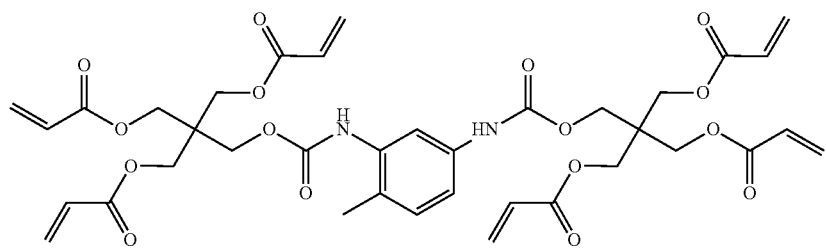
A-3
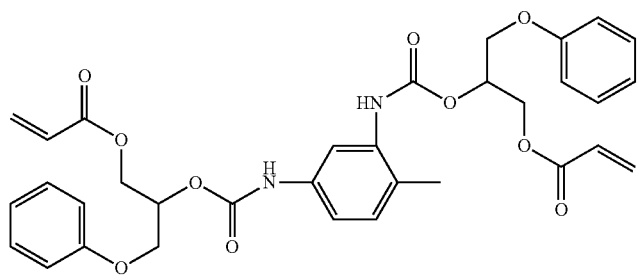
A-4
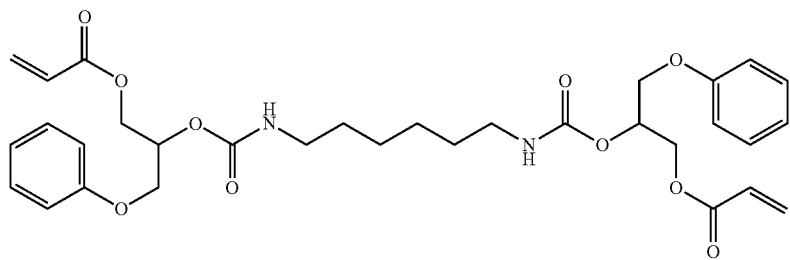
A-5

-continued

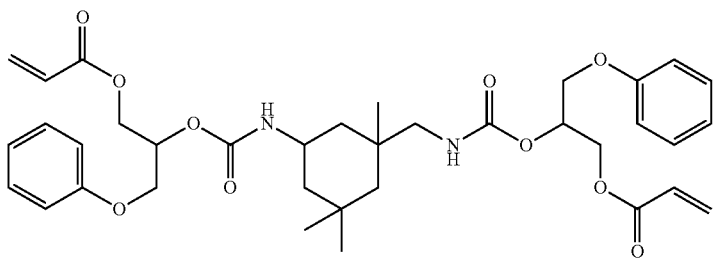

A-6

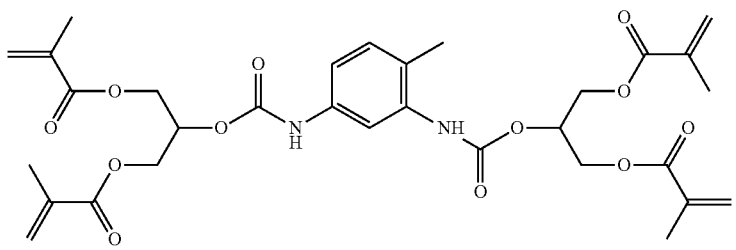

A-7

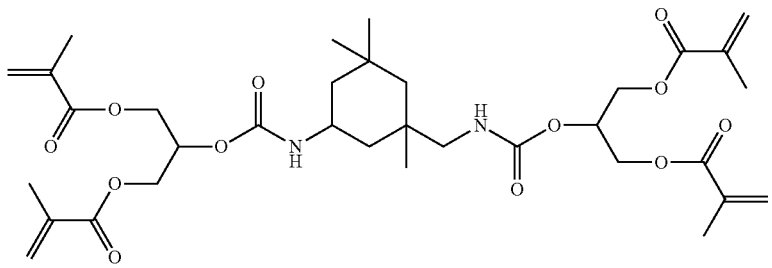

A-8

The radically polymerizable compound (b-1) having one or more urethane bonds in one molecule has been described above, but the radically polymerizable compound (b-1) containing two or more radically polymerizable groups of at least one of an acryloyl group or a methacryloyl group in one molecule may not have a urethane bond. Furthermore, in addition to the radically polymerizable compound (b-1) containing two or more radically polymerizable groups of at least one of an acryloyl group or a methacryloyl group in one molecule, the curable composition for forming an HC layer of the second aspect (1) may contain one or more radically polymerizable compounds other than such a radically polymerizable compound.

In the following description, the radically polymerizable compound (b-1) containing two or more radically polymerizable groups of at least one of an acryloyl group or a methacryloyl group in one molecule, and containing one or more urethane bonds in one molecule will be referred to as a first radically polymerizable compound, and a radically polymerizable compound that does not correspond to the first radically polymerizable compound will be referred to as a "second radically polymerizable compound" That is, as long as the second radically polymerizable compound does not correspond to the first radically polymerizable compound, the second radically polymerizable compound may or may not have one or more urethane bonds in one molecule, and may or may not have two or more radically polymerizable groups of at least one of an acryloyl group or a methacryloyl group in one molecule. In a case where the first radically polymerizable compound and the second radically polymerizable compound are used in combination, a mass ratio thereof is such that the first radically polymerizable compound/the second radically polymerizable compound=3/1 to 1/30 is preferable, 2/1 to 1/20 is more preferable, and 1/1 to 1/10 is even more preferable.

A content of the radically polymerizable compound (regardless of presence or absence of a urethane bond) containing two or more radically polymerizable groups of at least one of an acryloyl group or a methacryloyl group in one molecule of the curable composition for forming an HC layer of the second aspect (1) is preferably 30 mass % or more, more preferably 50 mass % or more, and even more preferably 70 mass % or more, with respect to 100 mass % of the total composition. Furthermore, a content of the radically polymerizable compound (regardless of presence or absence of a urethane bond) containing two or more radically polymerizable groups of at least one of an acryloyl group or a methacryloyl group in one molecule of the curable composition for forming an HC layer of the second aspect (1) is preferably 98 mass % or less, more preferably 95 mass % or less, and even more preferably 90 mass % or less, with respect to 100 mass % of the total composition.

Furthermore, a content of the first radically polymerizable compound of the curable composition for forming an HC layer of the second aspect (1) is preferably 30 mass % or more, more preferably 50 mass % or more, and even more preferably 70 mass % or more, with respect to 100 mass % of the total composition. On the other hand, a content of the first radically polymerizable compound is preferably 98 mass % or less, more preferably 95 mass % or less, and even more preferably 90 mass % or less with respect to 100 mass % of the total composition.

In one aspect, the second radically polymerizable compound is preferably a radically polymerizable compound containing two or more radically polymerizable groups in one molecule and having no urethane bond. The radically polymerizable group contained in the second radically polymerizable compound is preferably an ethylenically unsaturated group, and in one aspect, it is preferably a vinyl group. In another aspect, the ethylenically unsaturated group is preferably a radically polymerizable group of at least one of an acryloyl group or a methacryloyl group. That is, the second radically polymerizable compound preferably has one or more radically polymerizable groups of at least one of an acryloyl group or a methacryloyl group in one molecule, and does not have a urethane bond. Furthermore, the second radically polymerizable compound can contain one or more radically polymerizable groups of at least one of an acryloyl group or a methacryloyl group, and one or more radically polymerizable groups other than the above radically polymerizable groups in one molecule as radically polymerizable compounds.

The number of radically polymerizable groups contained in one molecule of the second radically polymerizable compound is preferably at least 2, more preferably 3 or more, and even more preferably 4 or more. In addition, the number of radically polymerizable groups contained in one molecule of the second radically polymerizable compound is, for example, 10 or less in one aspect, but it may be more than 10. Furthermore, the second radically polymerizable compound is preferably a radically polymerizable compound having a molecular weight of 200 or more and less than 1.000.

Examples of the second radically polymerizable compound include the following compounds. However, the present invention is not limited to the following exemplary compounds.

Examples thereof include bifunctional (meth)acrylate compounds such as polyethylene glycol 200 di(meth)acrylate, polyethylene glycol 300 di(meth)acrylate, polyethylene glycol 400 di(meth)acrylate, polyethylene glycol 600 di(meth)acrylate, triethylene glycol di(meth)acrylate, epichlorohydrin-modified ethylene glycol di(meth)acrylate (as a commercially available product, for example, Denacol DA-811 manufactured by Nagase & Co., Ltd.), polypropylene glycol 200 di(meth)acrylate, polypropylene glycol 400 di(meth)acrylate, polypropylene glycol 700 di(meth)acrylate, ethylene oxide (EO; Ethylene Oxide)/propylene oxide (PO; Propylene Oxide) block polyether di(meth)acrylate (as a commercially available product, for example, BLEMMER PET series manufactured by NOF CORPORATION), dipropylene glycol di(meth)acrylate, bisphenol A EO-added di(meth)acrylate (as a commercially available product, for example, M-210 manufactured by Toagosei Co, Ltd., NK ester A-BPE-20 manufactured by Shin-Nakarmura Chemical Co., Ltd., and the like), hydrogenated bisphenol A EO-added di(meth)acrylate (NK ester A-HPE-4 manufactured by Shin-Nakamura Chemical Co., Ltd., and the like), bisphenol A PO-added di(meth)acrylate (as a commercially available product, for example, light acrylate BP-4PA manufactured by KYOEISHA CHEMICAL Co., Ltd.), bisphenol A epichlorohydrin-added di(meth)acrylate (as a commercially available product, for example, Evecryl 150 manufactured by Daicel UCB), bisphenol A EO/PO-added di(meth)acrylate (as a commercially available product, for example, BP-023-PE manufactured by Toho Chemical Industry Co., Ltd.), bisphenol F EO-added di(meth)acrylate (as a commercially available product, for example, Aronix M-208 manufactured by Toagosei Co., Ltd.), 1,6-hexanediol di(meth)acrylate and epichlorohydrin-modified products thereof, neopentyl glycol di(meth)acrylate, hydroxypivalic acid neopentyl glycol di(meth)acrylate, and caprolactone-modified products thereof, 1,4-butanediol di(meth)acrylate, 1,9-nonanediol di(meth)acrylate, trimethylolpropane di(meth)acrylate, tricyclodecane dimethanol di(meth)acrylate, pentaerythritol di(meth)acrylate monostearate, trimethylolpropane acrylic acid/benzoic acid ester, isocyanuric acid EO-modified di(meth)acrylate (as a commercially available product, for example, Aronix M-215 manufactured by Toagosei Co., Ltd.), and the like.

Examples thereof further include trifunctional (meth)acrylate compounds such as trimethylolpropane tri(meth)acrylate and EO, PO or epichlorohydrin-modified products thereof, pentaerythrtol tri(meth)acrylate, glycerol tri(meth)acrylate, and EO, PO or epichlorohydrin-modified products thereof, isocyanuric acid EO-modified tri(meth)acrylate (as a commercially available product, for example, Aronix M-315 manufactured by Toagosei Co., Ltd., and the like), tris(meth)acryloyloxyethyl phosphate, hydrogen phthalate-(2,2,2-tri-(meth)acryloyloxymethyl)ethyl, and glycerol tri (meth)acrylate and EO, PO or epichlorohydrin-modified products thereof; tetrafunctional (meth)acrylate compounds such as pentaerythritol tetra(meth)acrylate and EO, PO, or epichlorohydrin-modified products thereof, and ditrimethylolpropane tetra(meth)acrylate; pentafunctional (meth)acrylate compounds such as dipentaerythritol penta(meth)acrylate and EO, PO, epichlorohydrin, fatty acid, or alkyl-modified products thereof; and hexafunctional (meth) acrylates such as dipentaerythritol hexa(meth)acrylate and EO, PO, epichlorohydrin, fatty acid, or alkyl-modified products thereof, and sorbitol hexa(meth)acrylate and EO, PO, epichlorohydrin, fatty acid, or alkyl-modified products thereof.

Two or more kinds of the second radically polymerizable compounds may be used in combination. In this case, a mixture "DPHA" (manufactured by Nippon Kayaku Co., Ltd.) of dipentaerythritol pentaacrylate and dipentaerythritol hexaacrylate can be preferably used.

In addition, as the second radically polymerizable compound, polyester (meth)acrylate or epoxy (meth)acrylate having a weight-average molecular weight of 200 or more and less than 1,000 is also preferable Examples of commercially available products include, as polyester (meth)acrylate, BEAMSET 700 (hexafunctional), BEAMSET 710 (tetrafunctional), BEAMSET 720 (trifunctional), and the like of BEAMSET 700 series (trade name) manufactured by ARAKAWA CHEMICAL INDUSTRIES, LTD. In addition, examples of epoxy (meth)acrylates include SP-1506, 500, SP-1507, and 480 of SP series (trade name) manufactured by Showa Highpolymer Co., Ltd., VR-77 of VR series (trade name) manufactured by Showa Highpolymer Co., Ltd., EA-1010/ECA, EA-11020, EA-1025, and EA-6310/ECA (trade name) manufactured by Shin-Nakamura Chemical Co., Ltd.; and the like.

Furthermore, as specific examples of the second radically polymerizable compound, the following exemplary compounds A-9 to A-11 can also be mentioned.

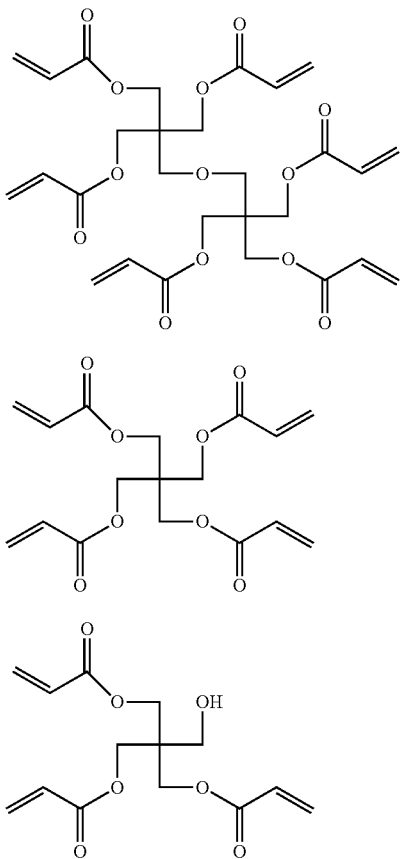

A-9

A-10

A-11

The curable composition for forming an HC layer of the second aspect (2) contains the radically polymerizable compound of (b-2) having three or more ethylenically unsaturated groups in one molecule. The compound of (b-2) having three or more ethylenically unsaturated groups in one molecule is also referred to as a "(b-2) component" below.

Examples of the (b-2) component include esters of polyhydric alcohol and (meth)acrylic acid, vinylbenzene and derivatives thereof, vinylsulfone, (meth)acrylamide, and the like. Among them, a radically polymerizable compound containing three or more radically polymerizable groups of at least one of an acryloyl group or a methacryloyl group in one molecule is preferable. Specific examples thereof include a compound which is an ester of a polyhydric alcohol and (meth)acrylic acid and has three or more ethylenically unsaturated groups in one molecule. More specific examples thereof include (di)pentaerythritol tetra(meth)acrylate, (di)pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri (meth)acrylate, trimethylolethane tri(meth)acrylate, ditrimethylolpropane tetra(meth)acrylate, dipentaerythritol tetra(meth)acrylate, (di)pentaerythritol penta(meth)acrylate, dipentaerythritol hexa(meth)acrylate, pentaerythritol hexa (meth)acrylate, 1,2,3-cyclohexane tetramethacrylate, polyurethane polyacrylate, polyester polyacrylate, caprolactone-modified tris(acryloxyethyl) isocyanurate, tripentaerythritol triacrylate, tripentaerythritol hexatriacrylate, 1,2,4-cyclohexanetetra(meth)acrylate, pentaglycerol triacrylate, and the like. The "(di)pentaerythritol" mentioned above means one or both of pentaerythritol and dipentaerythritol.

Furthermore, a resin containing three or more radically polymerizable groups of at least one of an acryloyl group or a methacryloyl group in one molecule is also preferable.

Examples of the resin containing three or more radically polymerizable groups of at least one of an acryloyl group or a methacryloyl group in one molecule include a polyester resin, a polyether resin, an acrylic resin, an epoxy resin, an urethane resin, an alkyd resin, a spiro acetal resin, a polybutadiene resin, a polythiol polyene resin, polymers such as polyfunctional compounds such as polyhydric alcohols, and the like.

Specific examples of the radically polymerizable compound containing three or more radically polymerizable groups of at least one of an acryloyl group or a methacryloyl group in one molecule include the exemplary compounds disclosed in paragraph 0096 of JP2007-256844A and the like.

Furthermore, specific examples of the radically polymerizable compound containing three or more radically polymerizable groups of at least one of an acryloyl group or a methacryloyl group include KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, and KAYARAD GPO-303, which are manufactured by Nippon Kayaku Co., Ltd.; and esterified products of (meth)acrylic acid with polyols such as V#400 and V#36095D manufactured by OSAKA ORGANIC CHEMICAL INDUSTRY LTD. In addition, it is also possible to suitably use SHIKOH UV-1400B, SHIKOH UV-1700B. SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-66301, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B. SHIKOH UV-6100B, SHIKOH UV-6640B, SHIKOH UV-2000B, SHIKOH UV-2010B, SHIKOH UV-2250EA, and SHIKOH UV-2750B (all manufactured by Nippon Synthetic Chemical Industry Co., Ltd.) UL-503LN (manufactured by KYOEISHA CHEMICAL Co., LTD.); UNIDIC 17-806. UNIDIC 17-813, UNIDIC V-4030, and UNIDIC V-4000BA (all manufactured by Dainippon Ink and Chemicals. Inc.); EB-1290K, EB-220, EB-5129, EB-1830, and EB-4358 (all manufactured by Daicel UCB); Hi-Cope AU-2010 and Hi-Cope AU-2020 (both manufactured by TOKUSHIKI CO., Ltd.), ARONIX M-1960 (manufactured by Toagosei Co., Ltd.); trifunctional or higher functional urethane acrylate compounds such as Artresin UN-3320HA, UN-3320HC, UN-3320HS, UN-904, and HDP-4T, and ARONIX M-8100, ARONIX M-8030, and ARONIX M-9050 (all manufactured by Toagoset Co., Ltd.), trifunctional or higher functional polyester compounds such as KBM-8307 (manufactured by Daicel Cytec Co., Ltd.); and the like. The above specific examples are all trade names.

In addition, as the (b-2) component, only one kind may be used, or two or more kinds having different structures may be used in combination.

As described above, the HC layer obtained by curing the curable composition for forming an HC layer of the second aspect (2) preferably contains 15 to 70 mass % of the structure derived from (a-1), 25 to 80 mass % of the structure derived from (b-2), 0.1 to 10 mass % of the structure derived from (c), and 0.1 to 10 mass % of the structure derived from (d), in a case where the total solid content of the HC layer is 100 mass %. The structure derived from (b-2) is preferably contained in an amount of 40 to 75 mass % and more preferably 60 to 75 mass % in a case where the total solid content of the HC layer is 100 mass %. Furthermore, the curable composition for forming an HC layer of the second aspect (2) preferably contains 40 to 75 mass % of the (b-2) component, and more preferably contains 60 to 75 mass % thereof, in a case where the total solid content of the curable composition for forming an HC layer is 100 mass %.

(A) Cationically Polymerizable Compound

The curable composition for forming an HC layer of the second aspect contains at least one cationically polymerizable compound (A).

As the cationically polymerizable compound (A), any compound having a polymerizable group that is cationically polymerizable (cationically polymerizable group) can be used without any limitation. In addition, the number of cationically polymerizable groups contained in one molecule may be at least one. That is, the cationically polymerizable compound (A) may be a monofunctional compound containing one cationically polymerizable group in one molecule or a polyfunctional compound containing two or more cationically polymerizable groups. The number of cationically polymerizable groups contained in the polyfunctional compound is not particularly limited, but it is, for example, 2 to 6 in one molecule. Furthermore, two or more cationically polymerizable groups contained in one molecule of the polyfunctional compound may be the same or may be two or more kinds having different structures.

Furthermore, in one aspect, it is also preferable that the cationically polymerizable compound (A) have one or more radically polymerizable groups in one molecule together with the cationically polymerizable group. For the radically polymerizable group that the cationically polymerizable compound (A) may have, the description relating to the radically polymerizable group in the above radically polymerizable compound (B) can be referred to. It is preferably an ethylenically unsaturated group, and the ethylenically unsaturated group is more preferably a radically polymerizable group of at least one of a vinyl group, an acryloyl group, or a methacryloyl group. The number of radically polymerizable groups in one molecule of the cationically polymerizable compound having a radically polymerizable group is at least 1, is preferably 1 to 3, and is more preferably 1.

Preferable examples of the cationically polymerizable group include an oxygen-containing heterocyclic ring group and a vinyl ether group. The cationically polymerizable compound may contain one or more oxygen-containing heterocyclic ring groups and one or more vinyl ether groups in one molecule.

The oxygen-containing heterocyclic ring may be a monocyclic ring or a fused ring. Furthermore, those having a bicyclo skeleton are also preferable. The oxygen-containing heterocyclic ring may be a non-aromatic ring or an aromatic ring, and is preferably a non-aromatic ring. Specific examples of the monocyclic ring include an epoxy ring (oxirane ring), a tetrahydrofuran ring, and an oxetane ring. Furthermore, examples of the monocyclic ring having a bicyclo skeleton include an oxabicyclo ring. The cationically polymerizable group containing an oxygen-containing heterocyclic ring is incorporated in the cationically polymerizable compound as a monovalent substituent or a divalent or higher polyvalent substituent. In addition, even in a case where the fused ring is a fused ring in which two or more oxygen-containing heterocyclic rings are fused, the fused ring may be obtained by fusing of one or more oxygen-containing heterocyclic rings, and one or more ring structures other than the above-mentioned oxygen-containing heterocyclic rings. Examples of the ring structure other than the above-mentioned oxygen-containing heterocyclic ring include, but are not limited to, cycloalkane rings such as cyclohexane ring.

Specific examples of the oxygen-containing heterocyclic ring are shown below. However, the present invention is not limited to the following specific examples.

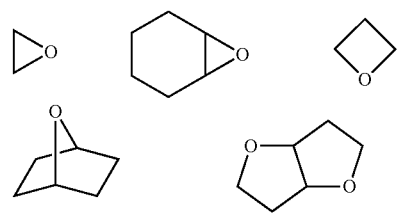

The cationically polymerizable compound (A) may contain a partial structure other than the cationically polymerizable group Such a partial structure is not particularly limited, and it may be a linear structure, a branched structure, or a cyclic structure. These partial structures may contain one or more heteroatoms such as oxygen atoms and nitrogen atoms.

As one preferred embodiment of the cationically polymerizable compound (A), it is possible to mention a compound containing a cyclic structure (a cyclic structure-containing compound) as a cationically polymerizable group, or as a partial structure other than the cationically polymerizable group. The number of cyclic structures contained in the cyclic structure-containing compound is, for example, one in one molecule, it may be two or more, and it is, for example, one to five, but it is not particularly limited. The compound containing two or more cyclic structures in one molecule may contain the same cyclic structure, or may contain two or more kinds of cyclic structures having different structures.

An oxygen-containing heterocyclic ring can be mentioned as an example of the cyclic structure contained in the cyclic structure-containing compound. The details are as described above.

A cationically polymerizable group equivalent (=B/C) obtained by dividing the molecular weight (hereinafter, referred to as "B") by the number of cationically polymerizable groups (hereinafter, referred to as "C") contained in one molecule of the cationically polymerizable compound (A) is, for example, 300 or less, and it is preferably less than 150 from the viewpoint of improving adhesiveness between the HC layer obtained by curing the curable composition for forming an HC layer and the resin film. On the other hand, the cationically polymerizable group equivalent is preferably 50 or more from the viewpoint of hygroscopicity of the HC layer obtained by curing the curable composition for forming an HC layer. Furthermore, in one aspect, the cationically polymerizable group contained in the cationically polymerizable compound for which the equivalent weight of the cationically polymerizable group is to be calculated can be an epoxy group (oxirane ring). That is, in one aspect, the cationically polymerizable compound (A) is an epoxy group (oxirane ring)-containing compound Regarding the epoxy group (oxirane ring)-containing compound, an epoxy group equivalent, which is obtained by dividing the molecular weight by the number of epoxy groups (oxirane ring) contained in one molecule, is preferably less than 150 from the viewpoint of improving adhesiveness between the HC layer obtained by curing the curable composition for forming an HC layer and the resin film. The epoxy group equivalent of the epoxy group (oxirane ring)-containing compound is, for example, 50 or more.

In addition, a molecular weight of the cationically polymerizable compound (A) is preferably 500 or less and is more preferably 300 or less. It is presumed that the cationically polymerizable compound having a molecular weight in the above range tends to easily permeate the resin film, and can contribute to the improvement of adhesiveness between the HC layer obtained by curing the curable composition for forming an HC layer and the resin film.

The curable composition for forming an HC layer according to the second aspect (2) includes a cationically polymerizable compound of (a-1) which contains an alicyclic epoxy group and an ethylenically unsaturated group, and has molecular weight of 300 or less, and in which the number of alicyclic epoxy groups contained in one molecule is one, and the number of ethylenically unsaturated groups contained in one molecule is one. Hereinafter, the cationically polymerizable compound of (a-1) is referred to as "(a-1) component."

Examples of the ethylenically unsaturated group include radically polymerizable groups including an acryloyl group, a methacryloyl group, a vinyl group, a styryl group, an allyl group, and the like. Among them, an acryloyl group, a methacryloyl group, or $C(=O)OCH=CH_2$ is preferable, and an acryloyl group or a methacryloyl group is more preferable. Each of the number of alicyclic epoxy groups and the number of ethylenically unsaturated groups in one molecule is preferably one.

A molecular weight of the (a-1) component is 300 or less, preferably 210 or less, and more preferably 200 or less.

As a preferred aspect of the (a-1) component, a compound represented by General Formula (1) can be mentioned.

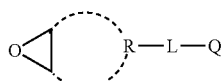

(1)

In General Formula (1), a ring R represents a monocyclic hydrocarbon or a crosslinked hydrocarbon, L represents a single bond or a divalent linking group, and Q represents an ethylenically unsaturated group. The ring R means a ring having at least two carbon atoms constituting the oxirane ring in Formula (1) and R as ring-constituting atoms.

In a case where R in General Formula (1) is a monocyclic hydrocarbon, the monocyclic hydrocarbon is preferably an alicyclic hydrocarbon, and among them, it is more preferably an alicyclic hydrocarbon (group) having 4 to 10 carbon atom, it is even more preferably an alicyclic hydrocarbon (group) having 5 to 7 carbon atoms, and it is particularly preferably an alicyclic hydrocarbon (group) having 6 carbon atoms. Specific preferred examples include a cyclobutyl group (cyclobutane), a cyclopentyl group (cyclopentane), a cyclohexyl group (cyclohexane), and a cycloheptyl group (cycloheptane), and a cyclohexyl group (cyclohexane) is more preferred.

In a case where R in General Formula (1) is a crosslinked hydrocarbon, the crosslinked hydrocarbon is preferably a bicyclic crosslinked hydrocarbon (bicyclo ring) or a tricyclic crosslinked hydrocarbon (tricyclo ring). Specific examples thereof include crosslinked hydrocarbons having 5 to 20 carbon atoms. Examples thereof include a norbornyl group (norbornane), a bornyl group (bornane), an isobornyl group (isobornane), a tricyclodecyl group (tricyclodecane), a dicyclopentenyl group (dicyclopentene), a dicyclopentanyl group (dicyclopentane), a tricyclopentenyl group (tricyclopentene), a tricyclopentanyl group (tricyclopentane), an adamantyl group (adamantane), a lower (for example, 1 to 6 carbon atoms) alkyl group-substituted adamantyl group (adamantane), and the like.

In a case where L represents a divalent linking group, the divalent linking group is preferably a divalent aliphatic hydrocarbon group. The divalent aliphatic hydrocarbon group preferably has 1 to 6 carbon atoms, more preferably has 1 to 3 carbon atoms, and even more preferably has 1 carbon atom. As the divalent aliphatic hydrocarbon group, a linear, branched, or cyclic alkylene group is preferable, a linear or branched alkylene group is more preferable, and a linear alkylene group is even more preferable.

Examples of Q include ethylenically unsaturated groups including an acryloyl group, a methacryloyl group, a vinyl group, a styryl group, an allyl group, and the like. Among them, an acryloyl group, a methacryloyl group, or $C(=O)OCH=CH_2$ is preferable, and an acryloyl group or a methacryloyl group is more preferable.

Specific examples of the (a-1) component include various compounds exemplified in paragraph 0015 of JP1998-017614A (JP-H10-017614A), compounds represented by General Formula (1A) or (1B), and 1,2-epoxy-4-vinylcyclohexane, and the like. Among them, the compounds represented by General Formula (1A) or (1B) are more preferable. In addition, an isomer of the compound represented by General Formula (1A) is also preferable.

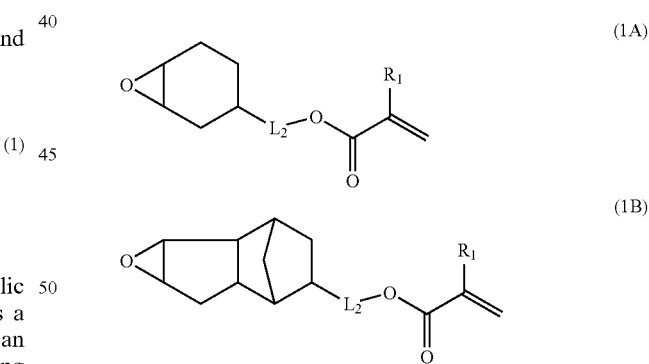

(1A)

(1B)

In General Formulas (1A) and (1B), $R_1$ represents a hydrogen atom or a methyl group, and $L_2$ represents a divalent aliphatic hydrocarbon group having 1 to 6 carbon atoms.

The number of carbon atoms of the divalent aliphatic hydrocarbon group represented by $L_2$ in General Formulas (1A) and (1B) is 1 to 6, is more preferably 1 to 3, and is even more preferably 1. As the divalent aliphatic hydrocarbon group, a linear, branched, or cyclic alkylene group is preferable, a linear or branched alkylene group is more preferable, and a linear alkylene group is even more preferable.

The HC layer obtained by curing the curable composition for forming an HC layer of the second aspect (2) preferably contains 15 to 70 mass % of the structure derived from (a-1), more preferably contains 18 to 50 mass % thereof, and even more preferably contains 22 to 40 mass % thereof, in a case where the total solid content of the HC layer is 100 mass %. Furthermore, the curable composition for forming an HC layer of the second aspect (2) preferably contains 15 to 70 mass % of the (a-1) component, more preferably contains 18 to 50 mass % thereof, and even more preferably contains 22 to 40 mass % thereof, in a case where the total solid content of the curable composition for forming an HC layer is 100 mass %.

A nitrogen-containing heterocyclic ring can be mentioned as another example of the cyclic structure contained in the cyclic structure-containing compound. The compound containing a nitrogen-containing heterocyclic ring is a preferable cationically polymerizable compound from the viewpoint of improving adhesiveness between the HC layer obtained by curing the curable composition for forming an HC layer and the resin film. As the compound containing a nitrogen-containing heterocyclic ring, a compound having at least one nitrogen-containing heterocyclic ring of an isocyanurate ring (a nitrogen-containing heterocyclic ring contained in exemplary compounds B-1 to B-3 to be described later) or a glycoluril ring (a nitrogen-containing heterocyclic ring contained in an exemplary compound B-10 to be described later) in one molecule is preferable. Among them, a compound containing an isocyanurate ring (an isocyanurate ring-containing compound) is a more preferable cationically polymerizable compound from the viewpoint of improving adhesiveness between the HC layer obtained by curing the curable composition for forming an HC layer and the resin film. The inventors of the present invention presume that this is because the isocyanurate ring has excellent affinity with the resin constituting the resin film. From this viewpoint, a resin film containing an acrylic resin film is more preferable, and it is even more preferable that the surface, which is in direct contact with the HC layer obtained by curing the curable composition for forming an HC layer, be a surface of the acrylic resin film.

Furthermore, an alicyclic structure can be mentioned as another example of the cyclic structure contained in the cyclic structure-containing compound. Examples of the alicyclic structure include a cyclo ring, a dicyclo ring, and a tricyclo ring structure, and specific examples thereof include a dicyclopentanyl ring, a cyclohexane ring, and the like.

The cationically polymerizable compound described above can be synthesized by a known method. In addition, it is also possible to obtain a commercially available product.

Specific examples of the cationically polymerizable compound (A) containing an oxygen-containing heterocyclic ring (group) as the cationically polymerizable group include 3,4-epoxycyclohexyl methyl methacrylate (commercially available product such as CYCLOMER M100 manufactured by DAICEL), 3,4-epoxycyclohexylmethyl-3',4'-epoxycyclohexanecarboxylate (for example, commercially available products such as UVR 6105 and UVR 6110 manufactured by Union Carbide Corporation, and CELLOXIDE 2021 and the like manufactured by Daicel Chemical Industries. Ltd.), bis(3,4-epoxycyclohexylmethyl) adipate (for example, UVR 6128 manufactured by Union Carbide Corporation), vinylcyclohexene monoepoxide (for example, CELLOXIDE 2000 manufactured by Daicel Chemical Industries, Ltd.). ε-caprolactone-modified 3,4-epoxycyclohexylmethyl 3'4-epoxycyclohexanecarboxylate (for example, CELLOXIDE 2081 manufactured by Daicel Chemical Industries, Ltd.), 1-methyl-4-(2-methyloxiranyl)-7-oxabicyclo[4,1,0]heptane (for example, CELLOXIDE 3000 manufactured by Daicel Chemical Industries, Ltd.), 7,7'-dioxa-3,3'-bis[bicyclo [4.1.0]heptane] (for example, CELLOXIDE 8000 manufactured by Daicel Chemical Industries, Ltd.), 3-ethyl-3-hydroxymethyloxetane, 1,4-bis{[(3-ethyl-3-oxetanyl) methoxy]methyl}benzene, 3-ethyl-3-(phenoxymethyl) oxetane, 3-ethyl-3-(2-ethylhexyloxymethyl)oxetane, di[1-ethyl(3-oxetanyl)]methyl ether, and the like.

Specific examples of the cationically polymerizable compound (A) containing a vinyl ether group as the cationically polymerizable group include 14-butanediol divinyl ether, 1,6-hexanediol divinyl ether, nonanediol divinyl ether, cyclohexanediol divinyl ether, cyclohexanedimethanol divinyl ether, triethylene glycol divinyl ether, trimethylolpropane trivinyl ether, pentaerythritol tetravinyl ether, and the like. As the cationically polymerizable compound containing a vinyl ether group, those having an alicyclic structure are also preferable.

Furthermore, as the cationically polymerizable compound (A), it is also possible to use compounds exemplified in JP1996-143806A (JP-H08-143806A). JP1996-283320A (JP-H08-283320A), JP2000-186079A, JP2000-327672A, JP2004-315778A, JP2005-029632A. and the like.

Exemplary compounds B-1 to B-14 are shown below as specific examples of the cationically polymerizable compound (A), but the present invention is not limited to the following specific examples.

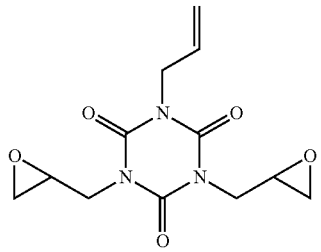

B-1

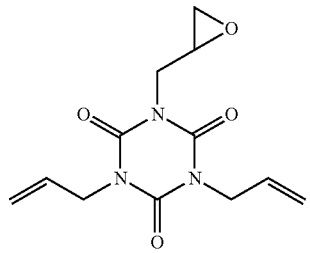

B-2

-continued
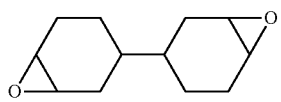
B-3
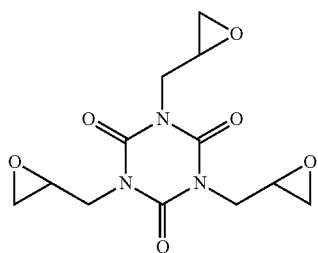
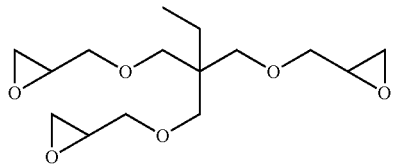
B-4
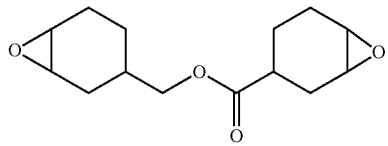
B-5
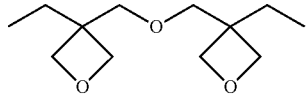
B-6
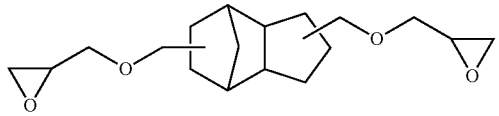
B-7
B-8
B-9
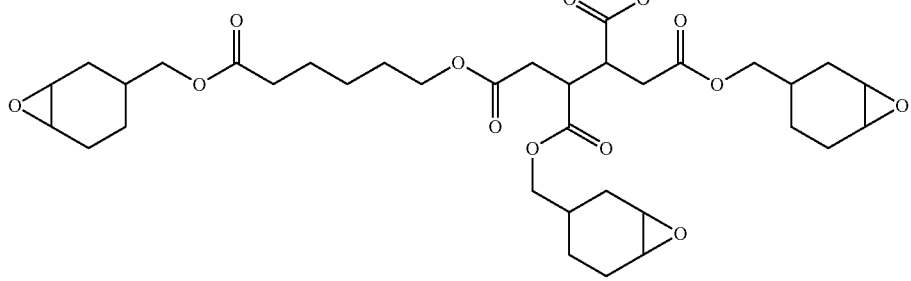
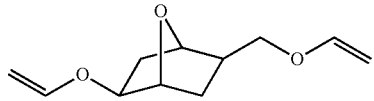
B-11
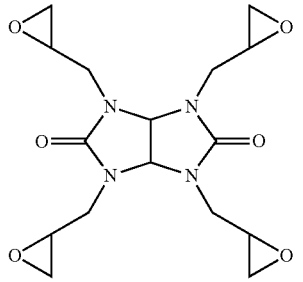
B-10
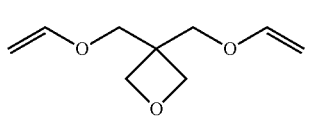
B-12
B-13
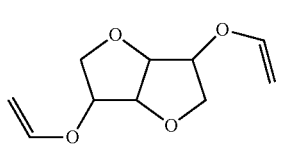
B-14
Furthermore, from the viewpoint of improving adhesiveness between the HC layer obtained by curing the curable composition for forming an HC layer and the resin film, examples of preferred aspects of the curable composition for forming an HC layer include the following aspects of (1) to (4). It is more preferable to satisfy one or more of the following aspects, it is even more preferable to satisfy two or more thereof, it is still more preferable to satisfy three or more thereof, and it is further still more preferable to satisfy all thereof. It is also preferable that one cationically polymerizable compound satisfy a plurality of aspects. For example, an aspect in which a compound containing a nitrogen-containing heterocyclic ring having a cationically polymerizable group equivalent of less than 150 can be exemplified as a preferred aspect.

(1) A compound containing a nitrogen-containing heterocyclic ring is incorporated as the cationically polymerizable compound. The nitrogen-containing heterocyclic ring contained in the compound containing a nitrogen-containing heterocyclic ring is preferably at least one of an isocyanurate ring or a glycoluril ring. The compound containing a nitrogen-containing heterocyclic ring is more preferably an isocyanurate ring-containing compound. The isocyanurate ring-containing compound is more preferably an epoxy ring-containing compound containing one or more epoxy rings in one molecule.

(2) The cationically polymerizable compound includes a cationically polymerizable compound having a cationically polymerizable group equivalent of less than 150. It preferably contains an epoxy group-containing compound having an epoxy group equivalent of less than 150.

(3) The cationically polymerizable compound contains an ethylenically unsaturated group.

(4) As a cationically polymerizable compound, an oxetane ring-containing compound containing one or more oxetane rings in one molecule is incorporated together with other cationically polymerizable compounds. The oxetane ring-containing compound is preferably a compound not containing a nitrogen-containing heterocyclic ring.

A content of the cationically polymerizable compound (A) in the curable composition for forming an HC layer is preferably 10 parts by mass or more, more preferably 15 parts by mass or more, and even more preferably 20 parts by mass or more with respect to 100 parts by mass of a total content of the radically polymerizable compound (B) and the cationically polymerizable compound (A). In addition, a content of the cationically polymerizable compound (A) in the curable composition for forming an HC layer is preferably 50 parts by mass or less with respect to 100 parts by mass of the total content of the radically polymerizable compound (B) and the cationically polymerizable compound (A).

In addition, a content of the cationically polymerizable compound (A) in the curable composition for forming an HC layer is preferably 0.05 part by mass or more, more preferably 0.1 part by mass or more, and even more preferably 1 part by mass or more with respect to 100 parts by mass of a total content of the first radically polymerizable compound and the cationically polymerizable compound (A). Meanwhile, a content of the cationically polymerizable compound (A) is preferably 50 parts by mass or less and more preferably 40 parts by mass or less with respect to 100 parts by mass of the total content of the first radically polymerizable compound and the cationically polymerizable compound (A).

In the present specification, the compound having both a cationically polymerizable group and a radically polymerizable group is classified as a cationically polymerizable compound (A), and a content in the curable composition for forming an HC layer is also defined according to this classification.

—Polymerization Initiator—

The curable composition for forming an HC layer preferably contains a polymerization initiator, and more preferably contains a photopolymerization initiator. The curable composition for forming an HC layer containing the radically polymerizable compound (B) preferably contains a radical photopolymerization initiator, and the curable composition for forming an HC layer containing the cationically polymerizable compound (A) preferably contains a cationic photopolymerization initiator. The radical photopolymerization initiator may be used alone or in combination of two or more kinds having different structures. The same also applies to the cationic photopolymerization initiator.

Hereinafter, each of the photopolymerization initiators will be sequentially described.

(i) Radical Photopolymerization Initiator

Any radical photopolymerization initiator may be used as long as it can generate a radical as an active species upon irradiation with light, and known radical photopolymerization initiators can be used without any limitation. Specific examples thereof include acetophenones such as diethoxyacetophenone, 2-hydroxy-2-methyl-1-phenylpropan-1-one, benzyldimethylketal, 4-(2-hydroxyethoxy)phenyl-(2-hydroxy-2-propyl)ketone, 1-hydroxycyclohexylphenyl ketone, 2-methyl-2-morpholino(4-thiomethylphenyl)propan-1-one, 2-benzyl-2-dimethylamino-1-(4-morpholinophenyl)butanone, 2-hydroxy-2-methyl-1-[4-(1-methylvinyl)phenyl] propanone oligomer, and 2-hydroxy-1-{4-[4-(2-hydroxy-2-methyl-propionyl)-benzyl]phenyl}-2-methyl-propan-1-one; oxime esters such as 1,2-octanedione, 1-[4-(phenylthio)-,2-(O-benzoyloxime)], and ethanone, 1-[9-ethyl-6-(2-methylbenzoyl)-9H-carbazol-3-yl]-, 1-(0-acetyloxime); benzoins such as benzoin, benzoin methyl ether, benzoin ethyl ether, benzo isopropyl ether, and benzoin isobutyl ether; benzophenones such as benzophenone, ortho-benzoyl methyl benzoate, 4-phenylbenzophenone, 4-benzoyl-4'-methyl-diphenyl sulfide, 3,3',4,4'-tetra(t-butylperoxycarbonyl) benzophenone, 2,4,6-trimethylbenzophenone, 4-benzoyl-N, N-dimethyl-N-[2-(1-oxo-2-propenyloxy)ethyl] benzenemethanaminium bromide, and (4-benzoylbenzyl) trimethylammonium chloride; thioxanthones such as 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthone-9-one mesochloride; acylphosphine oxides such as 2,4,6-trimethylbenzoyl-diphenylphosphine oxide, bis(2,6-dimethoxybenzoyl)-2,4,4-trimethyl-pentylphosphine oxide, and bis(2,4,6-trimethylbenzoyl)-phenylphosphine oxide; and the like. Furthermore, as an auxiliary agent of a radical photopolymerization initiator, triethanolamine, triisopropanolamine, 4,4'-dimethylaminobenzophenone (Michler's ketone), 4,4'-diethylaminobenzophenone, 2-dimethylaminoethylbenzoic acid, ethyl 4-dimethylaminobenzoate, (n-butoxy)ethyl 4-dimethylaminobenzoate, isoamyl 4-dimethylaminobenzoate, 2-ethylhexyl 4-dimethylaminobenzoate, 2,4-diethylthioxanthone, 2,4-diisopropylthioxanthone, and the like may be used in combination.

The above radical photopolymerization initiator and auxiliary agent can be synthesized by a known method, and are also available as commercially available products. Preferred examples of commercially available radical photopolymerization initiators include IRGACURE (127, 651, 184, 819, 907, 1870 (CGI-403/Irg 184=7/3 mixing initiator), 500, 369, 1173, 2959, 4265, 4263, and OXE 01), and the like manufactured by BASF, KAYACURE (DETX-S, BP-100, BDMK, CTX, BMS, 2-EAQ, ABQ, CPTX, EPD, ITX, QTX, BTC, MCA, and the like) manufactured by Nippon Kayaku Co., Ltd.; Esacure (KIP100F, KB1, EB3, BP, X33, KT046, KT37, KIP150, and TZT) manufactured by Sartomer Arkema Inc.; and the like.

A content of the radical photopolymerization initiator in the curable composition for forming an HC layer may be appropriately adjusted within a range in which the polymerization reaction (radical polymerization) of the radically polymerizable compound favorably proceeds, and the content is not particularly limited. An amount thereof is, for example, 0.1 to 20 parts by mass, preferably 0.5 to 10 parts by mass, and more preferably 1 to 10 parts by mass with respect to 100 parts by mass of the radically polymerizable compound contained in the curable composition for forming an HC layer.

(ii) Cationic Photopolymerization Initiator

Any cationic photopolymerization initiator may be used as long as it can generate a cationic (acid) as an active species upon irradiation with light, and known cationic photopolymerization initiators can be used without any limitation. Specific examples thereof include known sulfonium salts, ammonium salts, iodonium salts (for example, diaryliodonium salts), triarylsulfonium salts, diazonium salts, iminium salts, and the like. More specific examples thereof include cationic photopolymerization initiators represented by Formulas (25) to (28) shown in paragraphs 0050 to 0053 of JP 996-143806A (JP-H08-143806A), a cationic photopolymerization initiators exemplified as a cationic polymerization catalyst in paragraph 0020 of JP1996-283320A (JP-H08-283320A), and the like. Furthermore, the cationic photopolymerization initiator can be synthesized by a known method and is also available as a commercially available product. As commercially available products, it is possible to use CI-1370, CI-2064, CI-2397, CI-2624, CI-2639, CI-2734, CI-2758, CI-2823, CI-2855, and CI-5102, which are manufactured by Nippon Soda Co., Ltd.; PHOTOINITIATOR 2047 and the like manufactured by Rhodia; UVI-6974 and UVI-6990 manufactured by Union Carbide Corporation; and CPI-10P manufactured by San-Apro Ltd.

As the cationic photopolymerization initiator, diazonium salts, iodonium salts, sulfonium salts, or iminium salts are preferable from the viewpoints of sensitivity of the photopolymerization initiator to light, stability of the compound, and the like. Iodonium salts are most preferable from the viewpoint of weather fastness.

Specific commercially available products of iodonium salt-based cationic photopolymerization initiators include B2380 manufactured by Tokyo Kasei Kogyo Co., Ltd., BBI-102 manufactured by Midori Kagaku Co Ltd., WPI-113 manufactured by Wako Pure Chemical Industries, Ltd., WPI-124 manufactured by Wako Pure Chemical Industries, Ltd., WPI-169 manufactured by Wako Pure Chemical Industries, Ltd., WPI-170 manufactured by Wako Pure Chemical Industries, Ltd., and DTBPI-PFBS manufactured by Toyo Gosei Co., Ltd.

In addition, specific examples of the iodonium salt compound that can be used as the cationic photopolymerization initiator include the following compounds PAG-1 and PAG-2.

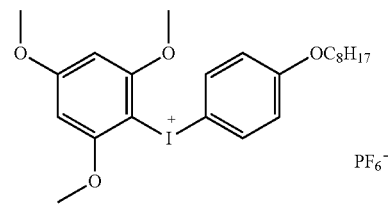

Cationic photopolymerization initiator
(iodonium salt compound) PAG-1

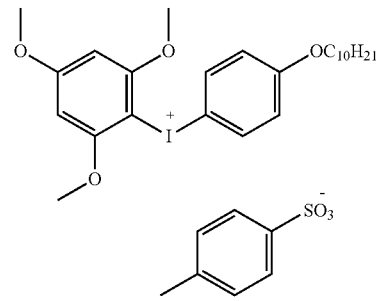

Cationic photopolymerization initiator
(iodonium salt compound) PAG-2

A content of the cationic photopolymerization initiator in the curable composition for forming an HC layer may be appropriately adjusted within a range in which the polymerization reaction (cationic polymerization) of the cationically polymerizable compound favorably proceeds, and the content is not particularly limited. An amount thereof is, for example, 0.1 to 200 parts by mass, preferably 1 to 150 parts by mass, and more preferably 2 to 100 parts by mass with respect to 100 parts by mass of the cationically polymerizable compound.

Examples of other photopolymerization initiators include photopolymerization initiators described in paragraphs 0052 to 0055 of JP209-204725A, and contents of this publication are incorporated in the present invention.

—Components that can be Optionally Incorporated in Curable Composition for Forming HC Layer—

The curable composition for forming an HC layer contains at least one component having a property of being cured by irradiation with active energy rays, a fluorine-containing compound, and a polysiloxane-containing compound, and optionally, it preferably contains at least one polymerization initiator Details thereof are as described above.

Next, various components that can be optionally contained in the curable composition for forming an HC layer will be described.

(i) Inorganic Particles

The curable composition for forming an HC layer may include inorganic particles having an average primary particle size of less than 2 μm. From the viewpoint of improving hardness of a front surface plate having an HC layer obtained by curing the curable composition for forming an HC layer (and further improving hardness of a liquid crystal panel having this front surface plate), the curable composition for forming an HC layer, and the HC layer obtained by curing this composition preferably contain inorganic particles having an average primary particle size of less than 2 μm. An average primary particle size of the inorganic particles is preferably 10 nm to 1 μm, more preferably 10 nm to 100 nm, and even more preferably 10 nm to 50 nm.

Regarding the average primary particle size of the inorganic particles and matte particles to be described later, particles are observed with a transmission electron microscope (magnification: 500,000 to 2,000,000 times), 100 randomly selected particles (primary particles) are observed, and an average value of those particle sizes is used as the average primary particle size.

Examples of the inorganic particles include silica particles, titanium dioxide particles, zirconium oxide particles, aluminum oxide particles, and the like. Among them, silica particles are preferable.

A surface of the inorganic particles is preferably treated with a surface modifier containing an organic segment in order to enhance affinity with organic components contained in the curable composition for forming an HC layer. The surface modifier is preferably a surface modifier having, in the same molecule, a functional group capable of forming a bond with or adsorbing on to the inorganic particles, and a functional group having a high affinity for organic components. Preferred examples of the surface modifier having a functional group capable of bonding to or adsorbing on to the inorganic particles include silane surface modifiers, surface modifiers of metal alkoxide such as aluminum, titanium, and zirconium; and surface modifiers having an anionic group such as a phosphoric acid group, a sulfuric acid group, a sulfonic acid group, and a carboxylic acid group. Examples of the functional group having high affinity with organic components include a functional group having hydrophilicity and hydrophobicity similar to those of the organic components, a functional group capable of chemically bonding to the organic components, and the like. Among them, a functional group that can be chemically bonded to organic components is preferable, and an ethylenically unsaturated group or a ring-opening polymerizable group is more preferable.

A preferable inorganic particle surface modifier is a surface modifier of a metal alkoxide or a polymerizable compound having an anionic group and an ethylenically unsaturated group or a ring-opening polymerizable group in the same molecule. A crosslinking density of the HC layer can be increased by chemically bonding the inorganic particles and the organic components using these surface modifiers, and as a result, hardness of a front surface plate (and hardness of a liquid crystal panel including this front surface plate) can be improved.

Specific examples of the surface modifier include the following exemplary compounds S-1 to S-8.

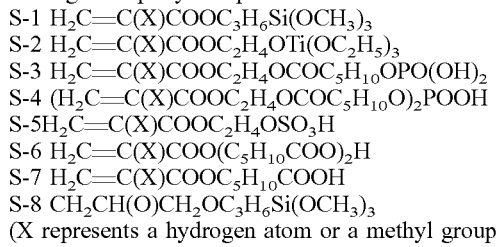

S-1 $H_2C=C(X)COOC_3H_6Si(OCH_3)_3$
S-2 $H_2C=C(X)COOC_2H_4OTi(OC_2H_5)_3$
S-3 $H_2C=C(X)COOC_2H_4OCOC_5H_{10}OPO(OH)_2$
S-4 $(H_2C=C(X)COOC_2H_4OCOC_5H_{10}O)_2POOH$
S-5 $H_2C=C(X)COOC_2H_4OSO_3H$
S-6 $H_2C=C(X)COO(C_5H_{10}COO)_2H$
S-7 $H_2C=C(X)COOC_5H_{10}COOH$
S-8 $CH_2CH(O)CH_2OC_3H_6Si(OCH_3)_3$ (X represents a hydrogen atom or a methyl group)

The surface modification of the inorganic particles using the surface modifier is preferably performed in a solution. In a case where mechanically dispersing the inorganic particles, a surface modifier may be present together, a surface modifier may be added and stirred after the inorganic particles is mechanically dispersed, or surface modification may be performed before mechanically dispersing the inorganic particles, and then dispersion is performed thereafter (if necessary, heating, heating after drying, or changing of a pH (power of hydrogen) may be performed). As the solvent for dissolving the surface modifier, an organic solvent having a large polarity is preferable. Specific examples include known solvents such as alcohols, ketones, and esters.

A content of the inorganic particles is preferably 50 mass % or less, more preferably 40 mass % or less, and even more preferably 30 mass % or less, in a case where a total solid content of the curable composition for forming an HC layer is 100 mass %. A lower limit value of the content is not particularly limited, and it may be 0 mass % (inorganic particles may not be contained in the HC layer), but in a case where inorganic particles are contained, the lower limit value is preferably 1 mass % or more, and is more preferably 7 mass % or more. A shape of primary particles of the inorganic particles may be spherical or non-spherical, but the primary particles of the inorganic particles are preferably spherical. In the HC layer obtained by curing the curable composition for forming an HC layer, they are more preferably present as higher-order particles of non-spherical secondary particles in which 2 to 10 spherical inorganic particles (primary particles) are connected, from the viewpoint of further improving hardness.

Specific examples of the inorganic particles include ELCOM V-8802 (spherical silica particles having an average primary particle size of 12 nm, manufactured by JGC Catalysts and Chemicals Ltd.), ELCOM V-8803 (deformed silica particles manufactured by JGC Catalysts and Chemicals Ltd.), MIBK-SD (spherical silica particles having an average primary particle size of 10 to 20 nm, manufactured by Nissan Chemical Industries. Ltd.), MEK-AC-2140Z (spherical silica particles having an average primary particle size of 10 to 20 nm, manufactured by Nissan Chemical Industries, Ltd.). MEK-AC-4130 (spherical silica particles having an average primary particle size of 45 nm, manufactured by Nissan Chemical Industries. Ltd.), MIBK-SD-L (spherical silica particles having an average primary particle size of 40 to 50 nm, manufactured by Nissan Chemical Industries, Ltd.). MEK-AC-5140Z (spherical silica particles having an average primary particle size of 85 nm, manufactured by Nissan Chemical Industries, Ltd.), and the like. Among them, ELCOM V-8802 manufactured by JGC Catalysts and Chemicals Ltd. is preferable from the viewpoint of further improving hardness.

(ii) Matt Particles

The curable composition for forming an HC layer can also include matte particles. The matte particles mean particles having an average primary particle size of 2 μm or more, and they may be inorganic particles or organic particles, or particles of inorganic and organic composite materials. A shape of the matte particles may be spherical or non-spherical. An average primary particle size of the matte particles is preferably 2 to 20 μm, more preferably 4 to 14 μm, and even more preferably 6 to 10 μm.

Specific examples of the matte particles include inorganic particles such as silica particles and $TiO_2$ particles, and organic particles such as crosslinked acrylic particles, crosslinked acryl-styrene particles, crosslinked styrene particles, melamine resin particles, and benzoguanamine resin particles. Among them, the matte particles are preferably organic particles, and are more preferably crosslinked acrylic particles, crosslinked acryl-styrene particles, or crosslinked styrene particles.

A content of the matte particles as a content per unit volume in the HC layer obtained by curing the curable composition for forming an HC layer is preferably 0.10 g/cm$^3$ or more, more preferably 0.10 g/cm$^3$ to 0.40 g/cm$^3$, and even more preferably 0.10 g/cm$^3$ to 0.30 g/cm$^3$.

(iii) Ultraviolet Absorber

The curable composition for forming an HC layer preferably contains an ultraviolet absorber. Examples of the ultraviolet absorber include benzotriazole compounds and triazine compounds. The benzotriazole compound is a compound having a benzotriazole ring, and specific examples thereof include various benzotriazole ultraviolet absorbers described in paragraph 0033 of JP2013-11835A. The triazine compound is a compound having a triazine ring, and specific examples thereof include various triazine ultraviolet absorbers described in paragraph 0033 of JP2013-111835A. A content of the ultraviolet absorber in the HC layer is, for example, about 0.1 to 10 parts by mass with respect to 100 parts by mass of the resin (polymer component) contained in the HC layer, but the content is not particularly limited. Furthermore, regarding the ultraviolet absorber, reference can be made to paragraph 0032 of JP2013-111835A. Ultraviolet rays referred to in the present specification mean light having an emission central wavelength in a wavelength range of 200 to 380 nm.

(iv) Leveling Agent

The curable composition for forming an HC layer preferably contains a leveling agent.

A fluorine-containing polymer is preferably used as the leveling agent. For example, the fluoroaliphatic group-containing polymer described in JP5175831B can be mentioned. Furthermore, as a leveling agent, it is possible to use a fluoroaliphatic group-containing polymer in which a content of a fluoroaliphatic group-containing monomer represented by General Formula (1) described in the same paten application is 50 mass % or less of all polymerized units as a component constituting the polymer in the fluoroaliphatic group-containing polymer.

In addition to the above examples, a leveling agent described in "(vi) Other components" to be described later can be incorporated.

In a case where the curable composition for forming an HC layer contains a leveling agent, a content thereof is preferably 0.01 to 7 mass %, more preferably 0.05 to 5 mass %, and even more preferably 0.1 to 2 mass % in a solid content of the curable composition for forming an HC layer.

The curable composition for forming an HC layer may include only one kind of leveling agent, or may include two or more kinds of leveling agents. In a case where two or more kinds are contained, a total amount is preferably within the above range.

(v) Solvent

The curable composition for forming an HC layer also preferably contains a solvent. As the solvent, an organic solvent is preferable, and one kind or two or more kinds of organic solvents can be mixed and used at an arbitrary ratio. Specific examples of the organic solvent include alcohols such as methanol, ethanol, propanol, n-butanol, and i-butanol, ketones such as acetone, methyl isobutyl ketone, methyl ethyl ketone, and cyclohexanone; cellosolves such as ethyl cellosolve; aromatic compounds such as toluene and xylene; glycol ethers such as propylene glycol monomethyl ether; acetic acid esters such as methyl acetate, ethyl acetate, and butyl acetate, diacetone alcohols, and the like. Among them, cyclohexanone, methyl ethyl ketone, methyl isobutyl ketone, or methyl acetate is preferable, and it is more preferable to mix and use at least two or more of cyclohexanone, methyl ethyl ketone, methyl isobutyl ketone, and methyl acetate in an arbitrary ratio. With such a constitution, an optical film having more excellent rub resistance, a punching property, and adhesiveness can be obtained.

An amount of the solvent in the curable composition for forming an HC layer can be appropriately adjusted within a range in which suitability for application of the composition can be ensured. For example, an amount of the solvent can be set to 50 to 500 parts by mass, and can be preferably set to 80 to 200 parts by mass, with respect to 100 parts by mass of a total amount of the polymerizable compound and the photopolymerization initiator.

Furthermore, a total solid content in the curable composition for forming an HC layer is preferably 10 to 90 mass %, more preferably 50 to 80 mass %, and particularly preferably 65 to 75 mass %.

(vi) Other Components

The curable composition for forming an HC layer may contain one or more known additives in an arbitrary amount in addition to the above components. Examples of the additive include a surface conditioner, a leveling agent, a polymerization inhibitor, polyrotaxane, and the like. For details thereof, reference can be made to paragraphs 0032 to 0034 of JP2012-229412A, for example. However, the additives are not limited thereto, and various additives that can be generally added to the curable composition for forming an HC layer can be used.

The curable composition forming an HC layer can be prepared by mixing each of the various components described above at the same time or mixing each of them sequentially in an arbitrary order. A preparation method is not particularly limited, and a known stirrer or the like can be used for the preparation.

2) Laminate Structure of Two or More Layers

An aspect is preferable, in which an HC layer 2A in FIG. 1 has at least a first HC layer and a second HC layer in this order from a resin film 1A side in the optical film according to the embodiment of the present invention.

The first HC layer may be located on a surface of the resin film 1A, or another layer may be provided therebetween. Similarly, the second HC layer may be located on a surface of the first HC layer, or another layer may be provided therebetween From the viewpoint of improving adhesiveness between the first HC layer and the second HC layer, it is preferable that the second HC layer be located on the surface of the first HC layer, that is, both layers be in contact with each other in at least a part of the film surface.

Furthermore, each of the first HC layer and the second HC layer may be composed of one layer or two or more layers, and one layer is preferable.

Furthermore, as will be described later in detail, in a case where the optical film according to the embodiment of the present invention is used as a front surface plate of a touch panel or a front surface plate of a touch panel display, or as a protective film of a polarizing plate, the optical film is preferably disposed such that the second HC layer is on the front surface side (visible side) of the image display element. In order to improve rub resistance and a punching property of the surface of the optical film, the second HC layer is preferably disposed on the surface side of the optical film, particularly on the outermost surface.

<First HC Layer and Curable Composition for Forming First HC Layer>

The first HC layer used in the present invention is formed from a curable composition for forming a first HC layer.

The curable composition for forming a first HC layer preferably contains a polymerizable compound 1 having a radically polymerizable group, a cationically polymerizable group and a radically polymerizable group in the same molecule, and a polymerizable compound 2 different from a polymerizable compound 1.

(Polymerizable Compound)

As the polymerizable compound 1, the above description of the radically polymerizable compound (B) is preferably applied, and as the polymerizable compound 2, the above description of the cationically polymerizable compound (a-1) component is preferably applied.

Furthermore, the curable composition for forming a first HC layer may have another polymerizable compound different from the polymerizable compound 1 and the polymerizable compound 2.

The above-mentioned other polymerizable compound is preferably a polymerizable compound having a cationically polymerizable group. The above-mentioned cationically polymerizable group has the same meaning as the cationically polymerizable group described in the polymerizable compound 2 (that is, the cationically polymerizable group in the cationically polymerizable compound (a-1) cited in the polymerizable compound 2), and a preferred range thereof is also the same. In the present invention, a compound containing a nitrogen-containing heterocyclic ring which is a compound containing a cationically polymerizable group is particularly preferable as the other polymerizable compound. By using such a compound, adhesiveness between the resin film and the first HC layer can be more effectively improved. As the nitrogen-containing heterocyclic ring, at least one nitrogen-containing heterocyclic ring of an isocyanurate ring (a nitrogen-containing heterocyclic ring contained in exemplary compounds B-1 to B-3 to be described later) or a glycoluril ring (a nitrogen-containing heterocyclic ring contained in an exemplary compound B-10 to be described later) is exemplified, and an isocyanurate ring is preferable. The number of cationically polymerizable groups contained in the other polymerizable compound is preferably 1 to 10 and is more preferably 2 to 5. In a case where a polymerizable compound having a cationically polymerizable group and a nitrogen-containing heterocyclic ring structure is used as the other polymerizable compound, the resin film to be bonded to the first HC layer is preferably a resin film including an acrylic resin film. With such a constitution, adhesiveness between the resin film and the first HC layer tends to be further improved.

Specific examples of other polymerizable compounds include the above-mentioned exemplary compounds B-3 to B-9, but the present invention is not limited to the above-mentioned specific examples.

(Other)

In addition, the above-mentioned description of the fluorine-containing compound, the polysiloxane-containing compound, the polymerization initiator, the inorganic particles, the matte particles, the ultraviolet absorber, the leveling agent, the solvent, and the other components can be preferably applied.

The curable composition for forming a first HC layer particularly preferably contains a solvent.

<Second HC Layer and Curable Composition for Forming Second HC Layer>

The second HC layer used in the present invention is formed from a curable composition for forming a second HC layer.

The curable composition for forming a second HC layer contains at least the above-mentioned active energy curing component and, in addition, it preferably contains the above-mentioned polysiloxane-containing compound and fluorine-containing compound. The active energy curing component preferably contains at least the radically polymerizable compound (B) described above.

In addition, the curable composition for forming a first HC layer and the curable composition for forming a second HC layer are not particularly limited, and the above description of the HC layer and the curable composition for forming an HC layer can be applied.

(Thickness of HC Layer)

A thickness of the HC layer is preferably 3 µm to 100 µm, more preferably 5 µm to 70 µm, and even more preferably 10 µm to 50 µm.

(Pencil Hardness of HC Layer)

The harder the pencil hardness of the HC layer, the better. Specifically, it is preferably 3H or more, more preferably 5H or more, and even more preferably 7H or more.

—Method of Forming HC Layer—

The HC layer can be formed by applying the curable composition for forming an HC layer directly on the resin film or through another layer such as an easy-adhesion layer or the like, and irradiating with active energy rays. The application can be performed by a known coating method such as a dip coating method, an air knife coating method, a curtain coating method, a roller coating method, a die coating method, a wire bar coating method, and a gravure coating method. The HC layer can also be formed as an HC layer of a laminate structure having two or more layers (for example, about 2 to 5 layers) by applying two or more different compositions at the same time or sequentially.

The HC layer can be formed by irradiating the applied curable composition for forming an HC layer with active energy rays. For example, in a case where the curable composition for forming an HC layer contains a radically polymerizable compound, a cationically polymerizable compound, a radical photopolymerization initiator, and a cationic photopolymerization initiator, a polymerization reaction of each of the radically polymerizable compound and the cationically polymerizable compound can be initiated and allowed to proceed by the action of the radical photopolymerization initiator and the cationic photopolymerization initiator. A wavelength of a irradiation light may be determined according to the types of polymerizable compounds and polymerization initiators used. As a light source for light irradiation, it is possible to mention a high pressure mercury lamp, a super high pressure mercury lamp, a carbon arc lamp, a metal halide lamp, a xenon lamp, a chemical lamp, an electrodeless discharge lamp, and a light emitting diode (LED), all of which emit a light in a wavelength range of 150 to 450 nm. Furthermore, an amount of light irradiation is generally 30 to 3,000 m/cm$^2$, and is preferably 100 to 1,500 mJ/cm$^2$. A drying treatment may be performed as necessary before or after the light irradiation, or before and after the light irradiation. The drying treatment can be performed by blowing warm air, disposition in a heating furnace, conveying in the heating furnace, or the like. In a case where the curable composition for forming an HC layer contains a solvent, a heating temperature may be set to a temperature at which the solvent can be removed by drying, and it is not particularly limited. The heating temperature referred to means a temperature of warm air or an atmospheric temperature in the heating furnace.

<<Polarizing Plate>>

The polarizing plate according to the embodiment of the present invention includes at least a polarizing film (also referred to as a polarizer) and the optical film according to the embodiment of the present invention, and further includes a phase difference film on the surface of the polarizing film on which the optical film according to the embodiment of the present invention is not provided. The phase difference film is not particularly limited, and a commonly used phase difference film can be used.

Furthermore, the polarizing plate according to the embodiment of the present invention may include a shock absorbing layer on both sides of the polarizing film. As the shock absorbing layer, a shock absorbing layer generally used in a polarizing plate can be used without particular limitation, and the aforementioned shock absorbing layer in the optical film according to the embodiment of the present invention is preferably mentioned. Since the polarizing plate according to the embodiment of the present invention has the shock absorbing layer on both sides of the polarizing film, a shock absorption property can be further improved.

Among the polarizing plates according to the embodiment of the present invention, specific configuration examples of a polarizing plate including the optical film according to the embodiment of the present invention and the shock absorbing layer include a polarizing plate having the optical film according to the embodiment of the present invention, a polarizing film, and a shock absorbing layer in this order, and a polarizing plate having the optical film according to the embodiment of the present invention, a polarizing film, a resin film, and a shock absorbing layer in this order.

In the polarizing plate according to the embodiment of the present invention, a side of the optical film according to the embodiment of the present invention on which the shock absorbing layer is provided may be directly bonded to the polarizing film, a surface on the side opposite to the shock absorbing layer (that is, a surface on the resin film side) may be bonded to the polarizing film, or the shock absorbing layer and the polarizing film may be bonded via the resin film.

An adhesive or a pressure sensitive adhesive may be used in bonding of the optical film according to the embodiment of the present invention and the polarizing film, and bonding of the shock absorbing layer and the polarizing film. In this case, a conventional adhesive or pressure sensitive adhesive can be used. In a case where the shock absorbing layer is located on a bonding surface, bonding can be performed via the shock absorbing layer.

The polarizing plate according to the embodiment of the present invention is preferably used as either a front-side polarizing plate or a rear-side polarizing plate in a case of being incorporated into a liquid crystal panel. In a case where the polarizing plate is used as a front-side polarizing plate, the optical film according to the embodiment of the present invention may or may not have a hard coat layer, but the optical film preferably has the hard coat layer, and it more preferably has the hard coat layer on the most visible side in a case of being incorporated into a liquid crystal panel. Furthermore, in a case where the polarizing plate is used as a rear-side polarizing plate, the optical film according to the embodiment of the present invention may or may not have a hard coat layer.

Examples of polarizing films (also referred to as a polarizer) include an iodine-containing polarizing film, a dye-containing polarizing film in which a dichroic dye is used, a polyene-containing polarizing film, and the like. The iodine-containing polarizing film and the dye-containing polarizing film can be generally manufactured using a poly vinyl alcohol film. A protective film on the side of the polarizing film on which the optical film according to the embodiment of the present invention is not provided is generally a resin film. As such a protective film, a cellulose acylate film is exemplified.

(Brightness Enhancement Film)

A brightness enhancement film may be disposed on the polarizing plate according to the embodiment of the present invention. The brightness enhancement film is not particularly limited, and various known films can be used. Specific examples thereof include a dielectric multilayer film described in JP04091978B, DBEF (trade name) manufactured by 3M, APF-V3 and APF-V4 (both being trade names) manufactured by 3M, and the like. The brightness enhancement film may be disposed on the polarizing plate via the shock absorbing layer, or may be disposed on the polarizing plate via an adhesive or a pressure sensitive adhesive. In this case, various known adhesives or pressure sensitive adhesives can be used <<Liquid Crystal Panel>>

A liquid crystal panel includes at least a liquid crystal cell and a polarizing plate. The liquid crystal panel preferably includes the front-side polarizing plate, the liquid crystal cell, and the rear-side polarizing plate.

In the liquid crystal panel according to the embodiment of the present invention, it is preferable that at least one of the front-side polarizing plate or the rear-side polarizing plate be the polarizing plate according to the embodiment of the present invention, and it is more preferable that both be the polarizing plate according to the embodiment of the present invention. That is, it is preferable that the optical film in at least one of the front-side polarizing plate or the rear-side polarizing plate have the aforementioned shock absorbing layer, and it is more preferable that both of the optical film in the front-side polarizing plate and the optical film in the rear-side polarizing plate have the aforementioned shock absorbing layer.

In the front-side polarizing plate and the rear-side polarizing plate, there is no particular limitation on a relationship between the polarizing film of the polarizing plate and the shock absorbing layer, but the front-side polarizing plate preferably has the shock absorbing layer at least on a visible side with respect to the polarizing film of the rear-side polarizing plate, and the rear-side polarizing plate preferably has the shock absorbing layer at least on an invisible side with respect to the polarizing film of the front-side polarizing plate. It is thought that, by providing at least one of the front-side polarizing plate or the rear-side polarizing plate having the above-described configuration, the liquid crystal panel according to the embodiment of the present invention absorbs and disperses external shocks, and thereby can exhibit more excellent shock absorption properties.

Furthermore, in a case where at least one of the front-side polarizing plate or the rear-side polarizing plate preferably has the aforementioned shock absorbing layer on both sides of the polarizing film, this is preferable because then a shock absorption property can be further improved. In a case where both of the front-side polarizing plate and the rear-side polarizing plate have the aforementioned shock absorbing layer on both sides of the polarizing film, this is more preferable because then a shock absorption property is improved.

In a case where the shock absorbing layers are used for both the rear-side polarizing plate and the front-side polarizing plate as in the above-mentioned liquid crystal panel, these shock absorbing layers may be the same as or different from each other. In a case where the shock absorbing layers are different from each other, a storage elastic modulus E' of the shock absorbing layer at 25° C. and a frequency of $10^6$ Hz preferably satisfies the following expression.

$E'_f$ (storage elastic modulus E of shock absorbing layer of front-side polarizing plate)–$E'_r$ (storage elastic modulus E' of shock absorbing layer of rear-side polarizing plate)≥0

The liquid crystal panel according to the embodiment of the present invention can further disperse external shocks by satisfying the above expression. An upper limit value of a value represented by $E'_f$–$E'_r$ is not particularly limited.

The storage elastic modulus E' of the shock absorbing layer at 25° C. and a frequency of $10^6$ Hz is a value measured by the method described in the section of the optical film.

In a case where the rear-side polarizing plate has the two or more optical films according to the embodiment of the present invention, a storage elastic modulus of the shock absorbing layer located on the most invisible side is read as $E'_r$ in the above expression; and in a case where the front-side polarizing plate has the two or more optical films according to the embodiment of the present invention, a storage elastic modulus of the shock absorbing layer located on the most visible side is read as $E'_f$ in the above expression.

The liquid crystal cell has at least a liquid crystal and two alignment films sandwiching the liquid crystal, and in general, a glass substrate is disposed outside the alignment film. An image display element included in the liquid crystal panel according to the embodiment of the present invention is not particularly limited as long as it is a liquid crystal display element Examples thereof include a thin-film transistor liquid crystal display element. The liquid crystal display element may be the above-mentioned liquid crystal cell itself, or may be in a form having a touch sensor film or a touch panel on one surface of the liquid crystal cell as in the following on-cell touch panel.

The liquid crystal panel according to the embodiment of the present invention is also preferably a liquid crystal touch panel having a touch sensor (function). In this case, the liquid crystal display element is an in-cell touch panel display element or an on-cell touch panel display element. The in-cell touch panel display element and the on-cell touch panel display element are as described in the image display device to be described later in detail.

In a case where the liquid crystal panel according to the embodiment of the present invention includes the in-cell touch panel display element, the liquid crystal panel according to the embodiment of the present invention includes at least the in-cell touch panel display element and the polarizing plate, and preferably includes at least the front-side polarizing plate, the in-cell touch panel display element, and the rear-side polarizing plate.

In a case where the liquid crystal panel according to the embodiment of the present invention includes the on-cell touch panel display element, the liquid crystal panel according to the embodiment of the present invention includes at least the on-cell touch panel display element having the touch sensor film, and the polarizing plate, and preferably includes at least the front-side polarizing plate, the on-cell touch panel display element having the touch sensor film, and the rear-side polarizing plate.

In bonding of the polarizing plate according to the embodiment of the present invention to the liquid crystal cell or the like, an adhesive or a pressure sensitive adhesive may be used. In this case, a conventional adhesive or pressure sensitive adhesive can be used. In a case where the shock absorbing layer is located on a bonding surface, bonding can be performed via the shock absorbing layer.

A common technique can be applied without any limitation regarding constituent materials of the liquid crystal panel other than the polarizing plate according to the embodiment of the present invention, a configuration of the liquid crystal panel, a method of forming the liquid crystal panel, and the like, in addition to the above description <<Image Display Device>>

An image display device including the optical film according to the embodiment of the present invention is an image display device including the optical film according to the embodiment of the present invention or the polarizing plate according to the embodiment of the present invention (at least one of polarizing plates of the front-side polarizing plate and the rear-side polarizing plate), and an image display element.

Examples of image display devices including the optical film according to the embodiment of the present invention include image display devices such as a liquid crystal display (LCD) device, a plasma display panel, an electroluminescent display, a cathode ray tube display device, and a touch panel display.

Preferred examples of the liquid crystal display device including the optical film according to the embodiment of the present invention include an image display device including the liquid crystal panel according to the embodiment of the present invention.

Examples of liquid crystal display devices include a twisted nematic (TN) type, a super-twisted nematic (STN) type, a triple super twisted nematic (TSTN) type, a multi-domain type, a vertical alignment (VA) type, an in plane switching (IPS) type, an optically compensated bend (OCB) type, and the like.

It is preferable tat the image display device have ameliorated brittleness and excellent handleability, do not impair display quality due to surface smoothness, wrinkles, or the like, and be able to reduce light leakage during a wet heat test.

That is, in the image display device including the optical film according to the embodiment of the present invention, an image display element is preferably a liquid crystal display element. Examples of image display devices including the liquid crystal display element include Xperia P (trade name) manufactured by Sony Ericsson.

In the image display device having the optical film according to the embodiment of the present invention, it is also preferable that an image display element be an organic electroluminescence (EL) display element.

Known techniques can be applied to the organic electroluminescence display element without any limitation. Examples of image display devices including the organic electroluminescence display element include GALAXY S II (trade name) manufactured by SAMSUNG, and the like.

In the image display device including the optical film according to the embodiment of the present invention, it is also preferable that an image display element be an in-cell touch panel display element. The in-cell touch panel display element is an element in which a touch panel function is built in an image display element cell.

For the in-cell touch panel display element, for example, known techniques such as JP2011-076602A and JP201-222009A can be applied without any limitation Examples of image display devices including the in-cell touch panel display element include Xperia P (trade name) manufactured by Sony Ericsson.

Furthermore, In the image display device including the optical film according to the embodiment of the present invention, it is also preferable that an image display element be an on-cell touch panel display element. The on-cell touch panel display element is an element in which a touch panel function is disposed outside an image display element cell.

For the on-cell touch panel display element, for example, known techniques such as JP2012-088683A can be applied without any limitation. Examples of image display devices including the on-cell touch panel display element include GALAXY S II (trade name) manufactured by SAMSUNG, and the like.

<<Touch Panel>>

A touch panel including the optical film according to the embodiment of the present invention is a touch panel including a touch sensor by bonding a touch sensor film to the optical film according to the embodiment of the present invention. In a case where the optical film according to the embodiment of the present invention is used in the touch panel, the optical film according to the embodiment of the present invention may or may not have an HC layer, but the optical film preferably has the HC layer, and it is preferable that the touch sensor film be bonded to a resin film surface (for example, a surface of the shock absorbing layer 2A in FIG. 2) on the side opposite to a surface on which the HC layer is disposed.

The touch sensor film is not particularly limited, but it is preferably a conductive film having a conductive layer formed thereon.

The conductive film is preferably a conductive film in which a conductive layer is formed on an arbitrary support.

Preferred examples of the liquid crystal panel according to the embodiment of the present invention also include a liquid crystal panel having the touch panel according to the embodiment of the present invention.

The touch panel according to the embodiment of the present invention can be preferably used as an out-cell touch panel. The out-cell touch panel is used by being bonded to a surface on a visible side of the liquid crystal panel. As the liquid crystal panel, a commonly used liquid crystal panel can be used without particular limitation. For example, the aforementioned liquid crystal panel according to the embodiment of the present invention (however, a liquid crystal panel having a touch sensor function is excluded) can be preferably used.

Furthermore, the touch panel according to the embodiment of the present invention can be preferably used as a touch panel in an on-cell touch panel. In this case, the touch panel according to the embodiment of the present invention can be used as an image display element of the on-cell touch panel display element provided on a surface on a visible side. As this image display element, an image display element such as an on-cell touch panel that is commonly used can be used without particular limitation, and examples thereof include the aforementioned on-cell touch panel display element. Furthermore, at least one of the optical film according to the embodiment of the present invention or the polarizing plate according to the embodiment of the present invention may be used in combination.

EXAMPLES

Hereinafter, the present invention will be described in more detail with reference to examples. The present invention should not be limitedly interpreted by the following examples. In the following examples, "parts" and "%" representing compositions are based on mass unless otherwise specified. In addition, the notation "-" in tables indicates that a component or constitution in that column is not included, or that there is no measurement target of a storage elastic modulus E' or tan δ.

EXAMPLE

<<Production of Optical Film>>

Example 1

<1. Production of Resin Film 1>

(1) Preparation of Core Layer Cellulose Acylate Dope Solution

The following composition was put into a mixing tank and stirred to prepare a core layer cellulose acylate dope solution.

Core layer cellulose acylate dope solution

| | |
|---|---|
| Cellulose acetate having an acetyl substitution degree: 2.88 and a weight-average molecular weight: 260,000 | 100 parts by mass |
| Phthalate ester oligomer A having the following structure | 10 parts by mass |
| Compound (A-1) represented by Formula I | 4 parts by mass |
| Ultraviolet absorber represented by Formula II (manufactured by BASF) | 2.7 parts by mass |
| Light stabilizer (manufactured by BASF, trade name: TINUVIN123) | 0.18 parts by mass |
| N-alkenyl propylene diamine triacetic acid (manufactured by Nagase ChemteX Corporation, trade name: TECHRUN DO) | 0.02 parts by mass |
| Methylene chloride (first solvent) | 430 parts by mass |
| Methanol (second solvent) | 64 parts by mass |

Compounds used are shown below.

Phthalate ester oligomer A (weight-average molecular weight: 750)

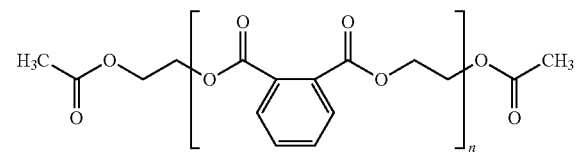

Compound (A-1) represented by Formula I

Formula I

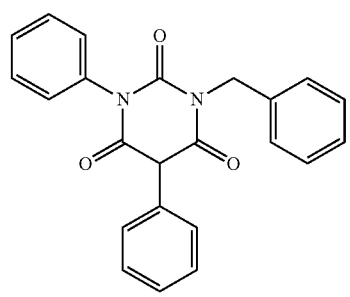

Ultraviolet absorber represented by Formula II

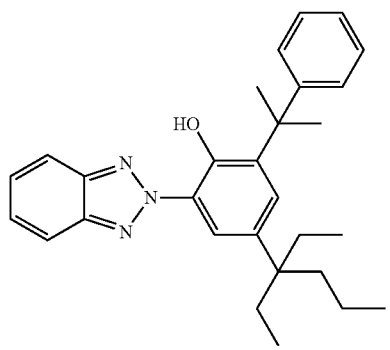

Formula II (2) Preparation of Outer Layer Cellulose Acylate Dope Solution 10 parts by mass of the following inorganic particle-containing composition was added into 90 parts by mass of the above core layer cellulose acylate dope solution to prepare an outer layer cellulose acylate dope solution.

Inorganic particle-containing composition

| | |
|---|---|
| Silica particles having an average primary particle size of 20 nm (manufactured by Nippon Aerosol Co., Lid., trade name: AEROSIL R972) | 2 parts by mass |
| Methylene chloride (first solvent) | 76 parts by mass |
| Methanol (second solvent) | 11 parts by mass |
| Core layer cellulose acylate dope solution | 1 parts by mass |

(3) Production of Resin Film

Three solutions of the outer layer cellulose acylate dope solution, the core layer cellulose acylate dope solution, and the outer layer cellulose acylate dope solution were cast at the same time from a casting port on a casting band having a surface temperature of 20° C. such that the outer layer cellulose acylate dope solutions were disposed on both sides of the core layer cellulose acylate dope solution.

An endless band made of stainless steel having a width of 2.1 m and a length of 70 m was used as the casting band. The casting band was polished to a thickness of 1.5 mm and a surface roughness of 0.05 μm or less. A material thereof was made of SUS316, and a casting band having sufficient corrosion resistance and strength was used. A thickness unevenness of the entire casting band was 0.5% or less.

A rapid drying air having a wind speed of 8 m/s, a gas concentration of 16%, and a temperature of 60° C. was blown on a surface of the obtained casting film to form an initial film. Thereafter, a drying air of 140° C. was blown from the upstream side of the upper part of the casting band. Furthermore, a drying air of 120° C., and a drying air of 60° C. were blown from the downstream side.

An amount of the residual solvent was adjusted to about 33 mass %, and then stripped from the band. Next, both ends of the obtained film in a width direction were fixed with tenter clips. Thereafter, the film was further dried by being conveyed between rolls of a heat treatment device to, and thereby a resin film 1 having a thickness of 100 μm (outer layer/core layer/outer layer=3 μm/94 μm/3 μm) was produced.

[Saponification Treatment]

The resin film 1 produced above was immersed for 2 minutes in a 1.5 mol/L of a NaOH aqueous solution (saponification solution) kept at 55° C., then the film was washed with water. Thereafter, the film was immersed in 0.05 mol/L of a sulfuric acid aqueous solution at 25° C. for 30 seconds. Thereafter, the film was allowed to pass through running water for 30 seconds for further washing so that the film was in a neutral state. Then, draining with an air knife was repeated 3 times. After dropping water, the film was allowed to stay in a drying zone at 70° C. for 15 seconds to be dried, and thereby a saponification-treated resin film 1 was produced.

<2. Production of Shock Absorbing Layer>

(1) Preparation of Composition for Forming Shock Absorbing Layer (SA Layer)

Components were mixed according to formation shown in Table 1 and filtered through a polypropylene filter having a pore size of 10 μm, and thereby compositions SA-1 to SA-8 for forming a shock absorbing layer (SA layer) were prepared.

TABLE 1

| | Composition for forming SA layer | | SA-1 | SA-2 | SA-3 | SA-4 | SA-5 | SA-6 | SA-7 | SA-8 |
|---|---|---|---|---|---|---|---|---|---|---|
| Solid content | Resin | KURARITY LA4285 | 100% | — | — | — | — | — | — | — |
| | | SEPTON 2063 | — | — | 30% | 60% | 67% | — | — | — |
| | | HYBRAR 5127 | — | — | — | — | — | 100% | — | — |
| | | HYBRAR 7311F | — | — | — | — | — | — | 63% | 60% |
| | Polymerizable group-containing compound | KURARAY LIQUID RUBBER UC-203M | — | 22% | — | — | — | — | — | — |
| | Additive | KURARAY LIQUID RUBBER LBR-302 | — | 75% | — | — | — | — | — | — |
| | | Liquid paraffin | — | — | 70% | 40% | 33% | — | 37% | 40% |
| | Polymerization initiator | Irg 184 | — | 3% | — | — | — | — | — | — |
| | Solvent | MIBK | 100% | — | — | — | — | — | — | — |
| | | Tolulene | — | 100% | 100% | 100% | 100% | 100% | 100% | 100% |
| | Concentration of solid contents | | 25% | 70% | 50% | 30% | 30% | 25% | 30% | 30% |

Details of each of the compound described in Table 1 are shown below.

<Resin>

KURARITY LA4285: trade name, manufactured by Kuraray Co., Ltd., a PMMA-PnBA block copolymer elastomer HYBRAR 5127: trade name, manufactured by Kuraray Co., Ltd., an unhydrogenated type of a block copolymer elastomer of polystyrene and vinyl-polydiene SEPTON 2063: trade name, manufactured by Kuraray Co., Ltd., a block copolymer elastomer of polystyrene and ethylene propylene HYBRAR 731F: trade name, manufactured by Kuraray Co., Ltd., a hydrogenated type of a block copolymer elastomer of polystyrene and vinyl-polydiene <Polymerizable Group-Containing Compound>

KURARAY LIQUID RUBBER UC-203M: trade name, manufactured by Kuraray Co., Ltd., polymerizable group-containing polyisoprene <Polymerization Initiator>

Irg 184: 1-hydroxy-cyclohexyl-phenyl-ketone (α-hydroxyalkylphenone-based radical photopolymerization initiator, manufactured by BASF, trade name: IRGACURE 184)

<Additive>

KURARAY LIQUID RUBBER LBR-302, trade name, manufactured by Kuraray Co., Ltd., liquid butadiene Liquid paraffin: manufactured by FUJIFILM Wako Pure Chemical Corporation, special grade reagent <Solvent>

MIBK methyl isobutyl ketone

Descriptions of Table 1 are such that a total amount of the solid content and the solvent is 100 mass %. A concentration of solid contents in the composition indicates a ratio of the solid content to a total amount of the solid content and the solvent.

(2) Production of Shock Absorbing Layer

The composition SA-1 for forming an SA layer was applied on a surface of the saponification-treated resin film 1 opposite to the side which was in contact with the casting band, and the composition was dried to form an SA layer.

Specific methods of application and drying were as follows. By a die coating method using a slot die described in Example 1 of JP2006-122889A, the composition for forming an SA layer was applied under a condition of a conveying speed of 30 m/min such that a film thickness after drying was 80 μm, the composition was dried at an atmospheric temperature of 60° C. for 150 seconds, and thereby the optical film of Example 1 was produced.

Example 2

An optical film of Example 2 was produced in the same manner as in Example 1 except that SA-2 was used instead of the composition SA-1 for forming an SA layer, the composition was dried for 150 seconds at an atmospheric temperature of 60° C., and thereafter, further under nitrogen purging, the composition was irradiated with ultraviolet rays having an illuminance of 300 mW/cm² and an irradiation amount of 1,200 mJ/cm² using an air-cooled metal halide lamp (manufactured by EYE GRAPHICS Co., Ltd.) of 160 W/cm with an oxygen concentration of about 0.1% by volume, and thereby the applied composition for forming an SA layer was cured.

Example 3

An optical film of Example 3 was produced in the same manner as in Example 1 except that SA-3 was used instead of the composition SA-1 for forming an SA layer.

Example 4

<1. Production of Resin Film 2>

A resin film 2 was produced in the same manner as in Example 1 except that a thickness of the resin film 1 was changed to 140 μm (outer layer/core layer/outer layer=3 μm/134 μm/3 μm).

<2. Production of Hard Coat Layer>

(1) Preparation of Curable Composition for Forming Hard Coat Layer (HC Layer)

Components were mixed according to formation shown in Table 2 and filtered through a polypropylene filter having a pore size of 10 μm, and thereby curable compositions HC-1 and HC-2 for forming an HC layer were prepared.

TABLE 2

| Curable composition for forming HC layer | | | HC-1 | HC-2 |
|---|---|---|---|---|
| Solid content | Polymerizable compound 1 or 2 | DPHA | 15.10% | 93.00% |
| | | CYCLOMER M100 | 50.00% | — |
| | Polymerization initiator | Radical photopolymerzation initiator Irg 184 | 4.00% | 4.00% |
| | | Cationic photopolymerization initiator PAG-1 | 0.80% | — |
| | Fluorine-containing antifouling agent | RS-90 | — | 1.00% |
| | Polysiloxane-containing antifouling agent | 8SS-723 | — | 1.00% |
| | Leveling agent | P-112 | 0.10% | — |
| | Inorganic panicle | MEK-AC-2140Z | 30.00% | 1.00% |
| | Solvent | MEK | 100.00% | 40.00% |
| | | MIBK | — | 60.00% |
| Concentration of solid contents in composition | | | 70% | 25% |

The unit of numerical values in Table 2 is mass %. Descriptions of Table 2 are such that a total amount of the solid content and the solvent is 100 mass %. A concentration of solid contents in the composition indicates a ratio of the solid content to a total amount of the solid content and the solvent.

Details of each of the compound shown in Table 2 are shown below.

<Polymerizable Compound>

DPHA: a mixture of dipentaerythritol pentaacrylate and dipentaerythritol hexaacrylate (manufactured by Nippon Kayaku Co., Ltd., trade name, KAYARAD DPHA)

CYCLOMER M100: 3,4-epoxycyclohexylmethyl methacrylate (manufactured by DAICEL, trade name)

<Polymerization Initiator>

Irg 184: 1-hydroxy-cyclohexyl-phenyl-ketone (α-hydroxyalkylphenone-based radical photopolymerization initiator, manufactured by BASF, trade name: IRGACURE 184)

PAG-1: cationic photopolymerization initiator which is an iodonium salt compound shown below

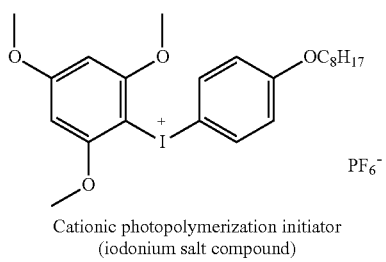

Cationic photopolymerization initiator
(iodonium salt compound)

<Fluorine-Containing Compound>
RS-90: fluorine-containing antifouling agent having a radically polymerizable group, manufactured by DIC Corporation
<<Polysiloxane-Containing Compound>>
8SS-723, manufactured by TAISEI FINE CHEMICAL CO., LTD., a polysiloxane antifouling agent having a reactive group equivalent of 338 g/mol of an acryloyl group
<<Leveling Agent>>
P-112 leveling agent, a compound P-112 described in paragraph 0053 of JP5175831B
<Inorganic Particles>
MEK-AC-2140Z: manufactured by Nissan Chemical Industries, Ltd., spherical silica microparticles having an average primary particle size of 10 to 20 nm
<Solvent>
MEK: methyl ethyl ketone
MIBK: methyl isobutyl ketone
(2) Production of HC Layer
(i) Production of First HC Layer The curable composition HC-1 for forming an HC layer was applied to the side of the resin film 2 which was in contact with the casting band, and the composition was cured to form a first HC layer having a film thickness of 16 μm.

Specific methods of application and curing were as follows. By a die coating method using a slot die described in Example 1 of JP2006-122889A, the curable composition for forming an HC layer was applied under a condition of a conveying speed of 30 m/min, and dried at an atmospheric temperature of 60° C. for 150 seconds. Thereafter, further under nitrogen purging, the composition was irradiated with ultraviolet rays having an illuminance of 20 mW/cm$^2$ and an irradiation amount of 30 mJ/cm$^2$ using an air-cooled metal halide lamp (manufactured by EYE GRAPHICS Co., Ltd.) of 160 W/cm with an oxygen concentration of about 0.1% by volume, the applied curable composition for forming an HC layer was cured to form a first HC layer, and thereafter, winding was performed.

(ii) Production of Second HC Layer

The curable composition HC-2 for forming an HC layer was applied on the surface of the first HC layer formed as described above, and the composition was cured to form a second HC layer having a film thickness of 4 μm.

Specific methods of application and curing were as follows. By a die coating method using a slot die described in Example 1 of JP2006-122889A, the curable composition for forming an HC layer was applied wider a condition of a conveying speed of 30 m/mm, and dried at an atmospheric temperature of 60° C. for 150 seconds Thereafter, further under nitrogen purging, the composition was irradiated with ultraviolet rays having an illuminance of 300 mW/cm$^2$ and an irradiation amount of 600 mJ/cm$^2$ using an air-cooled metal halide lamp (manufactured by EYE GRAPHICS Co., Ltd.) of 160 W/cm with an oxygen concentration of about 0.1% by volume, and thereby the second HC layer was formed. Thereafter, winding was performed, and a resin film 3 provided with the HC layer (hereinafter referred to as an "HC layer-attached resin film 3") was produced.

[Saponification Treatment]

The HC layer-attached resin film 3 produced above was immersed for 2 minutes in a 1.5 mol/L of a NaOH aqueous solution (saponification solution) kept at 55° C., then the film was washed with water. Thereafter, the film was immersed in 0.05 mol/L of a sulfuric acid aqueous solution at 25° C. for 30 seconds. Thereafter, the film was allowed to pass through running water for 30 seconds for further washing so that the film was in a neutral state. Then, draining with an air knife was repeated 3 times. After dropping water, the film was allowed to stay in a drying zone at 70° C. for 15 seconds to be dried, and thereby a saponification-treated HC layer-attached resin film 3 was produced <3. Production of Shock Absorbing Layer>

The composition SA-4 for forming an SA layer was applied on a surface of the saponification-treated HC layer-attached resin film 3 opposite to the surface on which the HC layer was formed, and the composition was dried to form an SA layer. Specific methods of application and drying were as follows. By a die coating method using a slot die described in Example 1 of JP2006-122889A, the composition for forming an SA layer was applied wider a condition of a conveying speed of 30 m/min such that a film thickness after drying was 10 μm, the composition was dried at an atmospheric temperature of 60° C. for 150 seconds, and thereby the optical film of Example 4 was produced.

Example 5

An optical film of Example 5 was produced in the same manner as in Example 4 except that SA-5 was used instead of the composition SA-4 for forming an SA layer.

Example 6

An optical film of Example 6 was produced in the same manner as in Example 4 except that SA-7 was used instead of the composition SA-4 for forming an SA layer.

Example 7

An optical film of Example 7 was produced in the same manner as in Example 3 except that SA-8 was used instead of the composition SA-3 for forming an SA layer, and a film thickness after drying was set to be 40 μm.

Comparative Example 1

An optical film of Comparative Example 1 was produced in the same manner as in Example 1 except that SA-6 was used instead of the composition SA-1 for forming an SA layer.

Comparative Example 2

An optical film of Comparative Example 2 was produced in the same manner as in Example 4 except that SA-6 was used instead of the composition SA-4 for forming an SA layer.

The following tests were carried out on the shock absorbing layer constituting the optical film produced above. A configuration of the optical film and test results are summarized in Table 3.

[Test Example A] Dynamic Viscoelasticity Measurement of Shock Absorbing Layer

<Sample Production Method>

The composition for forming a shock absorbing layer (SA layer) prepared above was applied to a peeling-treated surface of a peeling polyethylene terephthalate (PET) sheet that had been subjected to a peeling treatment such that a thickness after drying was 40 μm, and the composition was dried Thereafter, the shock absorbing layer was peeled from the peeling PET sheet to produce a test piece of the shock absorbing layer.

However, application and drying conditions were conditions described in the method of forming an SA layer in Example 1. Furthermore, the composition SA-2 for forming an SA layer was applied and dried, and then irradiated with ultraviolet rays under the conditions described in Example 2 to be cured.

[Test Example B] Measurement of Film Thickness

A "film thickness" was measured by observing with a scanning electron microscope (SEM) by the following method.

A cross-section of each constituent member (resin film, shock absorbing layer, and HC layer) or the member (for example, liquid crystal panel) including each constituent member was exposed by an ordinary method such as ion beam or microtome, and thereafter, the exposed cross-section was subjected to cross-sectional observation by SEM. In the cross-sectional observation, various film thicknesses were obtained as an arithmetic mean of thicknesses at three equal points excluding both ends in a case where a width direction of the member was equally divided into four parts.

TABLE 3

| | Resin film Film thickness | Formulation | Shock absorbing layer Film thickness | Storage elastic modulus [MPa] | Tan δ | Presence or absence of HC layer |
|---|---|---|---|---|---|---|
| Example 1 | 100 μm | SA-1 | 80 μm | 960 | 0.1 | Absence |
| Example 2 | 100 μm | SA-2 | 80 μm | 5 | 1.7 | Absence |
| Example 3 | 100 μm | SA-3 | 80 μm | 7 | 0.6 | Absence |
| Example 4 | 140 μm | SA-4 | 10 μm | 75 | 1.8 | Presence |
| Example 5 | 140 μm | SA-5 | 10 μm | 5 | 2.3 | Presence |
| Example 6 | 140 μm | SA-7 | 10 μm | 65 | 2.0 | Presence |
| Example 7 | 100 μm | SA-8 | 40 μm | 10 | 2.9 | Absence |
| Comparative Example 1 | 100 μm | SA-6 | 80 μm | 2300 | 0.1 | Absence |
| Comparative Example 2 | 140 μm | SA-6 | 10 μm | 2300 | 0.1 | Presence |

<<Measurement Method>>

Using a dynamic viscoelasticity measurement device (trade name: DVA-225, manufactured by IT Measurement and Control Co., Ltd.), the measurement was performed on the above-mentioned test piece, which was preliminarily conditioned for 2 hours or longer in an atmosphere at a temperature of 25° C., and a relative humidity of 60%, in a "step temperature rise/frequency dispersion" mode under the following conditions. Thereafter, a master curve of tan δ, a storage elastic modulus, and a loss elastic modulus with respect to a frequency at 25° C. were obtained by editing the "master curve." From the obtained master curve, a storage elastic modulus E' at 25° C., and a frequency of $10^6$ Hz, and a frequency showing a local maximum value and local maximum value of tan δ were obtained.

In the following tables, the storage elastic modulus E' at 25° C., and a frequency $10^6$ Hz ($1.0 \times 10^6$ Hz) is shown in the column of "Storage elastic modulus" or "E'," and a local maximum value of tan δ in a range of a frequency of $10^{-1}$ to $10^{15}$ Hz ($1.0 \times 10^{-1}$ to $1.0 \times 10^{15}$ Hz) at 25° C. is shown in the column of "Tan δ."

All values of tan δ in the range of a frequency of $10^{-1}$ to $10^6$ Hz ($1.0 \times 10^{-1}$ to $1.0 \times 10^6$ Hz) at 25° C. of the shock absorbing layer in the rear-side polarizing plate were 3.0 or less.

Sample: 5 mm×50 mm
Test mode: Tensile deformation mode
Grip distance: 20 mm
Setting distortion: 0.10%
Measurement temperature: −100° C. to 40° C.
Temperature rising condition: 2° C./min <<Production of Polarizing Plate>>

<Resin Film 4>

A commercially available cellulose acylate film (trade name: FUJITAC ZRD40, manufactured by FUJIFILM Corporation) was prepared and used as a resin film 4.

<Saponification Treatment>

The resin films 1, 3, and 4 were immersed for 2 minutes in a 1.5 mol/L of a NaOH aqueous solution (saponification solution) kept at 55° C., then the films were washed with water. Thereafter, the films were immersed in 0.05 mol/L of a sulfuric acid aqueous solution at 25° C. for 30 seconds. Thereafter, the washing bath was further allowed to pass through running water for 30 seconds so that the films were in a neutral state. Then, draining with an air knife was repeated 3 times. After dropping water, the films were allowed to stay in a drying zone at 70° C. for 15 seconds to be dried, and thereby saponification-treated resin films 1, 3, and 4 were produced.

<Production of Polarizer>

In accordance with Example 1 of JP2001-141926A, iodine was adsorbed on to a stretched polyvinyl alcohol film to produce a polarizer having a film thickness of 26 μm.

(Production of Polarizing Plate)

Using a polyvinyl alcohol-based adhesive, the above-mentioned saponification-treated resin film 4 (inner protective film) was attached to one side of one of polarizers which were produced by the above-described method and in which no film was attached to either of sides. Then, they were dried at 70° C. for 10 minutes or longer to be bonded to each other. Then, using the polyvinyl alcohol-based adhesive, any one (outer protective film) of the optical films of Examples 1 to 7 and Comparative Examples 1 and 2 and the saponification-treated resin films 1 and 3 was attached to a surface of the polarizer produced by the above-described method, which was opposite to a surface to which the resin film 4 was bonded. They were dried at 70° C. for 10 minutes or longer to be bonded to each other, and thereby polarizing plates A1 to A7, a1, a2, b1, and b2 shown in Table 4 were produced.

The polarizing plate obtained above had a structure in which an outer protective film, a polarizer, and an inner protective film were laminated in this order. However, a bonding surface between the outer protective film and the polarizer was as follows. In the optical films of Examples 1 to 3 and 7 and Comparative Example 1, a surface on which the shock absorbing layer was not laminated, that is, the resin film was bonded to the polarizer. In the optical films of Examples 4 to 6 and Comparative Example 2, a surface on which the shock absorbing layer was laminated, that is, the shock absorbing layer was bonded to the polarizer. In the resin films 1 and 3, a surface of the resin film opposite to the side which was in contact with the casting band was bonded to the polarizer.

(Production of Polarizing Plate A8)

A shock absorbing layer was produced in the same manner as in Example 3 on the resin film 4 side of the polarizing plate A6 produced above, and thereby a polarizing plate A8 was produced.

(Production of Polarizing Plate A9)

A shock absorbing layer was produced in the same manner as in Example 1 on the resin film 4 side of the polarizing plate A7 produced above such that a thickness after drying was 20 μm, and thereby a polarizing plate A9 was produced.

direction, and a transmission axis of the rear-side polarizing plate was in the horizontal direction, that is, transmission axes of the two polarizing plates were orthogonal to each other.

Specifically, the polarizing plates A1 to A7, a1, a2, b1, and b2 were bonded via a pressure sensitive adhesive having a thickness of 20 μm (manufactured by Soken Chemical & Engineering Co., Ltd., trade name: SK-2057) such that the resin film 4 of the polarizing plate and the glass plate faced each other. In addition, the polarizing plates A8 and A9 were bonded without a pressure sensitive adhesive such that the shock absorbing layer formed on the resin film 4 side of the polarizing plate faced the glass plate. That is, in the case of the simulated liquid crystal panel of Example 110 as an example, the shock absorbing layers were disposed in the order of the shock absorbing layer 1, the shock absorbing layer 2, the shock absorbing layer 4, and the shock absorbing layer 3 from the visible side. Each of the polarizing plates was cut into a size of 10 cm square and used.

Figure 3:
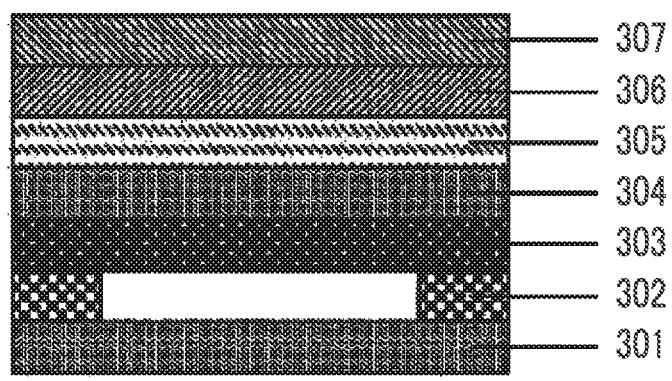
FIG. 3 is a vertical cross-sectional view schematically showing a simulated liquid crystal panel used in Test Example 1 including a base.

Thereafter, the above-mentioned simulated liquid crystal panel was installed on a base made of stainless steel such that a stainless spacer having a thickness of 20 mm and a width of 5 mm (a spacer having a shape in which 9 cm square in the center portion was punched out from a 10 cm square spacer) was sandwiched between the simulated liquid crystal panel and the stainless steel base. This state is shown in FIG. 3. In FIG. 3, a base 301, a spacer 302, a rear-side polarizing plate 303, a pressure sensitive adhesion layer or shock absorbing layer 304, a glass plate 305, a pressure sensitive adhesion layer or shock absorbing layer 306, and a front-side polarizing plate 307 are laminated in this order.

TABLE 4

|  | Outer protective film | Film thickness of polarizer | Inner protective film | Shock absorbing layer | | | |
|---|---|---|---|---|---|---|---|
|  |  |  |  | Formulation | Film thickness | Storage elastic modulus [MPa] | Tan δ |
| Polarizing plate A1 | Example 1 | 26 μm | Resin film 4 | — | — | — | — |
| Polarizing plate A2 | Example 2 | 26 μm | Resin film 4 | — | — | — | — |
| Polarizing plate A3 | Example 3 | 26 μm | Resin film 4 | — | — | — | — |
| Polarizing plate A4 | Example 4 | 26 μm | Resin film 4 | — | — | — | — |
| Polarizing plate A5 | Example 5 | 26 μm | Resin film 4 | — | — | — | — |
| Polarizing plate A6 | Example 6 | 26 μm | Resin film 4 | — | — | — | — |
| Polarizing plate A7 | Example 7 | 26 μm | Resin film 4 | — | — | — | — |
| Polarizing plate A8 | Example 6 | 26 μm | Resin film 4 | SA-3 | 20 μm | 2 | 0.6 |
| Polarizing plate A9 | Example 7 | 26 μm | Resin film 4 | SA-1 | 20 μm | 960 | 0.1 |
| Polarizing plate a1 | Resin film 1 | 26 μm | Resin film 4 | — | — | — | — |
| Polarizing plate a2 | Resin film 2 | 26 μm | Resin film 4 | — | — | — | — |
| Polarizing plate b1 | Comparative Example 1 | 26 μm | Resin film 4 | — | — | — | — |
| Polarizing plate b2 | Comparative Example 2 | 26 μm | Resin film 4 | — | — | — | — |

The following test was performed on the polarizing plate produced above. Test results are summarized in Table 5.

<Production of Simulated Liquid Crystal Panel>

[Test Example] Shock Absorption Property

A glass plate (manufactured by Corning Incorporated, trade name: EAGLE XG, thickness: 0.4 mm) and the polarizing plate produced above were bonded to each other so as to have a configuration shown in Table 5 while applying a load of 2 kg with a rubber roller. Thereby a simulated liquid crystal panel was produced. Polarizing plates were disposed in crossed Nicols such that an absorption axis of the front-side polarizing plate was in a horizontal Next, an iron ball (diameter 3.2 cm, mass 130 g) was dropped from a predetermined height (10 cm, 25 cm, 40 cm, 50 cm, 55 cm, and 60 cm) such that the front-side polarizing plate and the iron ball came into contact with each other and collided. Thereafter, damage such as cracks and breakage of the glass plate was observed, and a relationship between the drop height of the iron ball and the damage of the glass plate was applied to the following evaluation standard to evaluate a shock absorption property. In the present test, "D" and above are regarded as a pass.

<Evaluation Standard>

A++: There was no damage even at a drop height of 60 cm.

A+: There was no damage at a drop height of 55 cm, but there was damage at a drop height of 60 cm.

A: There was no damage at a drop height of 50 cm, but there was damage at a drop height of 55 cm.

B: There was no damage at a drop height of 40 cm, but there was damage at a drop height of 50 cm.

C: There was no damage at a drop height of 25 cm, but there was damage at a drop height of 40 cm.

D: There was no damage at a drop height of 10 cm, but there was damage at a drop height of 25 cm.

E: There was damage at a drop height of 10 cm.

Results of the shock absorption property test are shown in Table 5.

excellent shock absorption property, because no damage was observed even in a case where the iron ball dropped from a height of 50 cm.

It is thought that, although the present invention has been described with reference to the embodiment thereof, this is not intended to limit any details of the description of our invention unless otherwise specified, but should be broadly interpreted without departing from the spirit and scope of the invention shown in the appended claims.

This application claims priority based on Japanese Patent Application No. 2018-098318, filed May 22, 2018 in Japan,

TABLE 5

| | | Polarizing plate on ball dropping side (front-side polarizing plate) | | | | | | | | Polarizing plate on side opposite to ball dropping side (rear-side polarizing plate) Content |
|---|---|---|---|---|---|---|---|---|---|---|
| | | Shock absorbing layer 1 | | | | Shock absorbing layer 2 | | | | |
| | Content | Formulation | Film thickness | E' [MPa] | Tan δ | Formulation | Film thickness | E' [MPa] | Tan δ | |
| Example 101 | Polarizing plate a2 | — | — | — | — | — | — | — | — | Polarizing plate A1 |
| Example 102 | Polarizing plate a2 | — | — | — | — | — | — | — | — | Polarizing plate A2 |
| Example 103 | Polarizing plate a2 | — | — | — | — | — | — | — | — | Polarizing plate A3 |
| Example 104 | Polarizing plate A4 | SA-4 | 10 μm | 75 | 1.8 | — | — | — | — | Polarizing plate a1 |
| Example 105 | Polarizing plate A5 | SA-5 | 10 μm | 5 | 2.3 | — | — | — | — | Polarizing plate a1 |
| Example 106 | Polarizing plate A4 | SA-4 | 10 μm | 75 | 1.8 | — | — | — | — | Polarizing plate A3 |
| Example 107 | Polarizing plate A6 | SA-7 | 10 μm | 65 | 2.0 | — | — | — | — | Polarizing plate A7 |
| Example 108 | Polarizing plate A8 | SA-7 | 10 μm | 65 | 2.0 | SA-3 | 20 μm | 7 | 0.6 | Polarizing plate A7 |
| Example 109 | Polarizing plate A6 | SA-7 | 10 μm | 65 | 2.0 | — | — | — | — | Polarizing plate A9 |
| Example 110 | Polarizing plate A8 | SA-7 | 10 μm | 65 | 2.0 | SA-3 | 20 μm | 9 | 0.6 | Polarizing plate A9 |
| Comparative Example 101 | Polarizing plate a2 | — | — | — | — | — | — | — | — | Polarizing plate b1 |
| Comparative Example 102 | Polarizing plate b2 | SA-6 | 10 μm | 7.300 | 0.1 | — | — | — | — | Polarizing plate a1 |

| | Polarizing plate on side opposite to ball dropping side (rear-side polarizing plate) | | | | | | | | Shock absorption property |
|---|---|---|---|---|---|---|---|---|---|
| | Shock absorbing layer 3 | | | | Shock absorbing layer 4 | | | | |
| | Formulation | Film thickness | E' [MPa] | Tan δ | Formulation | Film thickness | E' [MPa] | Tan δ | |
| Example 101 | SA-1 | 80 μm | 960 | 0.1 | — | — | — | — | D |
| Example 102 | SA-2 | 80 μm | 5 | 1.7 | — | — | — | — | C |
| Example 103 | SA-3 | 80 μm | 2 | 0.6 | — | — | — | — | B |
| Example 104 | — | — | — | — | — | — | — | — | C |
| Example 105 | — | — | — | — | — | — | — | — | D |
| Example 106 | SA-3 | 80 μm | — | 0.6 | — | — | — | — | A |
| Example 107 | SA-8 | 40 μm | 10 | 2.9 | — | — | — | — | A |
| Example 108 | SA-8 | 40 μm | 10 | 2.9 | — | — | — | — | A+ |
| Example 109 | SA-8 | 40 μm | 10 | 2.9 | SA-1 | 20 μm | 960 | 0.1 | A+ |
| Example 110 | SA-8 | 40 μm | 10 | 2.9 | SA-1 | 20 μm | 960 | 0.1 | A++ |
| Comparative Example 101 | SA-6 | 80 μm | 2800 | 0.1 | — | — | — | — | E |
| Comparative Example 102 | — | — | — | — | — | — | — | — | E |

As shown in Table 5, the simulated liquid crystal panels of Comparative Examples 101 and 102 which did not include the optical film according to the embodiment of the present invention as a polarizing plate were inferior in the shock absorption property.

On the other hand, it was found that the simulated liquid crystal panels of Examples 101 to 110 which included the optical film according to the embodiment of the present invention as at least one of the front-side polarizing plate or the rear-side polarizing plate had a sufficient shock absorption property. Among the above examples, it was found that Examples 106 to 110, which had the optical film according to the embodiment of the present invention as the polarizing plates on both the front side and the rear side, had an and Japanese Patent Application No. 2018-114622, filed Jun. 15, 2018 in Japan, the contents of which are incorporated herein by reference as a part of the description of the present specification.

EXPLANATION OF REFERENCES

1A: resin film
2A: shock absorbing layer
3A: hard coat layer
4A, 4B: optical film
301: base
302: spacer
303: rear-side polarizing plate
304: pressure sensitive adhesion layer or shock absorbing layer 305: glass plate
306: pressure sensitive adhesion layer or shock absorbing layer
307: front-side polarizing plate

What is claimed is:

1. An optical film comprising:
   a resin film; and
   a shock absorbing layer disposed on at least one surface of the resin film,
   wherein a storage elastic modulus E' of the shock absorbing layer at 25° C. and a frequency of $10^6$ Hz is less than 1 GPa, and
   the resin film does not function as a polarizer.

2. The optical film according to claim 1, wherein a film thickness of the shock absorbing layer is 10 μm to 80 μm.

3. The optical film according to claim 1, further comprising a hard coat layer on a surface of the resin film opposite to the surface on which the shock absorbing layer is disposed.

4. A polarizing plate comprising the optical film according to claim 1.

5. A polarizing plate comprising the optical film according to claim 3.

6. A liquid crystal panel comprising the polarizing plate according to claim 4 as a rear-side polarizing plate.

7. A liquid crystal panel comprising the polarizing plate according to claim 5 as a front-side polarizing plate.

8. A liquid crystal panel comprising:
   a polarizing plate comprising the optical film according to claim 1 as a rear-side polarizing plate; and
   a polarizing plate comprising the optical film according to claim 1, further comprising a hard coat layer on a surface of the resin film opposite to the surface on which the shock absorbing layer is disposed, as a front-side polarizing plate.

9. The liquid crystal panel according to claim 8, wherein a storage elastic modulus $E'_r$ of the shock absorbing layer included in the optical film of the rear-side polarizing plate, and a storage elastic modulus $E'_f$ of the shock absorbing layer included in the optical film of the front-side polarizing plate satisfy the following expression:

$$E'_f - E'_r \geq 0.$$

10. The liquid crystal panel according to claim 6, further comprising a touch sensor.

11. A touch panel comprising:
    the optical film according to claim 1; and
    a touch sensor film,
    wherein the optical film and the touch sensor film are bonded to each other.

12. A liquid crystal panel comprising the touch panel according to claim 11.

13. An image display device comprising the liquid crystal panel according to claim 6.

14. The optical film according to claim 1, wherein the storage elastic modulus E' of the shock absorbing layer at 25° C. and a frequency of $10^6$ Hz is 960 MPa or less.

15. The optical film according to claim 1, wherein the shock absorbing layer has a maximum value of tan δ of 1.0 or more within a frequency range of $1.0 \times 10^{-1}$ to $1.0 \times 10^{15}$ Hz at 25° C.

16. The optical film according to claim 1, wherein a film thickness of the resin film is 80 μm or more.

* * * * *